(12) United States Patent
Mimar

(10) Patent No.: US 9,491,420 B2
(45) Date of Patent: Nov. 8, 2016

(54) VEHICLE SECURITY WITH ACCIDENT NOTIFICATION AND EMBEDDED DRIVER ANALYTICS

(71) Applicant: Tibet Mimar, Sunnyvale, CA (US)

(72) Inventor: Tibet Mimar, Sunnyvale, CA (US)

( * ) Notice: Subject to any disclaimer, the term of this patent is extended or adjusted under 35 U.S.C. 154(b) by 215 days.

(21) Appl. No.: 14/201,904

(22) Filed: Mar. 9, 2014

(65) Prior Publication Data

US 2014/0300739 A1    Oct. 9, 2014

Related U.S. Application Data

(63) Continuation-in-part of application No. 14/147,580, filed on Jan. 5, 2014, which is a continuation-in-part of application No. 13/986,206, filed on Apr. 13, 2013, now abandoned, which is a continuation-in-part of application No. 12/586,374, filed on Sep. 20, 2009, now Pat. No. 8,547,435.

(51) Int. Cl.
| | |
|---|---|
| *H04N 7/18* | (2006.01) |
| *G08B 21/04* | (2006.01) |
| *G06K 9/00* | (2006.01) |
| *G06Q 40/08* | (2012.01) |
| *G06Q 30/02* | (2012.01) |
| *G08B 21/06* | (2006.01) |
| *G08B 21/02* | (2006.01) |

(52) U.S. Cl.
CPC .......... *H04N 7/188* (2013.01); *G06K 9/00845* (2013.01); *G06Q 30/0283* (2013.01); *G06Q 40/08* (2013.01); *G08B 21/0476* (2013.01); *G08B 21/06* (2013.01)

(58) Field of Classification Search
CPC ............... G06K 9/00845; G06Q 30/0283; G06Q 40/08; G08B 21/0476; G08B 21/06; H04N 7/188

USPC ........................................................ 348/148
See application file for complete search history.

(56) References Cited

U.S. PATENT DOCUMENTS

| | | | |
|---|---|---|---|
| 5,642,093 A | 6/1997 | Kinoshita et al. | |
| 6,049,747 A | 4/2000 | Nakajima et al. | |
| 6,154,559 A | 11/2000 | Beardsley | |
| 6,333,759 B1 | 12/2001 | Mazzilli | |
| 6,487,500 B2 | 11/2002 | Lemelson et al. | |
| 6,922,137 B1 | 7/2005 | Bycroft | |
| 7,119,669 B2 | 10/2006 | Lundsgaard et al. | |
| 7,319,485 B2 | 1/2008 | Szolyga | |
| 8,144,002 B2 | 3/2012 | Kiuchi | |
| 8,547,435 B2 * | 10/2013 | Mimar ............. | G08B 13/19676 348/143 |
| 2003/0156192 A1 | 8/2003 | Cho | |
| 2004/0144587 A1 | 7/2004 | Spies | |
| 2005/0030224 A1 | 2/2005 | Koch et al. | |

(Continued)

*Primary Examiner* — Behrooz Senfi

(57) ABSTRACT

The present invention relates to a vehicle telematics device with one or more cameras embedded in the same package for evidentiary surround audio-video recording, automatic accident detection and emergency help request notification, facial processing for drowsiness and distraction accident avoidance, and embedded multiple profiles of driver analytics, and mobile internet connectivity for contacting emergency services directly and without the delay of a call center and for mobile hot spot for in-vehicle infotainment. Each profile of driver analytics has many selectable advanced driver analysis parameters and multiple profiles can be active for a given driver. In case of emergency help request accident panoramic accident video is uploaded to a cloud drop box and link to video of accident is available along with severity index, location, nearest address, number of passengers, etc.

10 Claims, 45 Drawing Sheets

(56) References Cited

U.S. PATENT DOCUMENTS

| | | |
|---|---|---|
| 2005/0040937 A1* | 2/2005 | Cuddihy .............. G08B 25/016 340/436 |
| 2005/0275522 A1 | 12/2005 | Nitz |
| 2006/0087582 A1 | 4/2006 | Scharenbroch et al. |
| 2006/0209187 A1 | 9/2006 | Farneman |
| 2006/0287779 A1 | 12/2006 | Smith et al. |
| 2007/0109106 A1* | 5/2007 | Maeda ................... B60R 25/10 340/426.1 |
| 2007/0109111 A1 | 5/2007 | Breed et al. |
| 2007/0159344 A1 | 7/2007 | Kisacanin |
| 2008/0143504 A1 | 6/2008 | Martin Alvarez |
| 2008/0195261 A1 | 8/2008 | Breed |
| 2009/0015684 A1 | 1/2009 | Ooga |
| 2010/0214087 A1 | 8/2010 | Nakagoshi et al. |
| 2010/0214105 A1 | 8/2010 | Manotas, Jr. |
| 2010/0219955 A1 | 9/2010 | Demirdjian et al. |
| 2010/0238034 A1 | 9/2010 | Gunaratne |
| 2010/0322507 A1 | 12/2010 | Gunaratne |
| 2011/0163863 A1 | 7/2011 | Chatmon |
| 2012/0129460 A1* | 5/2012 | Hodis ..................... G01S 19/48 455/67.11 |
| 2012/0164968 A1 | 6/2012 | Velusamy et al. |
| 2013/0006469 A1 | 1/2013 | Green et al. |
| 2013/0021463 A1 | 1/2013 | Hatakeyama |
| 2013/0044000 A1 | 2/2013 | Nakai et al. |
| 2013/0069802 A1 | 3/2013 | Foghel et al. |
| 2013/0076885 A1 | 3/2013 | Kobetski et al. |
| 2014/0019167 A1 | 1/2014 | Cheng et al. |

* cited by examiner

Prior Art FIG. 1

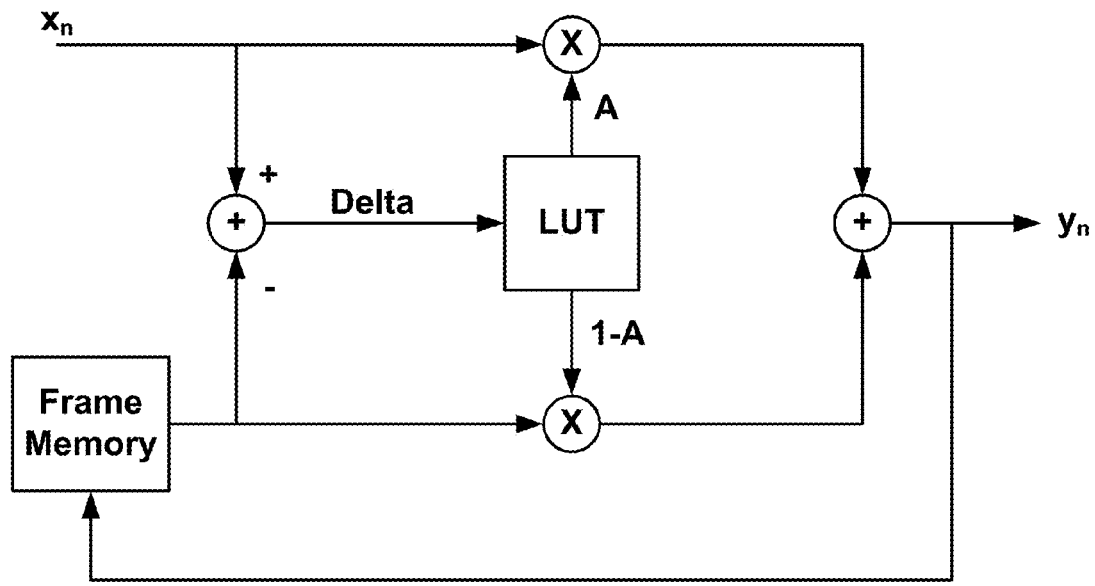
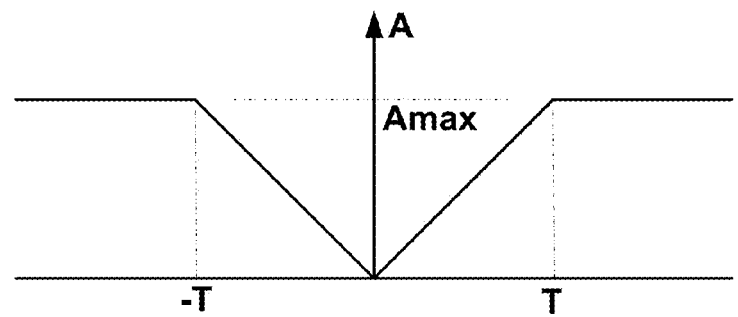
FIG. 15

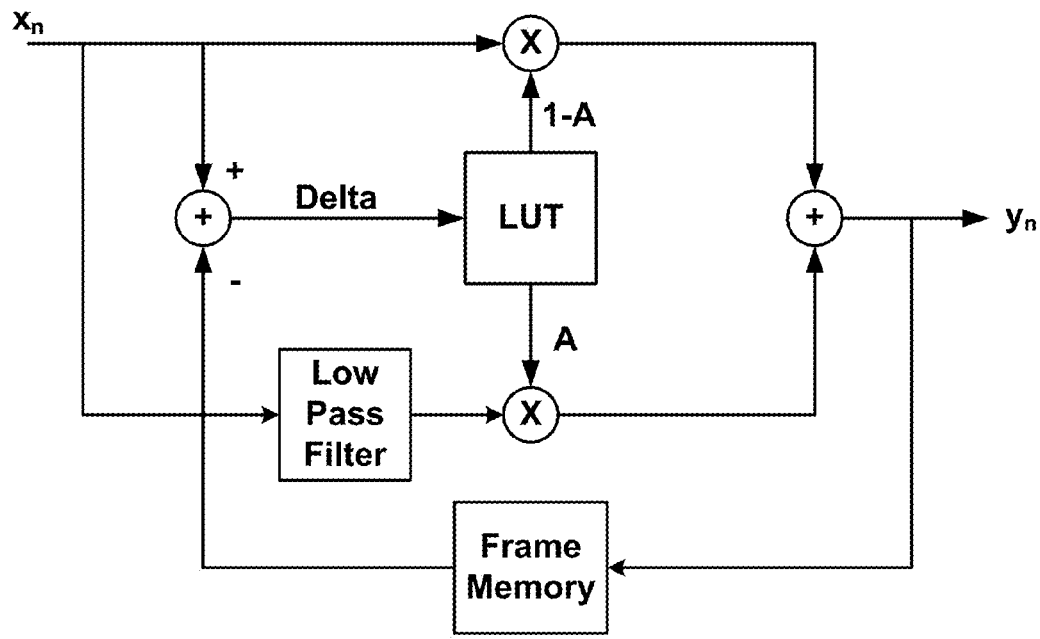
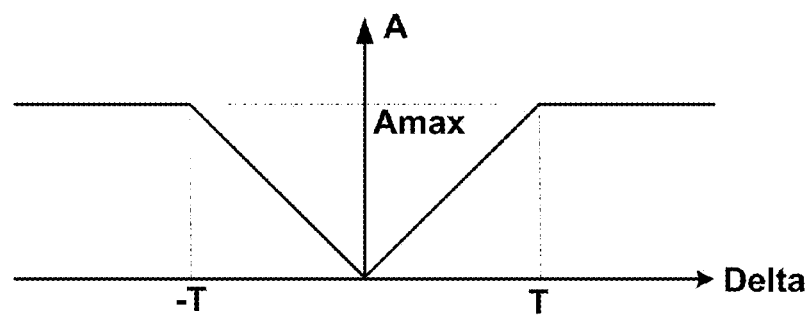
FIG. 16

| Pin Number | Usage |
|---|---|
| 1 | Ground |
| 2 | Always_On_12V |
| 3 | Ground |
| 4 | Switched_12V |
| 5 | External_Trigger |
| 6 | Ground_Loop |
| Table: Power Connector Pin Definitions | |

FRONT VIEW –
PCB & ENCLOSURE

| Force | $F$ | $=$ | $F$ |
| Impulse | $F_t$ | $=$ | $F_t$ |
| Change in momentum | $m\Delta v$ | $=$ | $m\Delta v$ |
| Acceleration | $m a$ | $=$ | $m a$ |

| Event/ Vehicle Type | Typical car | Sports car | F-1 race car |
|---|---|---|---|
| Starting | 0.3–0.5 | 0.5–0.9 | 1.7 |
| Braking | 0.8–1.0 | 1.0–1.3 | 2 |
| Cornering | 0.7–0.9 | 0.9–1.0 | 3 |
| Acceleration Values In G | | | |

| Direction of Accelerative Force | Occupant's Inertial Response | Tolerance Level |
|---|---|---|
| Headward (+ Gz) | Eyeballs Down | 20-25G |
| Tailward (- Gz) | Eyeballs Up | 15G |
| Lateral Right (+ Gy) | Eyeballs Right | 20G |
| Lateral Left (- Gy) | Eyeballs Left | 20G |
| Back to Chest (+Gx) | Eyeballs Out | 45G |
| Chest to Back (- Gx) | Eyeballs In | 45G |
| 0.10 Second Time Duration of Crash Pulse; Full Restraint |||

(b)

SEVERE ACCIDENT HELP REQUEST

SEE FIG. 40(A)

EMERGENCY POLICE HELP REQUEST

SEE FIG. 40(B)

FIG. 40

SEVERE ACCIDENT HELP REQUEST

Severity Level: 8 out of 10
Speed At Time of Accident: 72 mph
Peak G Force in Cabin: 42G
Duration of Peak G Force: 7 ms
Duration of Crash: 125 ms
Roll Over: No, Free Fall: No Driver's Name: John Smith
Location: 37.3838475, -122.0127835
Nearest Address: 440 North Wolfe Road, Sunnyvale, CA 94085
Vehicle Make and Model: Toyota Corolla
Vehicle License Plate: 2TNY624
Vehicle Color: Light Gray
Time of Accident: 03: 20 PM, Jan. 9, 2014
Direction of Travel: North Bound
Dangerous Cargo: No
Passengers: 3+
Accident Video Available: https//www.dropbox.com/s/accidentdemo/preview.avi
Vehicle Phone Number:408-779-8142

FIG. 40-A

EMERGENCY POLICE HELP REQUEST

Driver's Name: John Smith
Location: 37.3838475, -122.0127835
Nearest Address: 440 North Wolfe Road, Sunnyvale, CA 94085
Vehicle Make and Model: Toyota Corolla
Vehicle License Plate:: 2TNY624
Vehicle Color: Light Gray
Time of Accident: 03: 20 PM, Jan. 9, 2014
Direction of Travel: North Bound
Dangerous Cargo: No
Passengers: 3+
Accident Video Available: https//www.dropbox.com/s/accidentdemo/preview.avi
Vehicle Phone Number:408-779-8142

FIG. 40-B

| PARAMETERS / EVENT | NOTES |
|---|---|
| Total Miles Driven | Miles travelled in a given time period |
| Over Speeding | 70+ (Trucks/Buses) or 80+ mph for > 10 sec |
| Hard Braking | Times per month |
| Late Night Driving | Times per month |
| X+ MPH Over Speeding | Times per month |
| Average Highway Speed | When >55mph after 5 min, w/ 2 min hysteresis. |
| Bad Weather Over Speeding | Times per month |
| Hard Acceleration | Engine load, throttle position, Times per month |
| Hard Cornering | Times per month |
| Acceleration/Deceleration Jerk | Times per month |
| High Revving Near Redline | Times per month |
| Night Time Hours Driven | Per month |
| After Midnight Hours Driven | Per month |
| Drowsiness Detected | Times per month |
| Distraction Detected | Times per month |
| Number of Over Idling Events | Idling times over 5 minutes per month |
| Sudden Lane Changes | Times per month over 50 mph |
| Tampering Detected | Times per month |
| Emergency Help Request | Related data |
| Accident Notification | Related data |
| Parked Vehicle Damage | Related data |
| Tired Driving | 5+ hour driving without stop, stop = 15+ min. |
| Tail Gating | Times per month |

FIG. 41

| PARAMETERS / EVENT | INSURANCE COMPANY X | PARENTAL MONITORING | FLEET MONITORING |
|---|---|---|---|
| Total Miles Driven | ✓ | ✗ | ✓ |
| Over Speeding | ✗ | ✓ | ✗ |
| Hard Braking | ✓ | ✓ | ✓ |
| Late Night Driving | ✓ | ✓ | ✗ |
| 80+ Mph Over Speeding | ✓ | ✓ | ✓ |
| Average Highway Speed | ✓ | ✓ | ✓ |
| Bad Weather Over Speeding | ✗ | ✗ | ✓ |
| Hard Acceleration | ✓ | ✓ | ✓ |
| Hard Cornering | ✓ | ✓ | ✓ |
| Acceleration / Deceleration Jerk | ✓ | ✓ | ✓ |
| Revving Near Redline | ✗ | ✓ | ✗ |
| Night Time Hours Driven | ✓ | ✗ | ✓ |
| Midnight+ Hours Driven | ✓ | ✗ | ✓ |
| Drowsiness Detected | ✗ | ✓ | ✓ |
| Distraction Detected | ✗ | ✓ | ✓ |
| # of Over-Idling Events | ✗ | ✗ | ✓ |
| Sudden Lane Changes | ✗ | ✓ | ✓ |
| Tampering Detected | ✗ | ✓ | ✓ |
| Emergency Help Request | ✗ | ✓ | ✓ |
| Accident Notification | ✗ | ✓ | ✓ |
| Parked Vehicle Damage | ✗ | ✓ | ✗ |
| Tired Driving | ✓ | ✗ | ✓ |
| Tail Gating | ✗ | ✗ | ✓ |

FIG. 42

| Population % | 5 % | 20 % | 50 % | 20 % | 5 % |
|---|---|---|---|---|---|
| SAFETY LEVEL | DANGEROUS | UNSAFE | NORMAL | UNSAFE | DANGEROUS |
| ATTRIBUTES | • TOO SLOW<br>• UNCONFIDENT<br>• DISTURBS FLOW | • ALWAYS OBEYS SPEED LIMITS | • CONFIDENT<br>• PREDICTABLE<br>• FOLLOWS TRAFFIC FLOW | • ROUTINELY SPEEDS<br>• TAILGATES | • TOO FAST<br>• LANE HOPPER<br>• DISTURBS TRAFFIC FLOW<br>• UN-PREDICTABLE |
| DRIVER TYPE | TIMID | CAUTIOUS | CONSERVATIVE | ASSERTIVE | AGGRESSIVE |

FIG. 43

VEHICLE SECURITY WITH ACCIDENT NOTIFICATION AND EMBEDDED DRIVER ANALYTICS

CROSS-REFERENCE TO RELATED APPLICATIONS

This application claims priority from and is a Continuation-In-Part of U.S. patent application Ser. No. 14/147,580, filed on Jan. 5, 2014, and said Ser. No. 14/147,580 is a Continuation-In-Part of application Ser. No. 13/986,206 and Ser. No. 13/986,211, both filed on Apr. 13, 2013, both of which claim priority from and are a Continuation-In-Part patent application of previously filed U.S. application Ser. No. 12/586,374, filed Sep. 20, 2009, now U.S. Pat. No. 8,547,435, issued Oct. 1, 2013. This application also claims priority from and the benefit of U.S. Provisional Application Ser. No. 61/959,837, filed on Sep. 1, 2013, which is incorporated herein by reference. This application also claims priority from and the benefit of U.S. Provisional Application Ser. No. 61/959,828, filed on Sep. 1, 2013, which is incorporated herein by reference. This application also incorporated herein application Ser. No. 14/147,580, filed on Jan. 5, 2014 by reference.

BACKGROUND OF THE INVENTION

1. Field of the Invention

The invention relates generally to the field of surveillance and specifically to the field of mobile video security. More particularly, the present invention relates to vehicle safety and accident detection.

2. Description of the Background Art

The evidentiary recording of video is used in some commercial vehicles and police cruisers. These systems cost several thousand dollars and also are very bulky to be installed in regular cars, as shown in FIGS. 1 and 2. Also, there are certain video recording systems for teenager driving supervision and teenager driver analytics that is triggered by certain threshold of acceleration and deceleration and records several second before and after each such trigger. In today's accidents, it is not clear who is at fault, because each party blames each other as the cause of accident, and police, unless accident happened to be actually observed by the police simply fills accident reports, where each party becomes responsible for their own damages. Driving at the legal limit causes tail gating, and other road rage, and later blaming the law-abiding drivers. Also, there is exposure to personal injury claims in the case of pedestrian's jay walking, bicycles going in the wrong direction, red light runners, etc. Witnesses are very hard to find in such cases.

A vehicle video security system would provide evidentiary data and put the responsibility on the wrongful party and help with the insurance claims. However, it is not possible to spend several thousand dollars for such security for regular daily use in cars by most people.

A compact and mobile security could also be worn by security and police officers for recording events just as in a police cruiser. A miniature security device can continuously record daily work of officers and be offloaded at the end of each day and be archived. Such a mobile security module must be as small as an iPod and be able to be clipped on the chest pocket where the camera module would be externally visible. Such a device could also be considered a very compact, portable and wearable personal video recorder that could be used to record sports and other activities just as a video camcorder but without having to carry-and-shoot by holding it, but instead attaching to clothing such as clipping.

Mobile Witness from Say Security USA consists of a central recording unit that weighs several pounds, requires external cameras, and records on hard disk. It uses MPEG-4 video compression standard, and not the advanced H.264 video compression. Some other systems use H.264 but record on hard disk drive and have external cameras, and is quite bulky and at cost points for only commercial vehicles.

Farneman (US Patent Application 20060209187) teaches a mobile video surveillance system with a wireless link and waterproof housing. The camera sends still images or movies to a computer network for viewing with a standard web browser. The camera unit may be attached to a power supply and a solar panel may be incorporated into at least one exterior surface. This application has no local storage, does not include video compression, and continuously streams video data.

Cho (US Patent Application 20030156192) teaches a mobile video security system for use at the airports, shopping malls and office buildings. This mobile video security system is wireless networked to central security monitoring system. All of security personnel carry a wireless hand held personal computer to communicate with central video security. Through the wireless network, all of security personnel are capable to receive video images and also communicate with each other. This application has no local storage, does not include video compression, and continuously streams video data.

Szolyga (U.S. Pat. No. 7,319,485, Jan. 15, 2008) teaches an apparatus and method for recording data in a circular fashion. The apparatus includes an input sensor for receiving data, a central processing unit coupled to the buffer and the input sensor. The circular buffer is divided into different sections that are sampled at different rates. Once data begins to be received by the circular buffer, data is stored in the first storing portion first. Once the first storage portion reaches a predetermined threshold (e.g. full storage capacity), data is moved from the first storage portion to the second portion. Because the data, contents of the first storage portion are no longer at the predetermined threshold, incoming data can continue to be stored in the first storage portion. In the same fashion, once the second storage portion reaches a predetermined threshold, data is moved from the second storage portion to the third storage portion. Szolyga does not teach video compression, having multiple cameras multiplexed, removable storage media, video preprocessing for real-time lens correction and video performance improvement and also motion stabilization.

Mazzilli (U.S. Pat. No. 6,333,759, Dec. 2055, 2001) teaches 360 degree automobile video camera system. The system consists of camera module with multiple cameras, a multiplexer unit mounted in the truck, and a Video Cassette Recorder (VCR) mounted in trunk. Such a system requires extensive wiring, records video without compression, and due to multiplexing of multiple video channels on a standard video, it reduces the available video quality of each channel.

Existing systems capture video data at low resolution (CIF or similar at 352×240) and at low frame rates (<30 fps), which results in poor video quality for evidentiary purposes. Also, existing systems do not have multiple cameras, video compression, and video storage not incorporated into a single compact module, where advanced H.264 video compression and motion stabilization is utilized for high video quality. Furthermore, existing systems are at high cost points in the range of $1,000-$5,000, which makes it not practically possible to be used in consumer systems and wide deployment of large number of units.

Also, the video quality of existing systems is very poor, in addition to not supporting High Definition (HD), because motion stabilization and video enhancement algorithms such as Motion-Adaptive spatial and temporal filter algorithms are not used. Furthermore, most of the existing systems are not connected to the internet with fast 3G or 4G wireless networks, and also do not use adaptive streaming algorithms to match network conditions for live view of accident and other events by emergency services or for fleet management from any web enabled device.

Automatic Severe Accident Detection

The high demand of automobiles has also increased the traffic hazards and the road accidents. Currently, some of the high-end cars have automatic severe accident systems, but these are only impact based, and do not have the capability to transmit video accident information, and also do not connect to the Internet Protocol (IP) based emergency service centers.

In a head-on collision, Newton's third law dictates that the forces on the vehicles are equal but opposite in direction, for example in a truck colliding with a smaller vehicle as shown in FIG. 14. Impulse is force multiplied by time, and time of contact is the same for both, so the impulse is the same in magnitude for the two vehicles. Change in momentum is equal to impulse, so changes in momenta are equal. With equal change in momentum and smaller mass, the change in velocity is larger for the smaller truck. Since acceleration is change in velocity over change in time, the acceleration is greater for the smaller vehicle.

Increasing the time interval during which the momentum of an occupant of a car changes from some initial value to zero is also the way to reduce injuries in car accidents. Let us look at a particular accident. An 800 kg car driving at 60 miles/h or 26.8 m/s loses traction in a curve and hits the wall of a house. When it hits, it has slowed down to 40 miles/h or 17.9 m/s. It breaks through the wall and comes to rest in the living room, 2 m from the wall.

For the car's speed to decrease from 17.9 m/s to 0 over a distance of 2 m the magnitude of its average acceleration must be 80 $m/s^2$=8.2 g with g=9.8 $m/s^2$. This will take 0.22 s. The momentum of a driver with m=60 kg changes 60 kg*17.9 m/s=1074 Ns to zero in 0.22 s. The average force acting on the 60 kg driver over the 0.22 s time interval is F=m*a=4806 N if he wearing a seat belt and is securely strapped into his car seat. This is probably a survivable accident.

If the driver does not wear a seatbelt, he will initially keep on moving forward at 17.9 m/s. In 0.1 seconds he will have covered a distance of approximately 1.8 m. The distance the car has covered in 0.1 s is approximately 1.4 m. If he sits initially 40 cm from the steering wheel, then his body will slam into the wheel and his head will slam into the windshield after approximately 0.1 s. The car has slowed down, and the car's speed after 0.1 s is approximately 9.9 m/s, so the driver slams into the steering wheel with a relative speed of 17.9 m/s–9.9 m/s=8 m/s=18 miles/h. If after an additional 0.02 seconds he travels with the speed of the car, v=8.3 m/s, then his momentum has changed from p=60 kg*17.9 m/s to p=60 kg*8.3 m/s in 0.02 s. This requires a force of 28800 N and an acceleration of 49 g. Now the accident is probably no longer survivable. Wearing a seat belt increases the collision time for the driver and therefore reduces the force acting on him during the collision.

In an after-market device, the first challenge is detecting accident without electronic control unit interaction. Conventional in-vehicle accident detection systems rely on sensor networks throughout the car and direct interaction with the vehicle's electronic control units (ECUs). These sensors detect acceleration/deceleration, airbag deployment, and vehicular rollover [7, 8]. Metrics from these sensors aid in generating a detailed accident profile, such as locating where the vehicle was struck, number of times it was hit, severity of the collision, and airbag deployment.

The second challenge is to prevent false positives. Vehicle-based accident detection systems monitor a network of sensors to determine if an accident has occurred. Instances of high acceleration/deceleration are due to a large change in velocity over a very short period of time. These speeds are hard to attain if a vehicle is not controlled by a human driver, which simplifies accident detection since we can assume any instance of high acceleration constitutes a collision involving human drivers. Since after-market devices are portable, however, it is not as hard to attain such speeds. For instance, it is not hard to drop an after-market device from six feet in the air, but dropping a vehicle from that height would require significantly more effort. In the event of an accident, the after-market device will experience the same forces and accelerations experienced by the occupants of the vehicle. Moreover, if the after-market device remains stationary relative to the vehicle during the collision, it is possible to use the data gathered from it to recreate and model the forces it experienced, because the forces that are experienced in the cabin of a vehicle are less than the front-end of the vehicle, for example.

The accident sensors currently used in high-end vehicles are designed as so-called acceleration sensors. In the event of an accident, they detect the acceleration or deceleration that occurs upon impact. If the acceleration or deceleration exceeds a critical value, motor-vehicle safety devices, such as seat-belt tighteners or airbags, are triggered. Usually, a plurality of acceleration sensors is mounted to the motor vehicle, with each acceleration sensor detecting the acceleration or deceleration in one spatial direction for detecting a front or side impact, as well as rolling of the vehicle.

Hans et al. (USPTO Application 20040144587) filed Jan. 20, 2004, Mark Cuddihy et al. (USPTO Application 20050040937) filed Sep. 14, 2005, and Satoru Ooga (USPTO Application 20090015684) filed on Jul. 11, 2008 discuss a crash notification system for an automotive vehicle as follows: A crash notification system for an automotive vehicle is used to communicate with a communication network and ultimately to a response center. The system within vehicle includes an occupant sensor that generates an occupant sensor status signal. A crash sensor, a vehicle identification number memory, or a vertical acceleration sensor may also be used to provide information to the controller. The controller generates a communication signal that corresponds to the occupant sensor status signal and the other information so that appropriate emergency personnel may be deployed.

U.S. Pat. No. 7,119,669 by Lundsgaard, et al. and issued on Oct. 10, 2006 is for a method and apparatus for detecting vehicular collisions. It discloses a portable electronic device, like a cellular telephone is capable of detecting collisions between vehicles and notifying the proper authorities. The device includes a microprocessor and memory, in addition to an accelerometer and global positioning systems receiver. The memory includes at least one filter for screening out false positives, which are false collision detections. In one embodiment, the device determines its velocity. It then checks to see if its velocity falls within a range associated with moving vehicles. If so, the device monitors the accelerometer. When acceleration values in excess of a predetermined threshold are detected, the device pauses and again checks its velocity. If the velocity has fallen from the range associated with moving vehicles to a range associated with a vehicle that has sustained a collision, the device notifies emergency personnel that a collision has occurred.

U.S. Pat. No. 6,922,137 by Bycroft and issued on Jul. 26, 2005 is for a collision and theft alert system. It discloses a collision and theft alert system comprising several components in combination. First provided is a vehicle having a keypad and a power source. A processor is operatively coupled to the power source and to the keypad and is capable of receiving an incoming signal and sending an outgoing signal. The processor can activate an emergency distress call with GPS location. The processor also is operatively coupled to and activates at least one strobe light, which is operatively coupled to the vehicle. The strobe light has a non-deployed state and a deployed state.

U.S. Pat. No. 6,487,500 by Lemelson, et al. and issued on Nov. 26, 2002 is for a GPS vehicle collision avoidance warning and control system and method. It discloses a GPS satellite ranging signals received on comm1, and DGPS auxiliary range correction signals and pseudo lite carrier phase ambiguity resolution signals from a fixed known earth base station received at one of a plurality of vehicles/aircraft/automobiles are computer processed to continuously determine the one's kinematic tracking position on a pathway with centimeter accuracy.

US Patent Application 20080195261 by David Breed filed on Oct. 25, 2007 is for an arrangement for a vehicle including a sensor system arranged on the vehicle for sensing an event requiring an emergency response, a location determining device for determining the location of the vehicle, a communication device arranged on the vehicle for automatically communicating to a remote location when an event has occurred that the event has occurred and providing the remote location with the determined location of the vehicle, and a power source for providing power for the sensor system, the location determining device and the communication device. The communication device communicates to the remote location upon occurrence of the event. The location determining device may be arranged partially or entirely on the vehicle or elsewhere. The remote location may be an emergency response center which can direct aid to the vehicle's location.

US Patent Application 20080195261 by David Breed is for a method and system for deploying an occupant restraint device in a vehicle includes arranging a sensor to detect a rear impact and deploying the occupant restraint device when the sensor detects the rear impact of sufficient magnitude to require deployment of the occupant restraint device to prevent injury to the occupant. The sensor may be a crush sensor which preferably extends across a major portion of the rear of the vehicle, an inertial sensor and/or an anticipatory sensor.

US Patent Application 20050275522 by Karl Nitz et al. filed on May 28, 2004 is for a localized accident notification system includes an accident detector that detects a crash of a vehicle and an external alert system to provide an external alert by the vehicle that can be noticed by any people in the vicinity of the crash. Upon an indication of a crash from the accident detector a controller can direct the external alert. The external alert can have special notification properties. The accident detector may only operate if the vehicle ignition is on to discriminate from a theft alarm. The accident detector can include accelerometers, air bag detectors, or tilt sensors.

US Patent Application 20050030224 by Robert Koch et al. filed on Aug. 7, 2003 is for methods, systems and mobile terminals for vehicle crash detection using a positioning system. A vehicle crash is detected by detecting a crash condition of the vehicle using a Positioning System (PS) receiver (such as a Global Positioning System (GPS) receiver) on the vehicle. A wireless emergency signal may be generated responsive to detection of the crash condition using the PS receiver.

OnStar For-My-Vehicle (FMV) provides an after-market device by General Motors (GM) for automatic collision detection and notification. This device requires the use of a call-center, which requires $200 annual fees to be paid by user. More importantly, this device uses call center communication, which then have to be relayed to an emergency service center. This causes missing and inaccurate information, and significantly delays in such a relay of information, which in 15 percent of the accident lives to be lost due to delays in getting emergency services due to the indirection and delays in relaying of the information. Furthermore, sometime based on driving style there are false triggers of emergency. In addition, only accelerometers are used without any context information, and gyroscope and free-fall and roll-over sensing is not utilized. Moreover, no video information about accident is provided, which results in call-center personnel to continuously and repetitively seek info from the vehicle driver: Did the ambulance arrived? Did the police arrive? Did the ambulance arrive? Did the police arrive?

US Patent Application 20130006469 filed on Sep. 23, 2011 by Green et al discloses a system and method for automatic traffic accident determination and notification. A vehicle status awareness system includes one or more devices which are plugged into a cigarette lighter socket for a vehicle to receive power and are thereby fixed in position relative to the vehicle. The devices include movement sensors which indicate changes in movement of the vehicle, a position sensor which indicates a position of the vehicle, a communications device to send and receive data to and from a remote device, and a control unit. The control unit is programmed to receive and store program parameters, determine a location of the vehicle, determine a movement status of the vehicle based on a plurality of status criteria further comprising accident threshold settings, and transmit one or more of the program parameters, vehicle location, and movement status to the remote device. When deceleration with more than 3Gs is detected and speed change delta is more than 3 mph speed change an accident is reported. Green also uses sound analysis using a microphone that is consistent with airbag deployment and to confirm accident readings via other device sensors before reporting an accident. A set of acceleration readings may be averaged and filtered for any of various reasons. It is also not clear how change in speed is calculated and if it includes rear-end collision cases, where a stationary vehicle is hit from behind.

US Patent Application 20130069802 on Sep. 20, 2011 by Foghel et al discloses a system for a system for detecting a car accident and alerting emergency forces to an accident, including a smart mobile device having an accelerometer, a GPS unit, a processor connected thereto. The processor receives real time readings of measurement values received from the accelerometer and the GPS unit, runs a dedicated application to detect the occurrence of a car accident according to the readings received within a period of time, and generates an alert signal when an accident is detected. The system also includes a memory connected to the accelerometer, the GPS unit and the processor, to store the measurement values and information for a predetermined period of time, and a transmitter connected to the processor and the memory to send the alert signal and the measurement values and information stored within the memory. The system also includes a base station including a receiver, and a unit for alerting emergency forces. Foghel checks first if the acceleration is greater than a threshold value, and secondly checks if there is motion after 5 seconds, or if altitude changed more than 1.5 meter in relation to altitude at trigger time. Foghel also checks if the car is in motion during the first 5 minutes or after 5 minutes. Foghel also checks if distance travelled after trigger is less than 0.7 times the breaking distance, which is $V^2/(254*\text{friction\_coefficient})$, where friction coefficient is about 0.7 in value for a regular dry road condition. However, based on the weather road conditions may vary significantly from black ice to wet and slippery road when the raining initially started. This makes Foghel's estimates inaccurate. Also, the vehicle may not be still after 5 seconds since another vehicle the first vehicles involved in an accident.

US Patent Application 20120164968 filed on Dec. 22, 2010 by Velusamy et al discloses an approach for configuring a mobile device to enable accident detection and notification functionality for use within a vehicle is described. An emergency notification platform receives position information and acceleration information associated with a mobile device. The emergency notification platform applies a rule to the position information and the acceleration information to determine an alert condition. A notification message is then generated for presentation on the mobile device based on the application of the rule, wherein the notification message specifies information relating to the alert condition. Velusamy gets ready to contact emergency services when acceleration exceeds trigger threshold, and provides the uses a time window to cancel reporting in false positive trigger cases.

US Patent Application 20140019167 filed on Jan. 16, 2014 by Cheng et al discloses a insurance risk rating system includes a driver sensor that obtains driver behavior data by monitoring at least one of the driver's head and one or more of the driver's eyes, a processing unit that compares the driver behavior data with reference data that relates the driver behavior data to loss data, and a risk rating unit that assigns a risk rating to the driver based on a result of the comparison by the processing unit.

DriveCam provides a unit for driver analytics that captures video when a trigger event such as acceleration occurs, which is otherwise not recording. The video is sent to a central office where somebody watches the video and grades the driver. There is no embedded analytics for multiple driver profiles supported. Allstate and other insurance companies sell an OBD-2 plug-in device that collects and sends only four parameters: miles driver, speed exceeding 80 mph, late night driving, and hard braking. This does not provide for accurate driver analytics, because for example, if another vehicle cuts off causing heavy braking without fault of the driver, this will count as a negative point for the driver.

SUMMARY OF THE INVENTION

The present invention provides a compact personal video recorder for applications in mobile and vehicle audio-video security for evidentiary documentation purposes, where a semiconductor non-volatile storage media is used to record audio-video in a continuous record loop. In an embodiment for vehicle video recording, two or more camera sensors are used, where video preprocessing includes Image Signal Processing (ISP) for auto exposure, auto white balance, camera sensor Bayer conversion, real-time lens barrel distortion reduction, motion adaptive spatial and temporal filtering, video motion stabilization, and Adaptive Constant Bit-Rate algorithm defined here as an adaptive streaming method. H.264 video compression is used for improved video quality and reduced storage requirements, and provides for high-resolution capture of multiple channels of standard definition video at 30 fps. An embodiment includes an accelerometer to also record acceleration data, and derived speed data along with audio and multiple channels of video in addition to embedded GPS location and speed data.

BRIEF DESCRIPTION OF DRAWINGS

The accompanying drawings, which are incorporated and form a part of this specification, illustrate prior art and embodiments of the invention, and together with the description, serve to explain the principles of the invention.

Prior art

FIG. 15 shows a first embodiment of present invention using a Motion Adaptive Temporal Filter defined here.

FIG. 16 shows embodiment of present invention using a Motion Adaptive Spatial Filter defined here.

FIG. 24 shows typical G forces experienced depending on a vehicle type.

FIG. 28 shows an example of acceleration values experienced during a fall and acceleration during a sudden stop.

FIG. 40 shows example of severe accident reporting and emergency help request message. FIG. 40(A) shows an example of severe accident reporting, and FIG. 40(B) shows an example of emergency police request message.

FIG. 41 shows driver analytic parameters that are calculated, maintained in non-volatile memory, and reported.

FIG. 42 shows different example driver profiles using different driver analytic parameters.

FIG. 43 shows classification of drivers based on driver types, safety level and attributes.

DETAILED DESCRIPTION

Figure 5:
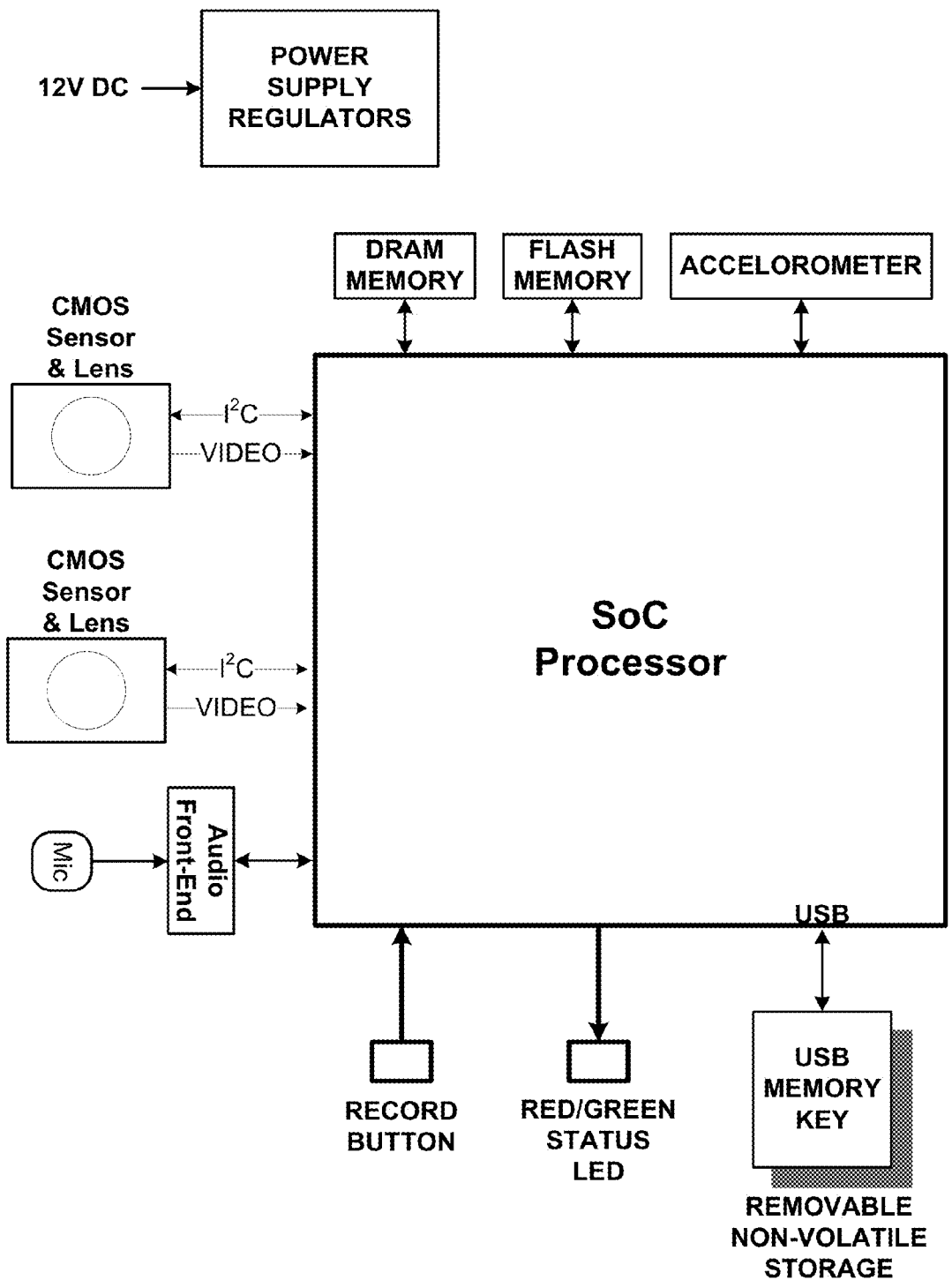
FIG. 5 shows block diagram of an embodiment of present invention with two camera modules and an accelerometer. The video from two cameras can be merged into a single video stream with wider field of view, or handled as two separate video streams.

The present invention provides a compact cell-phone sized vehicle telematics device with one or more cameras embedded in the same package for evidentiary audio-video recording, automatic accident detection and emergency help request, facial processing for drowsiness and distraction accident avoidance, driver analytics, and internet connectivity that is embedded in the vehicle or its mirror, or as an aftermarket device attached to front-windshield. FIG. 5 shows two-camera embodiment of present invention mounted near the front mirror of a vehicle. The compact telematics module can be mounted on the windshield or partially behind the windshield mirror, with one camera facing forward and one camera facing backward, or be embedded in a vehicle, for example as part of the center rear-view mirror.

Figure 1:
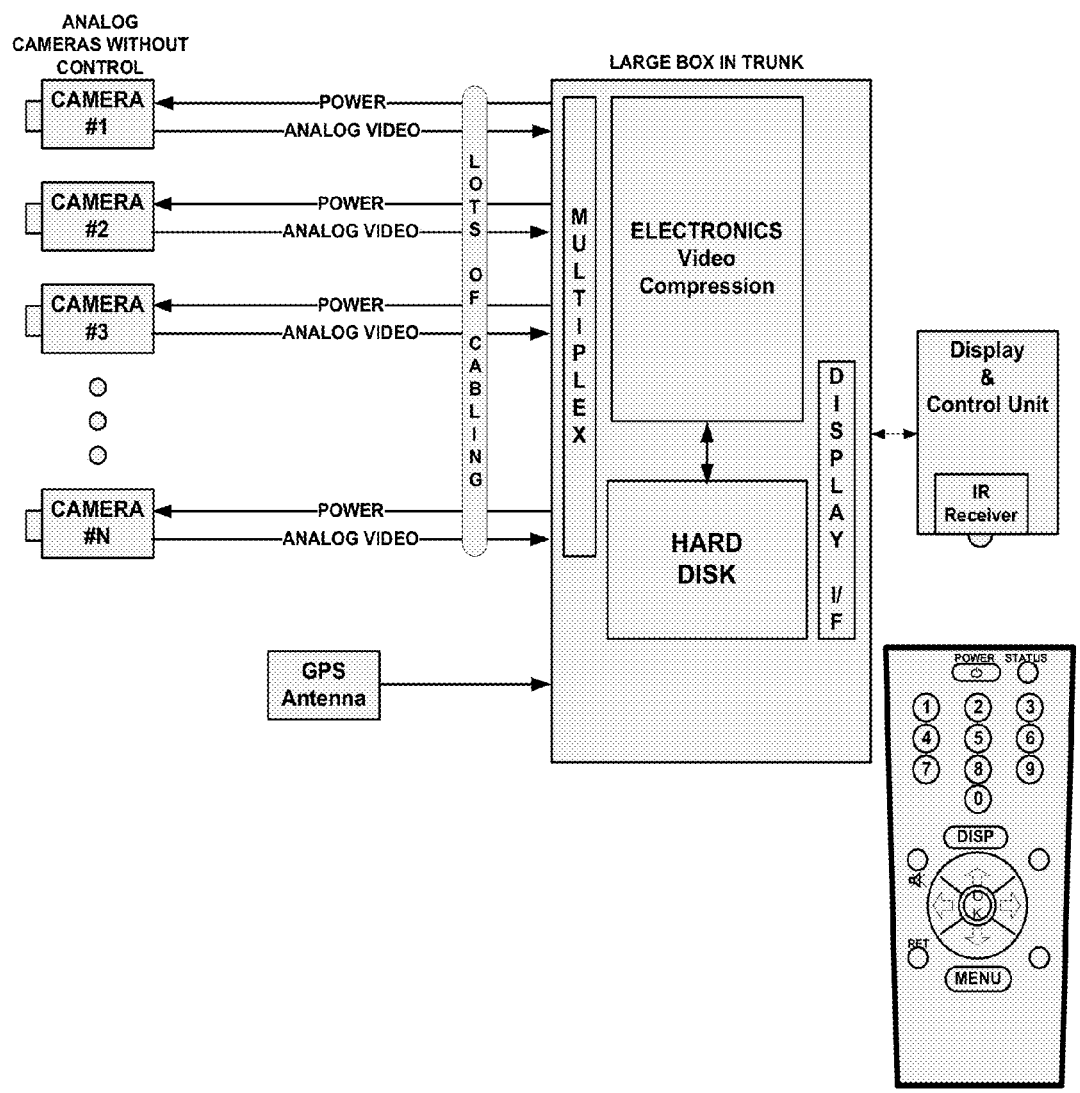
FIG. 1 shows a typical vehicle security system with multiple cameras.
Figure 2:
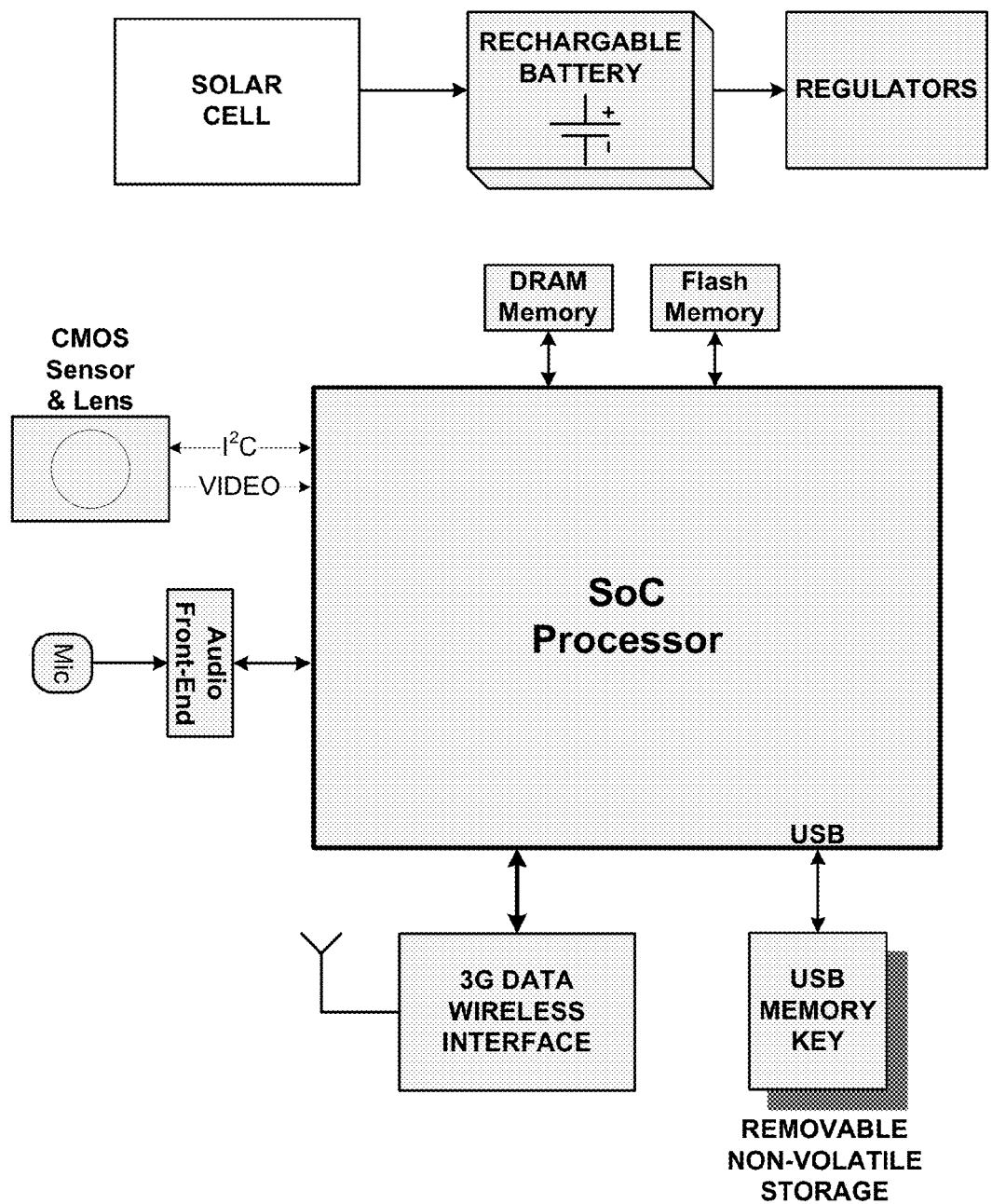
FIG. 2 shows block diagram of an embodiment of present invention using solar cell and only one camera.
Figure 3:
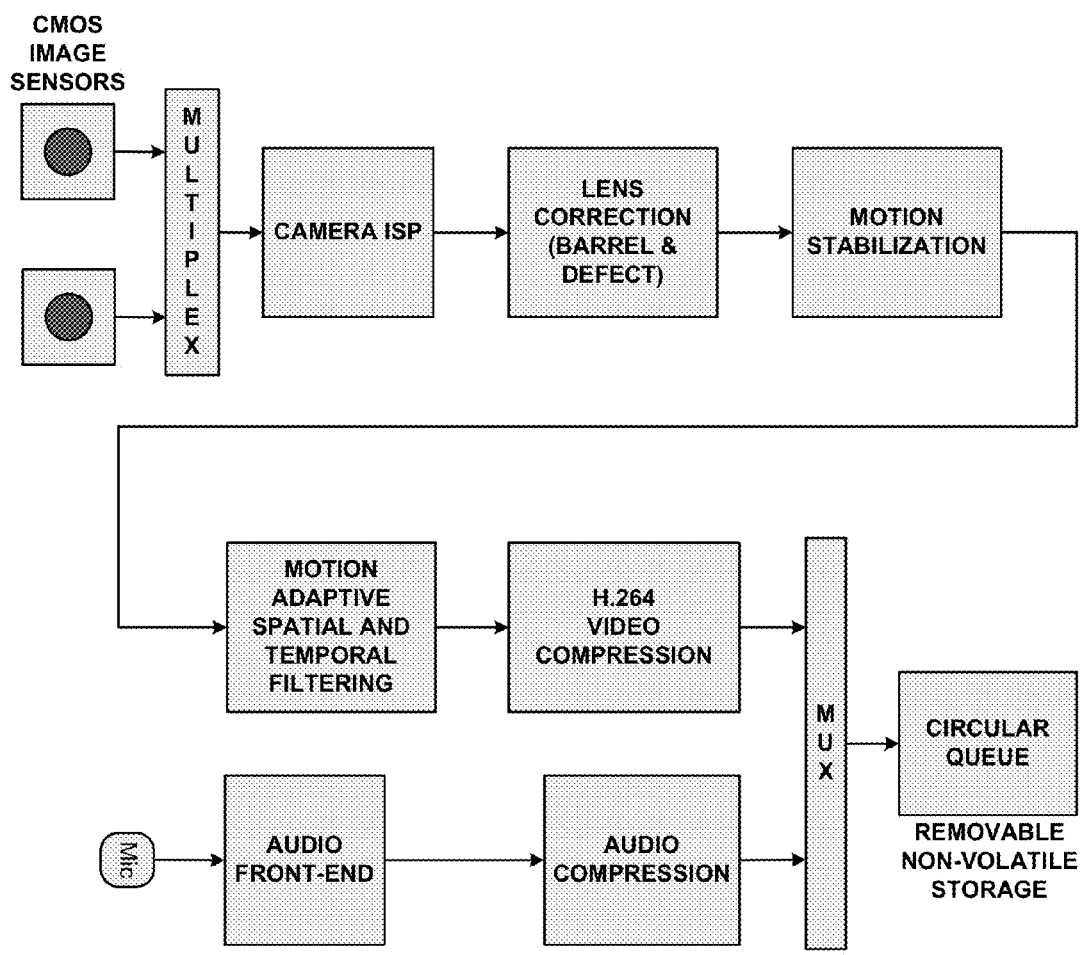
FIG. 3 shows block diagram of an embodiment using video pre-processing with two cameras.

FIG. 2 shows the block diagram of an embodiment of the present invention. The System-on-Chip (SoC) includes multiple processing units for all audio and video processing, audio and video compression, and file and buffer management. A removable USB memory key interface is provided for storage of plurality of compressed audio-video channels.

Another embodiment uses two CMOS image sensors, shown in FIG. 5, uses a SoC for simultaneous capture of two video channels at 30 frames-per-second at standard definition (640×480) resolution. Audio microphone and front-end is also in the same compact module, and SoC performs audio compression and multiplexes the audio and video data together.

Figure 12:
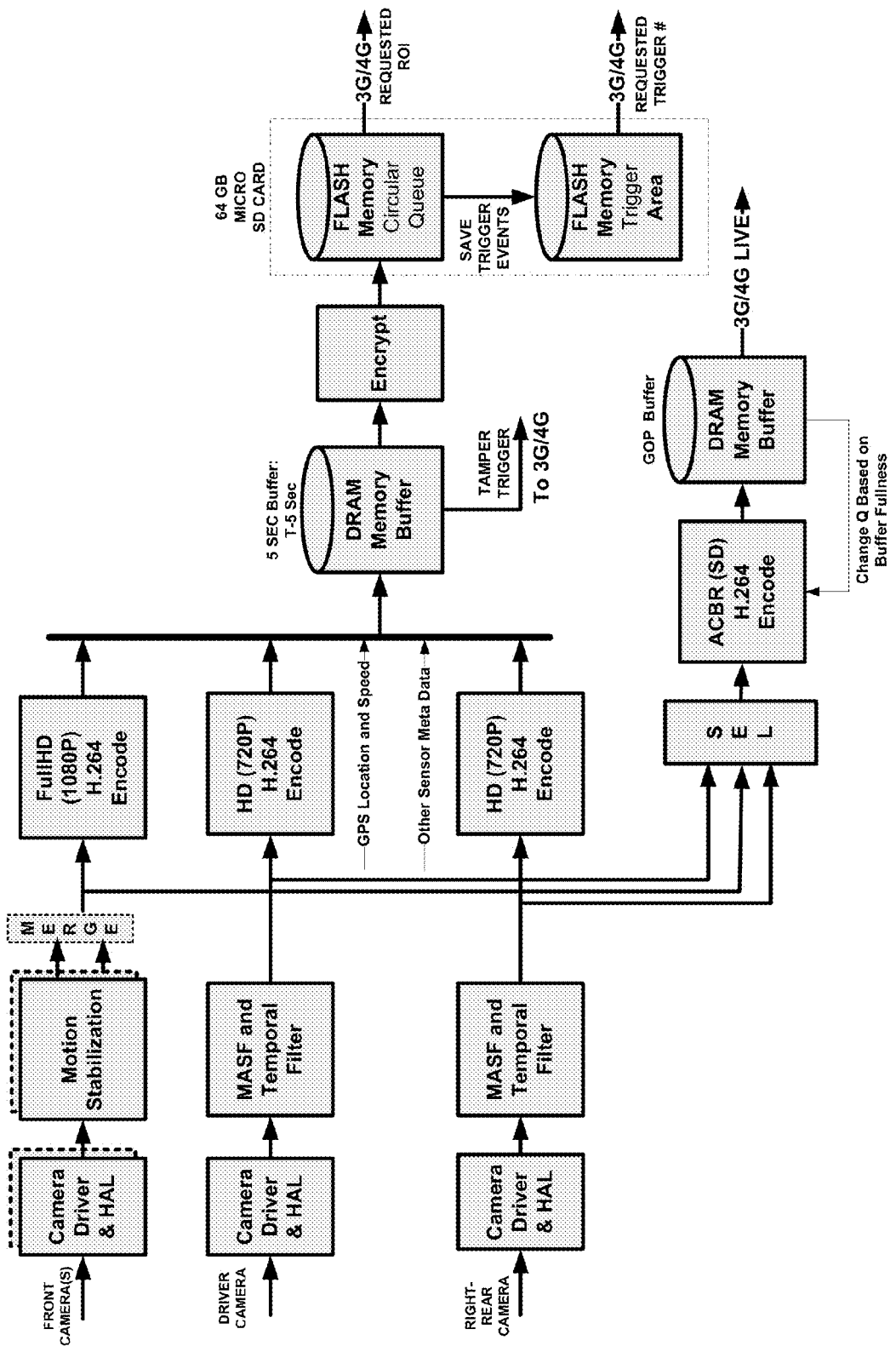
FIG. 12 shows the preferred embodiment of preprocessing and storage stages of video before the facial processing for three-channel video embodiment.
Figure 13:
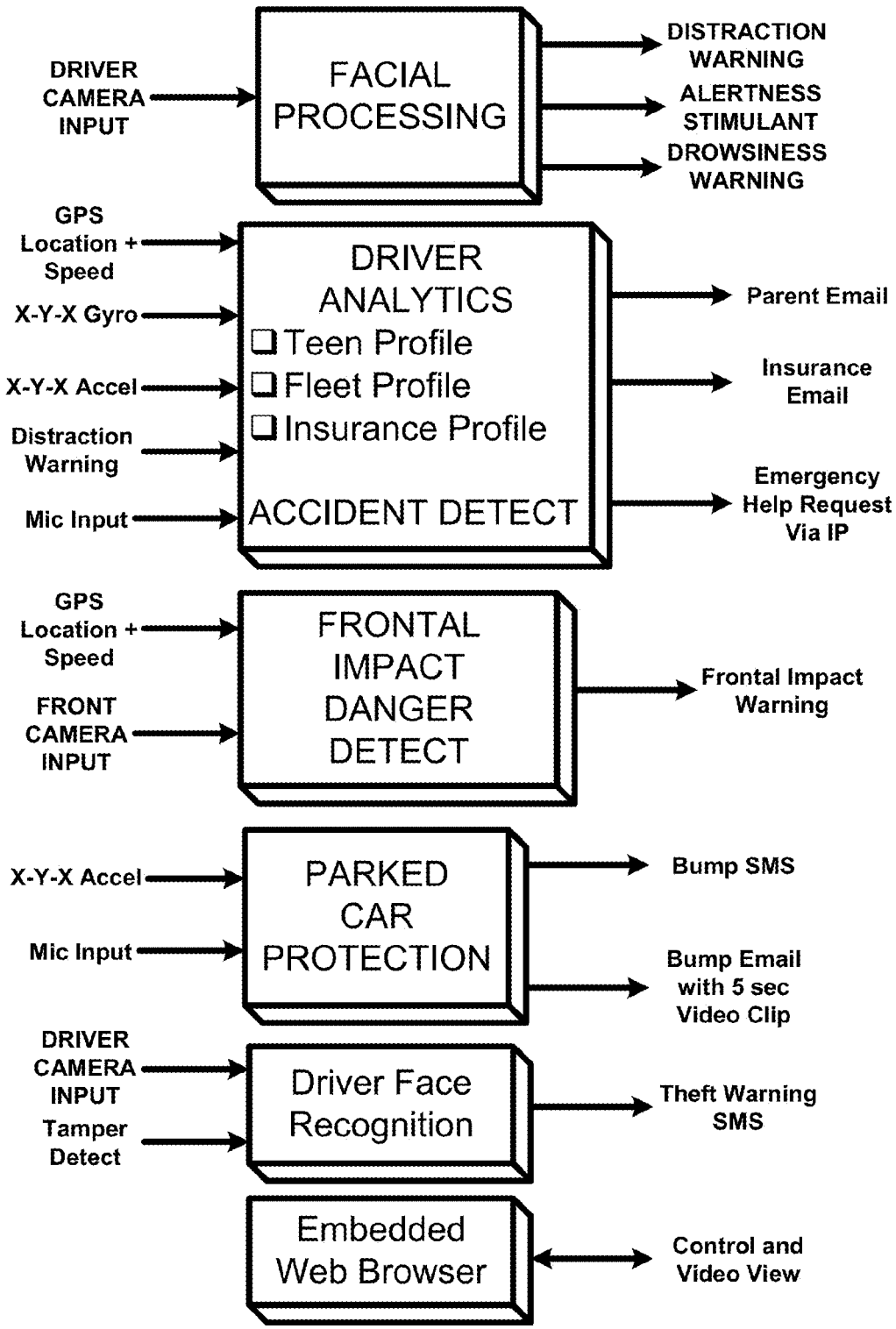
FIG. 13 shows block diagram of data processing for accident avoidance, driver analytics, and accident detection and other vehicle safety and accident avoidance features.

FIG. 12 shows the data flow of an embodiment of the present invention for video pre-processing stages. Each CMOS image sensor output is processed by camera Image Signal Processing (ISP) for auto exposure, auto white balance, camera sensor Bayer conversion, lens defect compensation, etc. In one embodiment there are two or more front view cameras, whose outputs are merged for a wide-angle field of view without distortion, and also such stereo front view provides support with depth information that can be used for distance to an obstacle or other vehicle.

Figure 4:
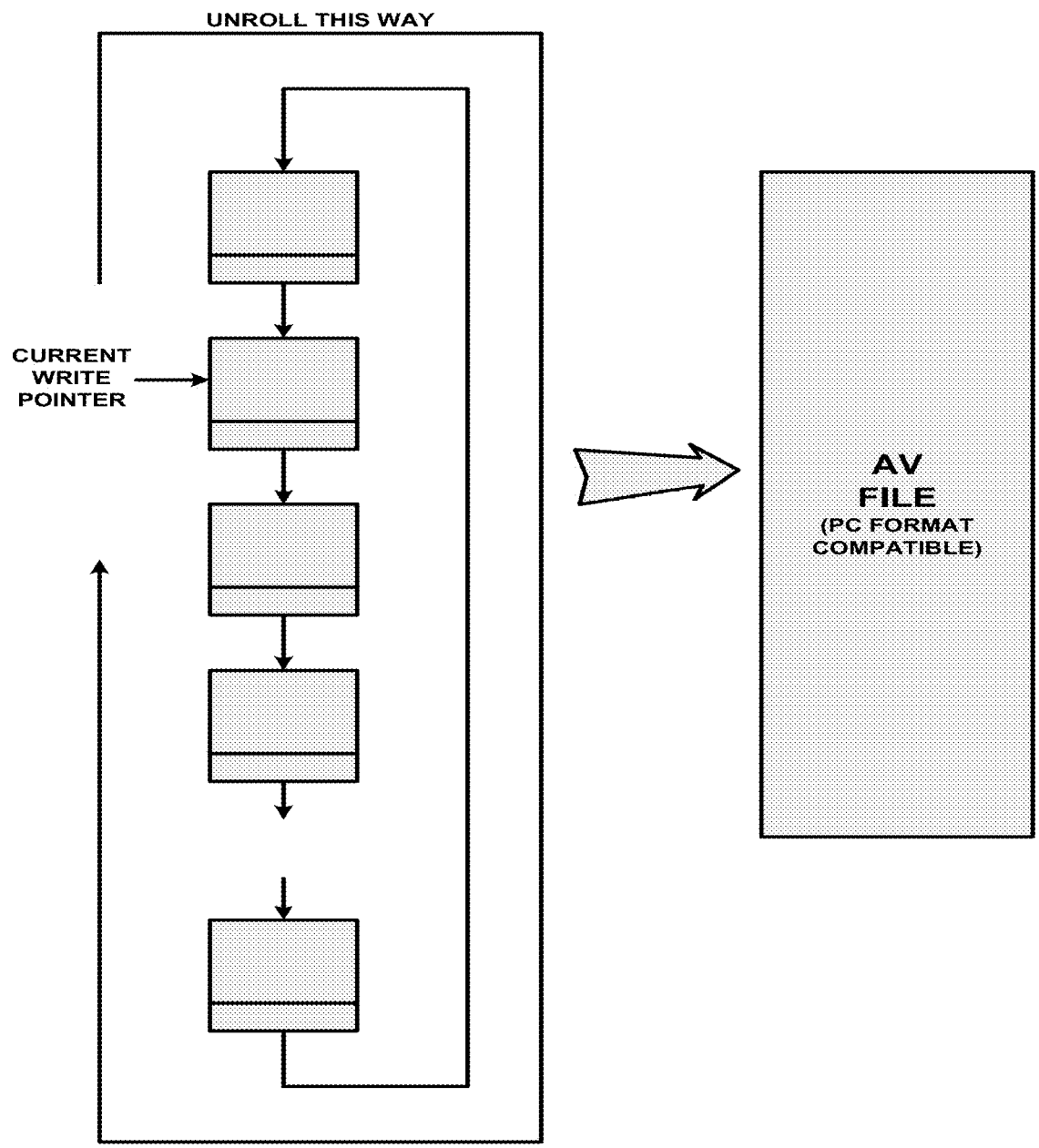
FIG. 4 shows the circular queue storage for continuous record loop of one or more channels of audio-video and metadata.

Motion stabilization removes the motion effects due to camera shake. H.264 is used as the video compression as part of SoC, where H.264 is an advanced video compression standard that provides high-video quality and at the same time reduction of compressed video by a factor of 3-4× over previous MPEG-2 and other standards, but it requires more processing power and resources to implement. The compressed audio and multiple channels of video are multiplexed together by a multiplexer as part of SoC, and stored in a circular queue. The circular queue is located on a removable non-volatile semiconductor storage such a micro SD card, or USB memory key. This allows storage of data on a USB memory key at high quality without requiring the use of hard disk storage. Hard disk storage used by existing systems increases cost and physical size. SoC also performs audio compression, and multiplexes the compressed audio and video together. The multiplex compressed audio-video is stored on part of USB memory key in a continuous loop as shown in FIG. 5. At a typical 500 Kbits/sec at the output of multiplexer for standard definition video at 30 frames-per-second, we have 5.5 Gigabytes of storage required per day of storage. Using a 16 Gigabyte USB memory key could store about three days of storage, and 64 Gigabyte USB memory key can store about 11 days of storage Since the compressed audio-video data is stored in a circular queue with a linked list pointed by a write pointer as shown in FIG. 4, the circular queue has to be unrolled and converted into a file format recognizable as one of commonly used PC audio-video file formats. This could be done, when recording is stopped by pressing the record key by doing post processing by the SoC prior to removal of USB key. Such a conversion could be done quickly and during this time status indicator LED could flash indicating wait is necessary before USB memory key removal. Alternatively, this step could be performed on a PC, but this would require installing a program for this function on the PC first. Alternatively, no unrolling is necessary and audio-video data for one or more channels are sent in proper time sequence as it is being sent over internet using wireless connectivity.

FIG. 2 embodiment of present invention uses a solar cell embedded on a surface of the compact audio-video recorder, a built-in rechargeable battery, and a 3G or 4G data wireless connection as the transfer interface. This embodiment requires no cabling. This embodiment is compact and provides mobile security, and could also be worn by security and police officers for recording events just as in a police cruiser.

Figure 6:
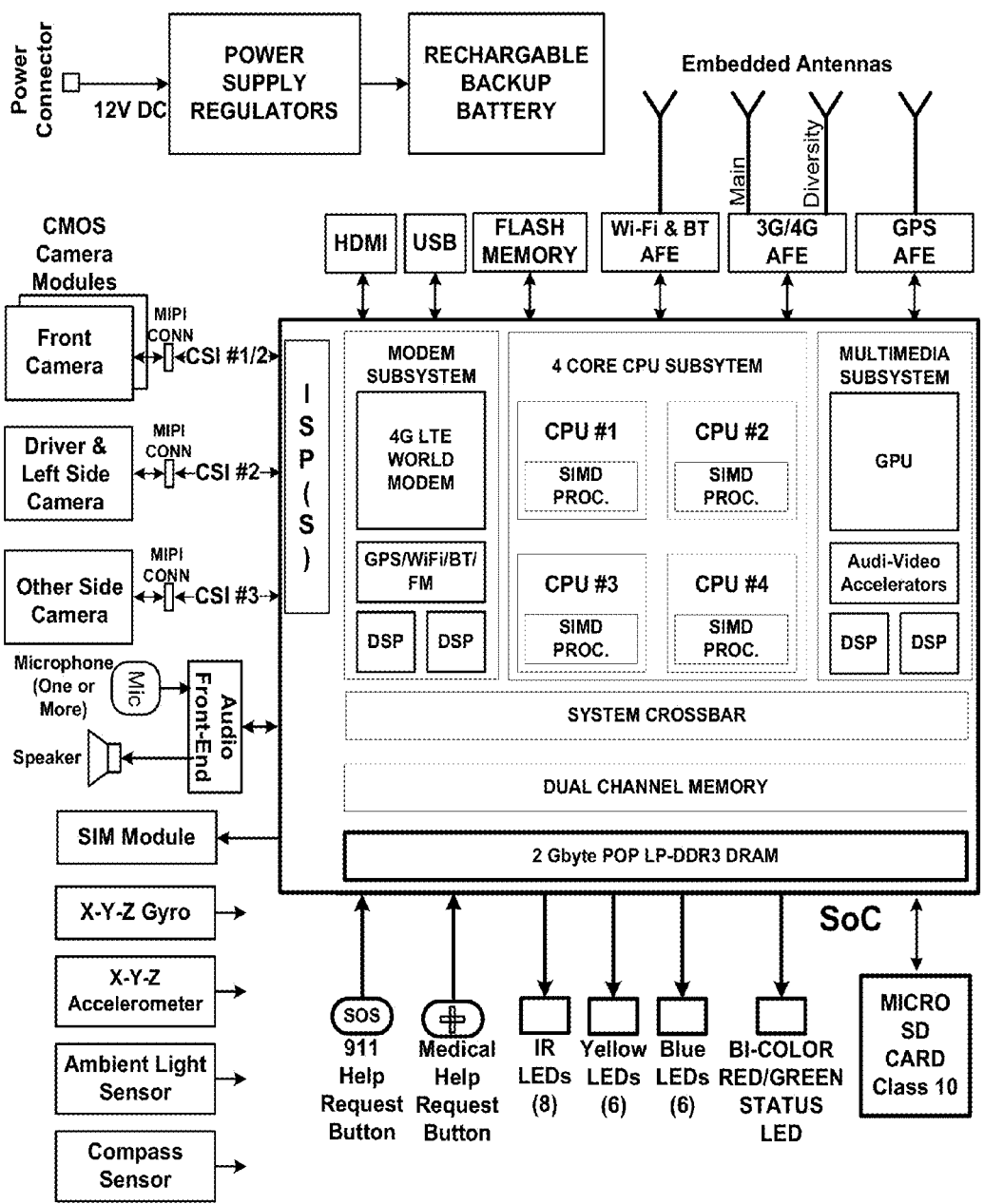
FIG. 6 shows block diagram of a preferred embodiment of the present invention with three or four camera modules and an X-Y-Z accelerometer, X-Y-Z gyro sensor, compass sensor, ambient light sensor and micro-SD card, 3G/4G LTE wireless modem, GPS, Wi-Fi and Bluetooth interfaces built-in, etc.

FIG. 6 embodiment of present invention includes an accelerometer and GPS, using which SoC calculates the current speed and acceleration data and continuously stores it together with audio-video data for viewing at a later time. This embodiment has also various sensors including ambient light sensor, x-y-z accelerometer, x-y-z gyro, and compass sensor, Wi-Fi, Bluetooth and 3G (Third Generation wireless modem), 4G LTE or 5G wireless modem standards for internet connectivity. 4G, short for fourth generation, is the fourth generation of mobile telecommunications technology succeeding 3G. A 4G system, in addition to usual voice and other services of 3G system, provides mobile ultra-broadband Internet access, for example to laptops with USB wireless modems, to smartphones, and to other mobile devices. 5G (5th generation mobile networks or 5th generation wireless systems) denote the next major phase of mobile telecommunications standards beyond the current 4G/IMT-Advanced standards.

This embodiment includes multiple embedded processors, where quad processors with Single-Instruction-Multiple-Data-Stream (SIMD) and Digital Signal Processors (DSPs) coprocessors are used for embedded video processing and video compression. For additional processing resources GPU can also be used for video processing. The package-on-package (POP) technology is used wherein DRAM is placed on top of the System-On-Chip (SoC) shown in FIG. 6. The multiple channels of digital video recorder (DVR) uses micro-SD card with Class 10 rating for storage and circular queue of at least day multi-channel audio-video long storage. Secure Digital (SD) is a non-volatile memory card format for use in portable devices. In one embodiment, the micro SD is a small version of SD card with storage size is 64 Giga Bytes or 128 Giga Bytes used. Two antennas, primary and diversity, are used for 4G LTE connection for ability to connect to internet in marginal reception areas. This way, the present system can connect to communicate emergency message and help request even when a smart phone cannot connect to make a call in cell edge areas.

This embodiment uses Mobile Industry Processor Interface (MIPI) CSI-2 or CSI-3 Camera Serial Interface standards for interfacing to image sensors. CSI-2 also supports fiber-optic connection which provides a reliable way to locate an image sensor away from the SoC.

The SoC also has multiple Image Sensor or Signal Processing (ISP) logic that processes input from each camera input. Even though the latest sensors have high dynamic range, these sensors still have pixel sizes around 1.2 micrometer due to high definition, and as such each pixel has a much smaller area than a security camera CMOS sensor which features a 5-6 micro meter pixel size. Ideally, we want large pixels when the light illumination level is low and small pixels when illumination level is high. This can be handled by combining the "bins" of multiple pixels, such as for a 4×4 array of pixels for areas of sensor where the histogram shows underexposure, i.e., maximum pixel value, is low. Combing the values of an array of pixels effectively generates a large pixel for dark areas while trading off resolution for pixel size effectively. Such an effective method of high-dynamic range implementation can be done as part of ISP preferably or after ISP as a post processing stage.

Figure 7:
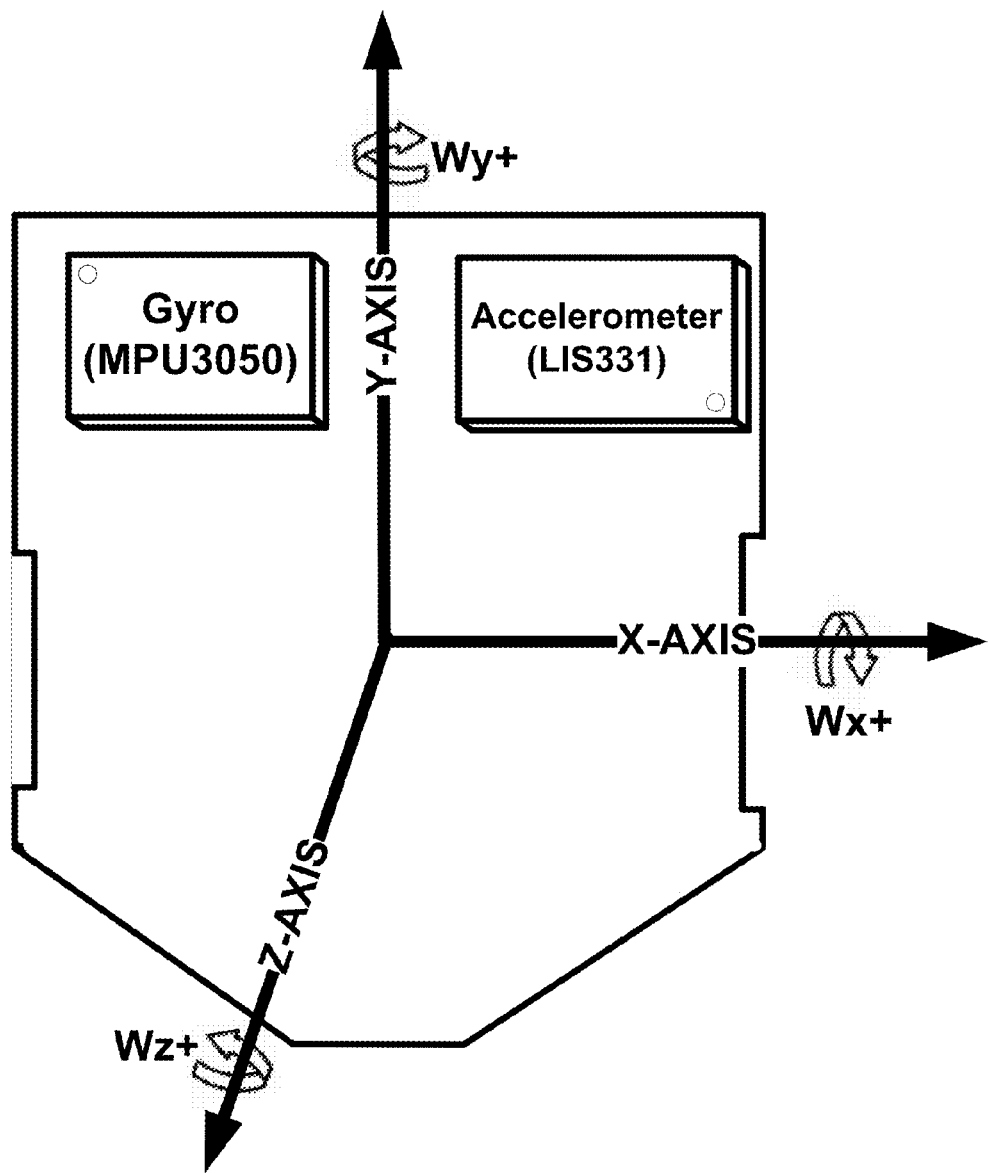
FIG. 7 shows alignment of multiple sensors for proper operation.

FIG. 7 shows the alignment of x-y-z axis of accelerometer and gyro sensors. The gyro sensor records the rotational forces, for example during cornering of a vehicle. The accelerometer also provides free-fall indication for accidents and tampering of unit.

Figure 8:
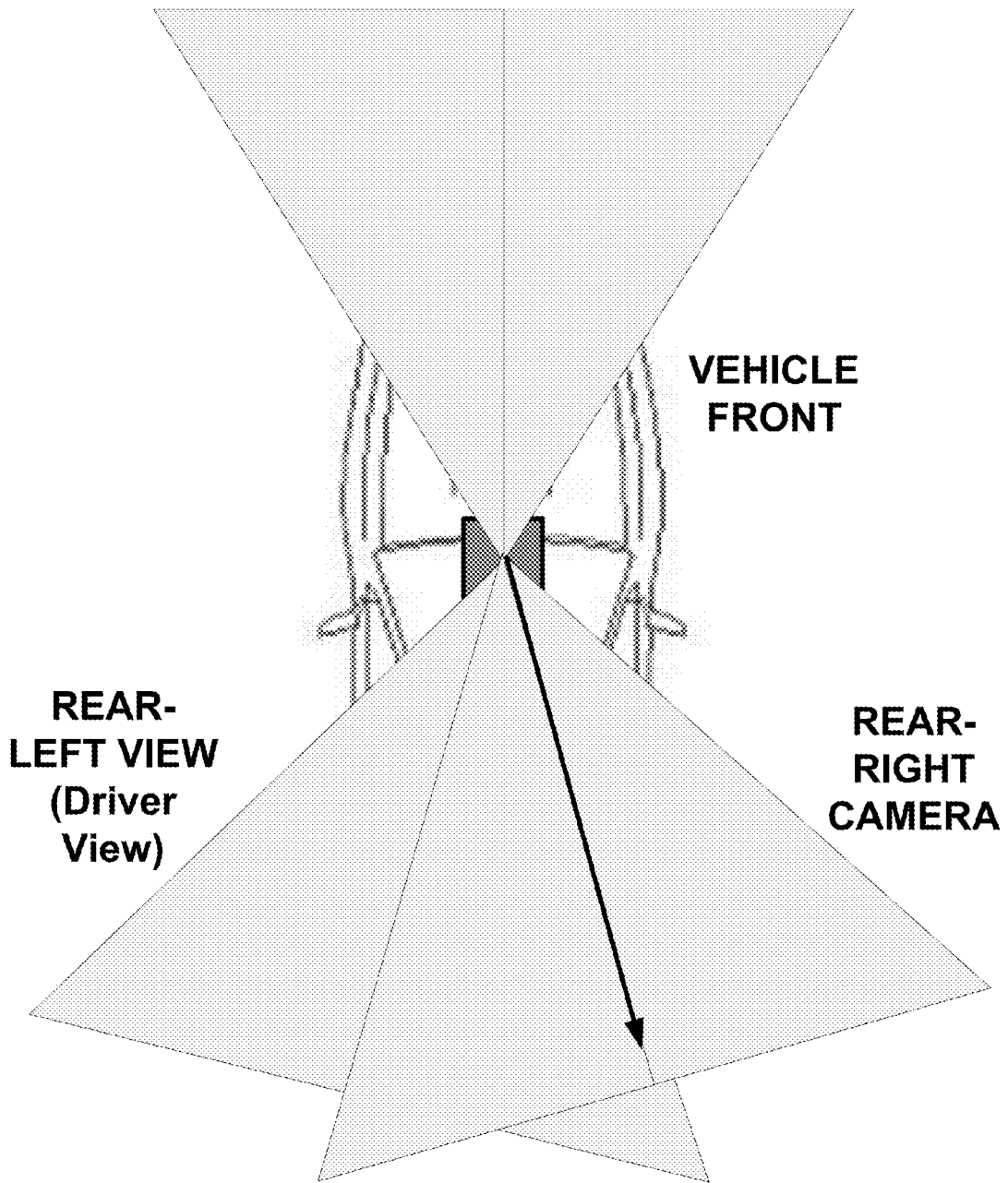
FIG. 8 shows the three camera fields-of-view from the windshield, where one camera module is forward looking, the second camera module looks at the driver's face and also back and left side, and the third camera module looks at the right and back side of the vehicle.
Figure 9:
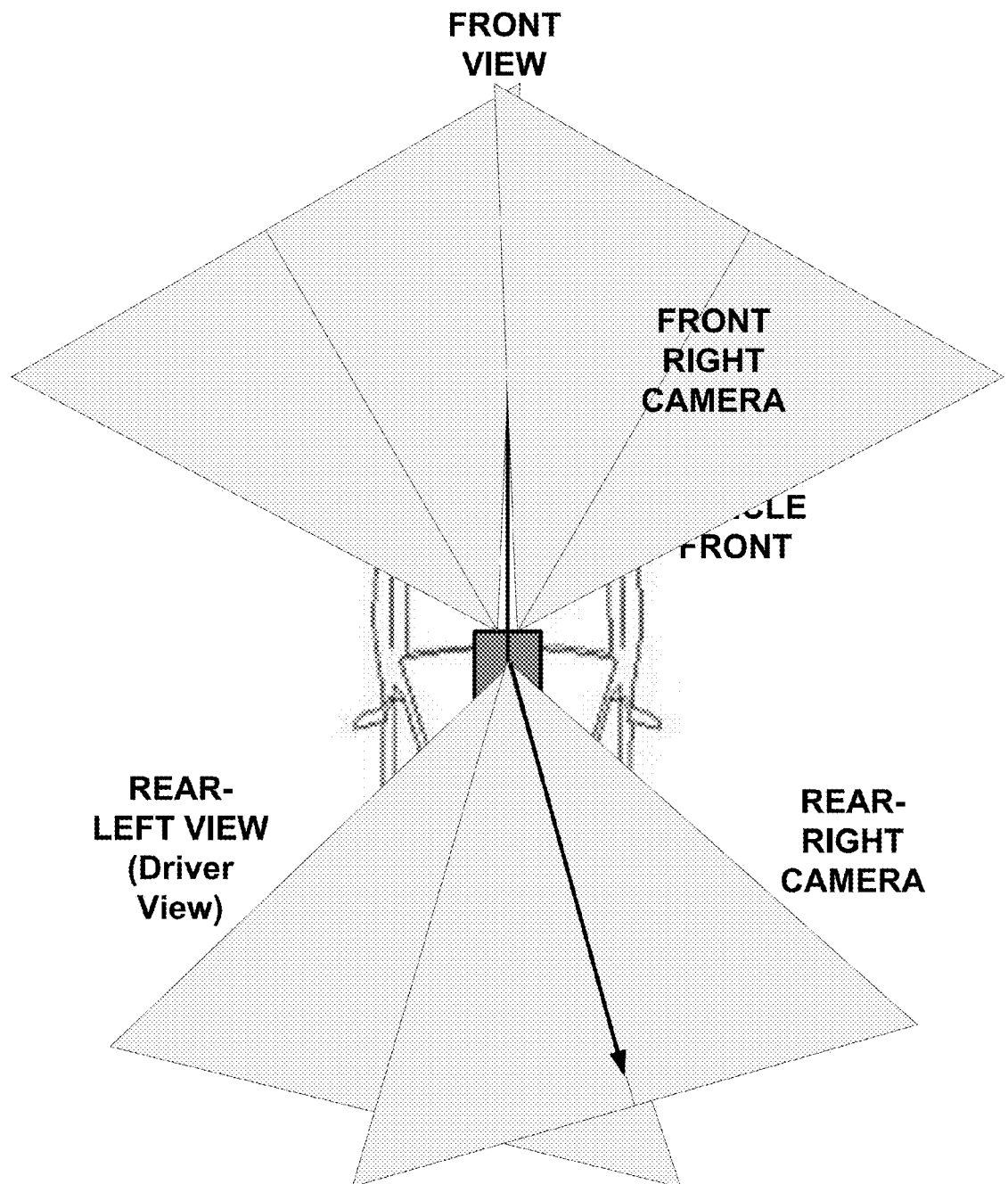
FIG. 9 shows the four camera fields-of-view from the windshield, where two cameras is forward looking, the third camera module looks at the driver's face and also back and left side, and the fourth camera module looks at the right and back side of the vehicle. The two front camera videos are merged into a single wide angle stereophonic video of the front view with depth information and wide HFOV without distortion.

FIG. 8 show three camera module embodiment, where one of the cameras cover the front view, and second camera module processes the face of the driver as well as the left and rear sides of the vehicle, and third camera covers the right side and back area of the vehicle.

Figure 10:
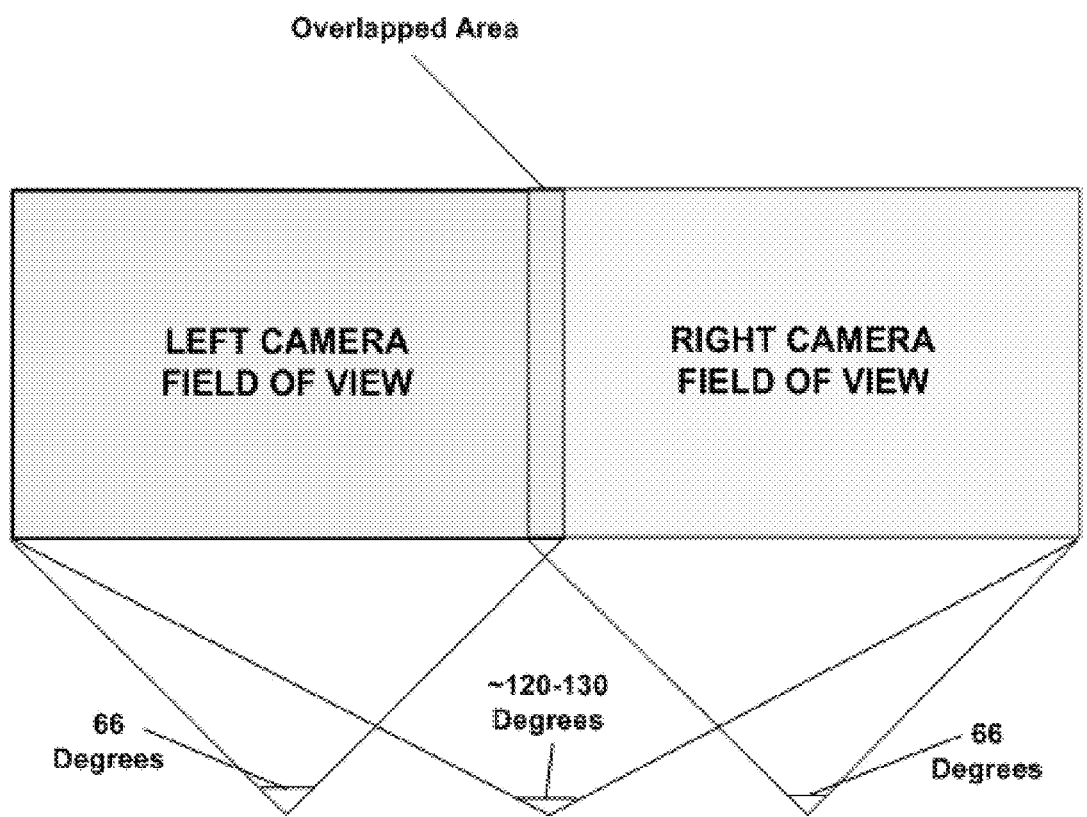
FIG. 10 shows merging of two video streams from the two front-view camera with an overlapped area for smooth transition of the transition area of pixels. The combined HFOV is about 120-130 degrees depending upon the overlap angles and the HFOV of each camera which is exemplified as 66 degrees for this embodiment.
Figure 11:
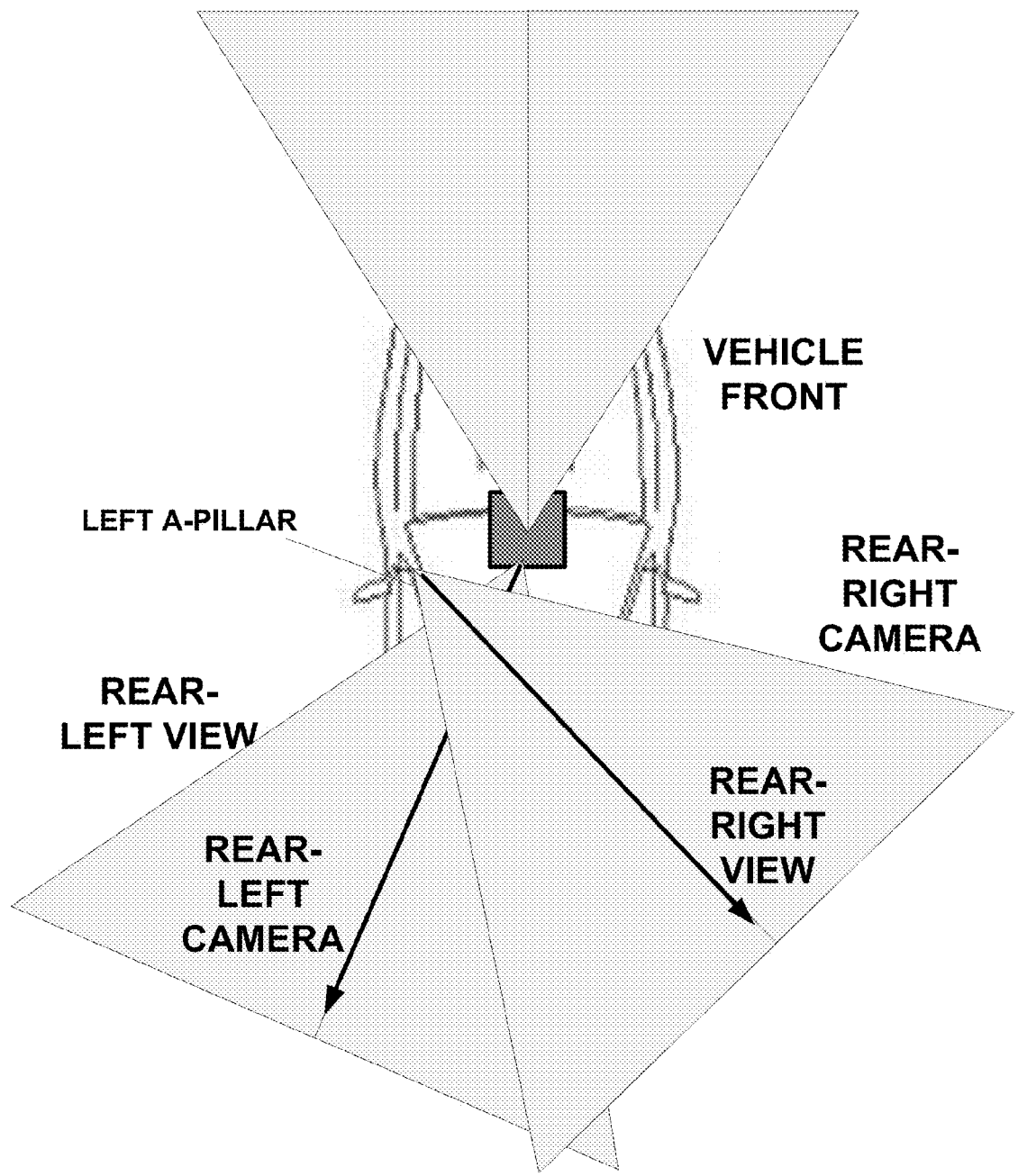
FIG. 11 shows the single front-view camera and two rear-view cameras that are not collocated, where the second of the rear view camera is mounted near or on the A-pillar. This embodiment with two facial processing cameras makes the facial processing for distractions and drowsiness detection more accurate.
Figure 19:
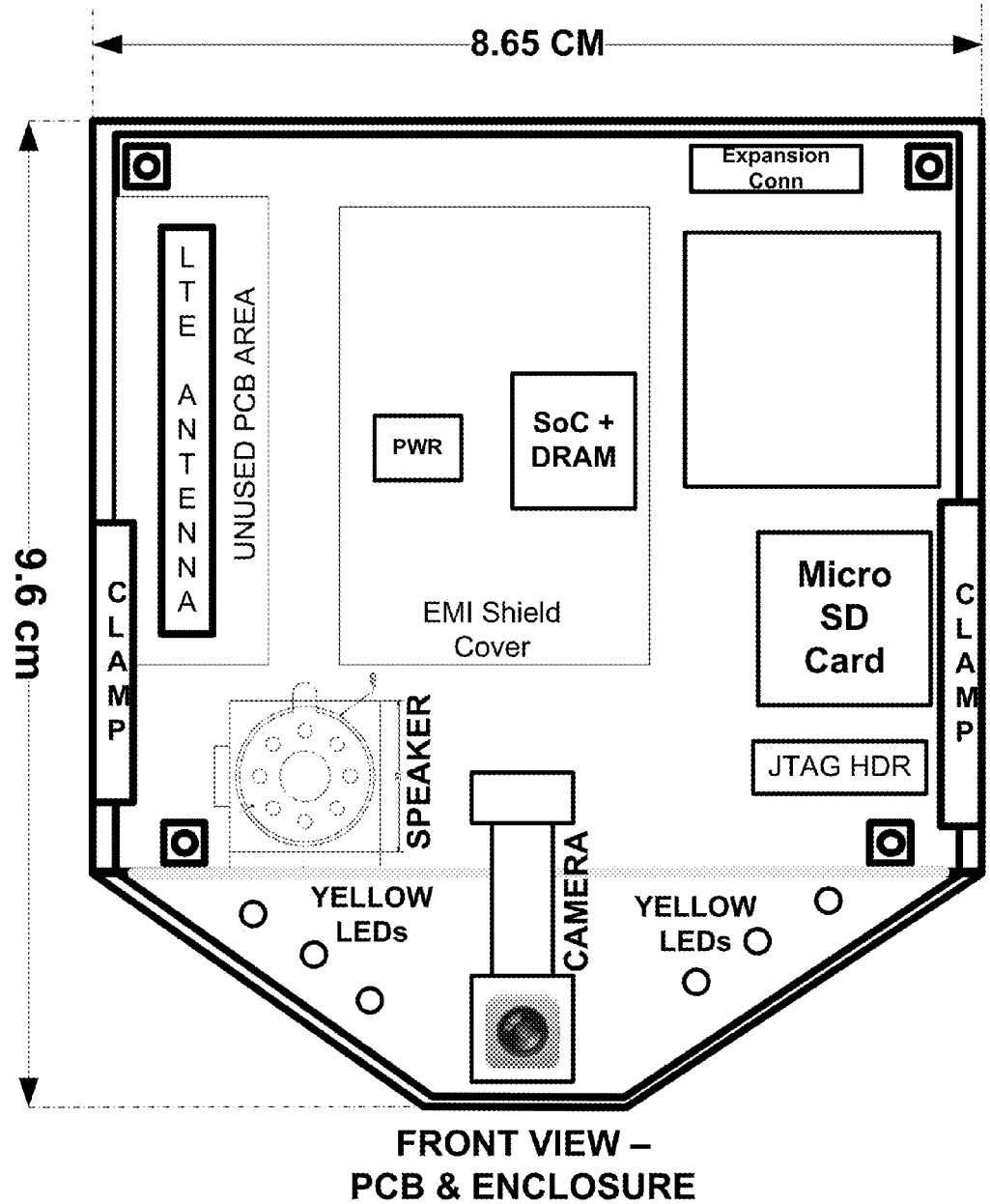
FIG. 19 shows an embodiment for enclosure and physical size of preferred embodiment for the front view (facing the road).
Figure 20:
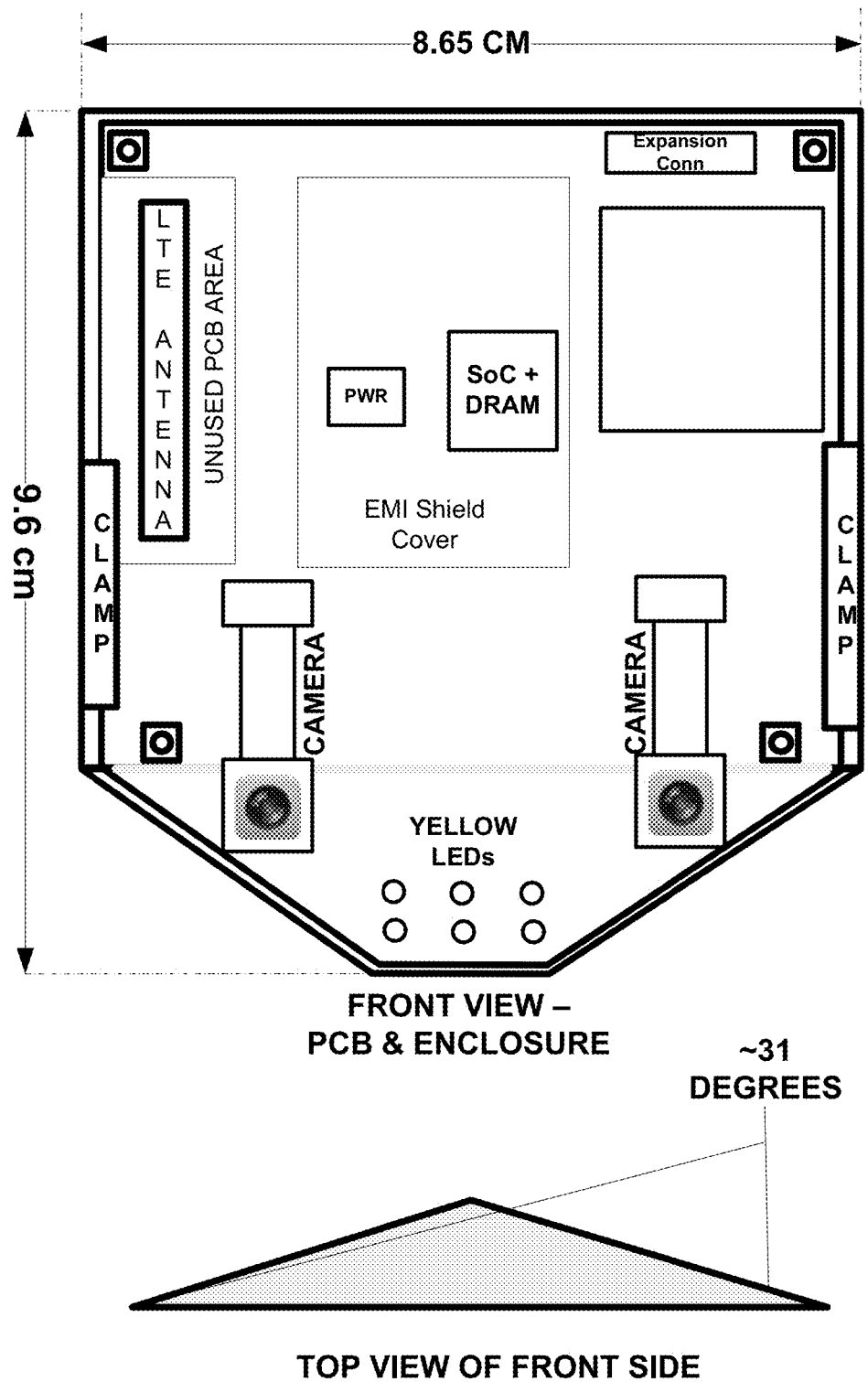
FIG. 20 shows a two-front view camera embodiment for enclosure and physical size of preferred embodiment for the front view (facing the road).

FIG. 19-22 show an embodiment for enclosure and physical size of preferred embodiment, and also showing the windshield mount suction cup. FIG. 19 shows the front view facing the road ahead of the printed circuit board (PCB) and placement of key components. FIG. 20 shows two-camera embodiment for the front view where the two camera are mounted with a 31 degree approximate angle offset to the front plane surface assuming each of the cameras Horizontal Field Of View (HFOV) is about 66 degrees. The combined HFOV is about 120-130 degrees depending upon the overlap selected (See FIG. 10). First, template matching is used to calculate the vertical offset, which can be done only once, and the vertical offset can be saved for future use. The template matching can use an 8×8 or 16×16 block and find the vertical offset for the best match in the overlapped region. The best match is calculated using the sum of absolute differences (SAD) or mean of the squared differences error (MSE). The overlapped area provides a smooth transition from left to right camera, where there is linear transition between the two cameras. If the transition area horizontally is D pixels, then we can calculate the pixel values for the transition by (n/D)*Right_Frame+(1−(n/D) *Left_Frame) for n=0 to D−1 in increments of one.

Figure 21:
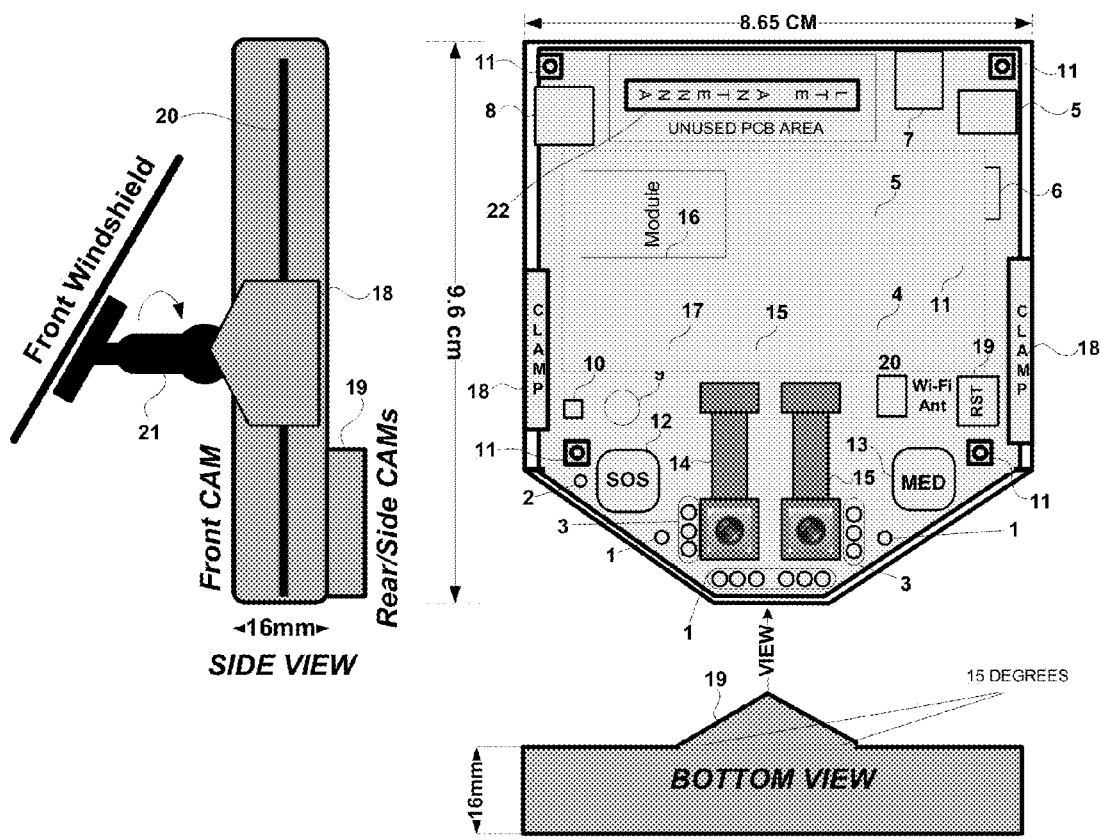
FIG. 21 shows the view of device from the inside cabin of vehicle and also the side view including windshield mounting.

Yellow LEDs flash in case of an emergency to indicate emergency condition that can be observed by other vehicles and also to quickly locate the vehicle that requested the emergency help. FIG. 21 shows the front view and suction cup mount of device. The blue light LEDs are used for reducing the sleepiness of driver using 460 nm blue light illuminating the driver's face with LEDs shown by reference 3. The infrared (IR) LEDs shown by reference 1 illuminate the driver's face with IR light at night for facial processing to detect distraction and drowsiness conditions. Whether right or left side is illuminated is determined by vehicle's physical location (right hand or left hand driving). Other references shown in the figure are side clamp areas 18 for mounting to wind shield, ambient light sensor 2, camera sensor flex cable connections 14 and 15, medical (MED) help request button 13, SOS police help request button 12, mounting holes 11, SIM card for wireless access 17, other electronics module 16, SoC module 15 with two AFE chips 4 and 5, battery connector 5, internal reset button 19, embedded Bluetooth and Wi-Fi antenna 20, power connector 5, USB connector for software load 7, embedded 3G/4G LTE antenna 22, windshield mount 21, HDMI connector 8, side view of main PCB 20, and microphone 9.

Figure 22:
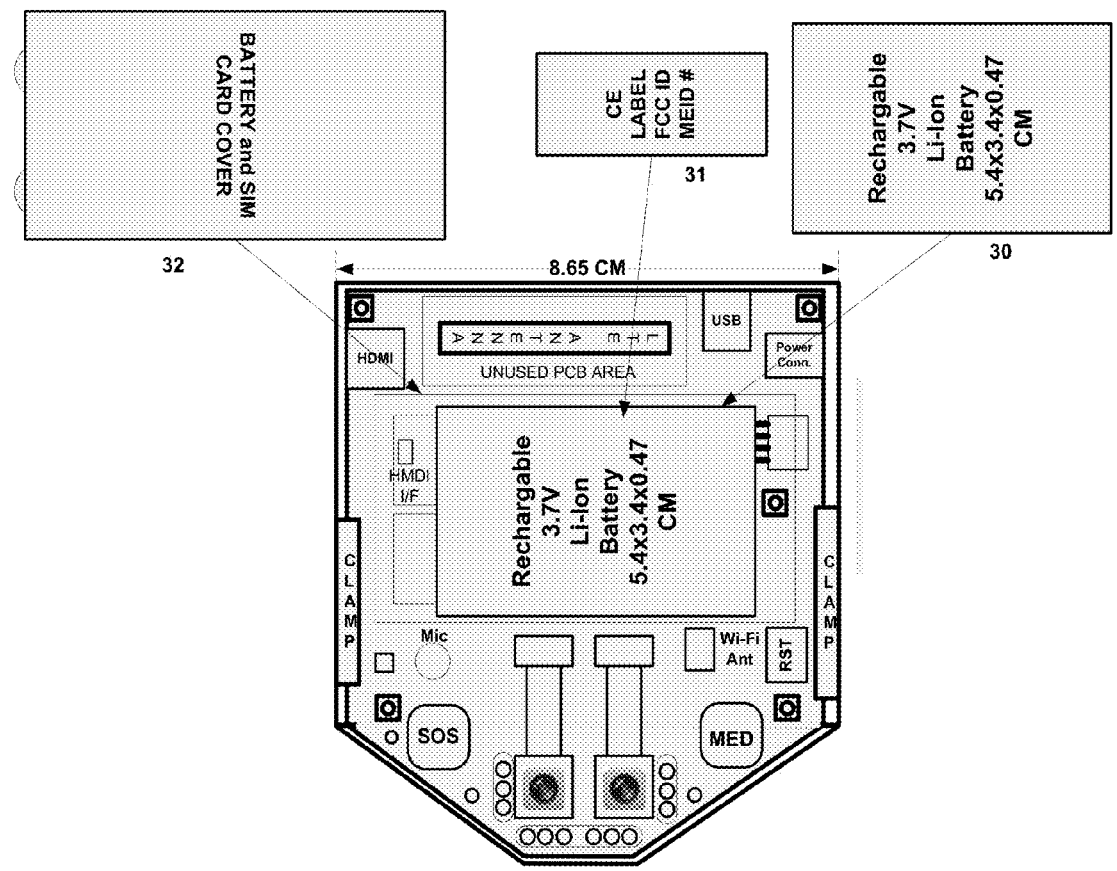
FIG. 22 shows the placement of battery inside stacked over electronic modules over the CE label tag.

FIG. 22 shows battery compartment over the electronic modules, where CE compliance tag is placed, and battery compartment, which also includes the SIM card. The device is similar to a cell phone with regard to SIM card and replaceable battery. The primary difference is the presence of three for four High-Dynamic Range (HDR) cameras that concurrently record, and near Infrared (IR) filter bandpass in the rear-facing camera modules for nighttime illumination by IR light.

Figure 14:
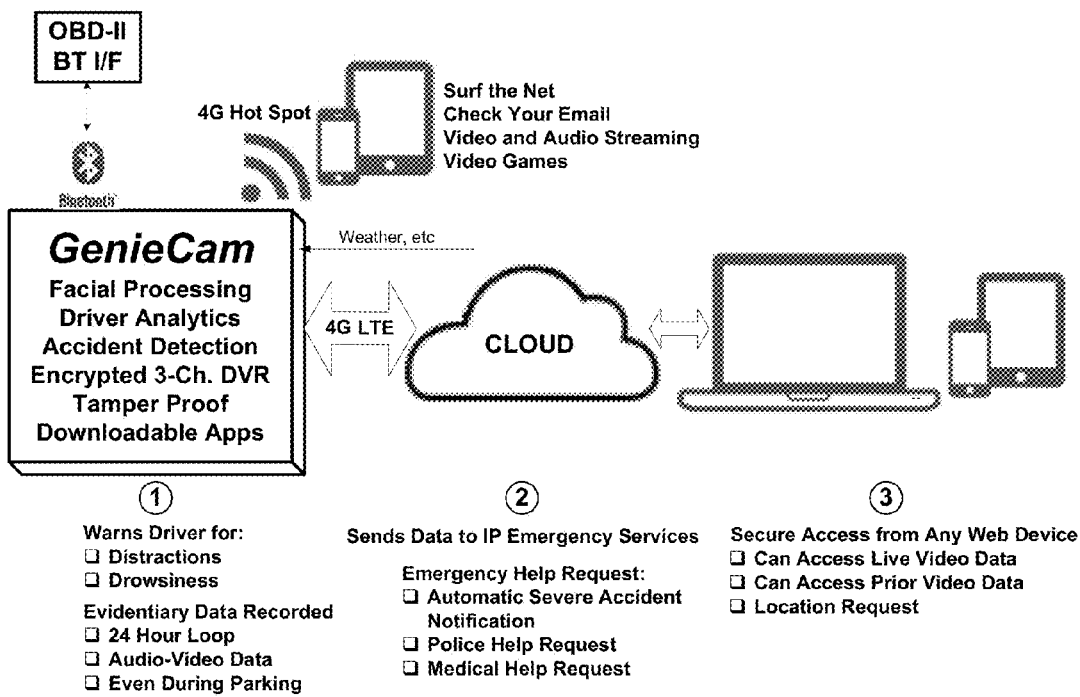
FIG. 14 shows block diagram of connection to the cloud and summary of technology and functionality.

FIG. 14 depicts interfacing to On-Board Diagnostic (OBD-2). All cars and light trucks built and sold in the United States after Jan. 1, 1996 were required to be OBD II equipped. In general, this means all 1996 model year cars and light trucks are compliant, even if built in late 1995. All gasoline vehicles manufactured in Europe were required to be OBD II compliant after Jan. 1, 2001. Diesel vehicles were not required to be OBD II compliant until Jan. 1, 2004. All vehicles manufactured in Australia and New Zealand was required to be OBD II compliant after Jan. 1, 2006. Some vehicles manufactured before this date are OBD II compliant, but this varies greatly between manufacturers and models. Most vehicle manufacturers have switched over to CAN bus protocols since 2006. The OBD-2 is used to communicate to the Engine Control Unit (ECU) and other functions of a vehicle via Bluetooth (BT) wireless interface. A BT adapter is connected to the ODB-2 connector, and communicates with the present system for information such as speed, engine idling, and for controlling and monitoring other vehicle functions and status. For example, engine idling times and over speeding occurrences are saved to monitor and report for fuel economy reasons to the fleet management. Using OBD-2 the present system can also limit the top speed of a vehicle, lower the cabin temperature, etc., for example, when driver drowsiness condition is detected. ODB-2 also provides access to various engine control parameters such as engine load, rounds per minute (RPM), vehicle speed.

The present system includes a 3G/4G LTE or a 5G wireless modem, which is used to report driver analytics, and also to request emergency help. Normally, the present device works without a continuous connection to internet, and stores multi-channel video and optional audio and meta data including driver analytics onto the embedded micro SD card. In case of an emergency the present device connects to internet and sends emergency help request from emergency services via Internet Protocol (IP) based emergency services such as SMS 911 and N-G-911, and eCall in Europe, and conveying the location, severity level of accident, vehicle information, and link to short video clip showing time of accident that is uploaded to a cloud destination. Since the 3G/4G LTE modem is not normally used, it is provided as part of a Wi-Fi Hot Spot of vehicle infotainment for vehicle passengers whether it is a bus or a car.

Figure 39:
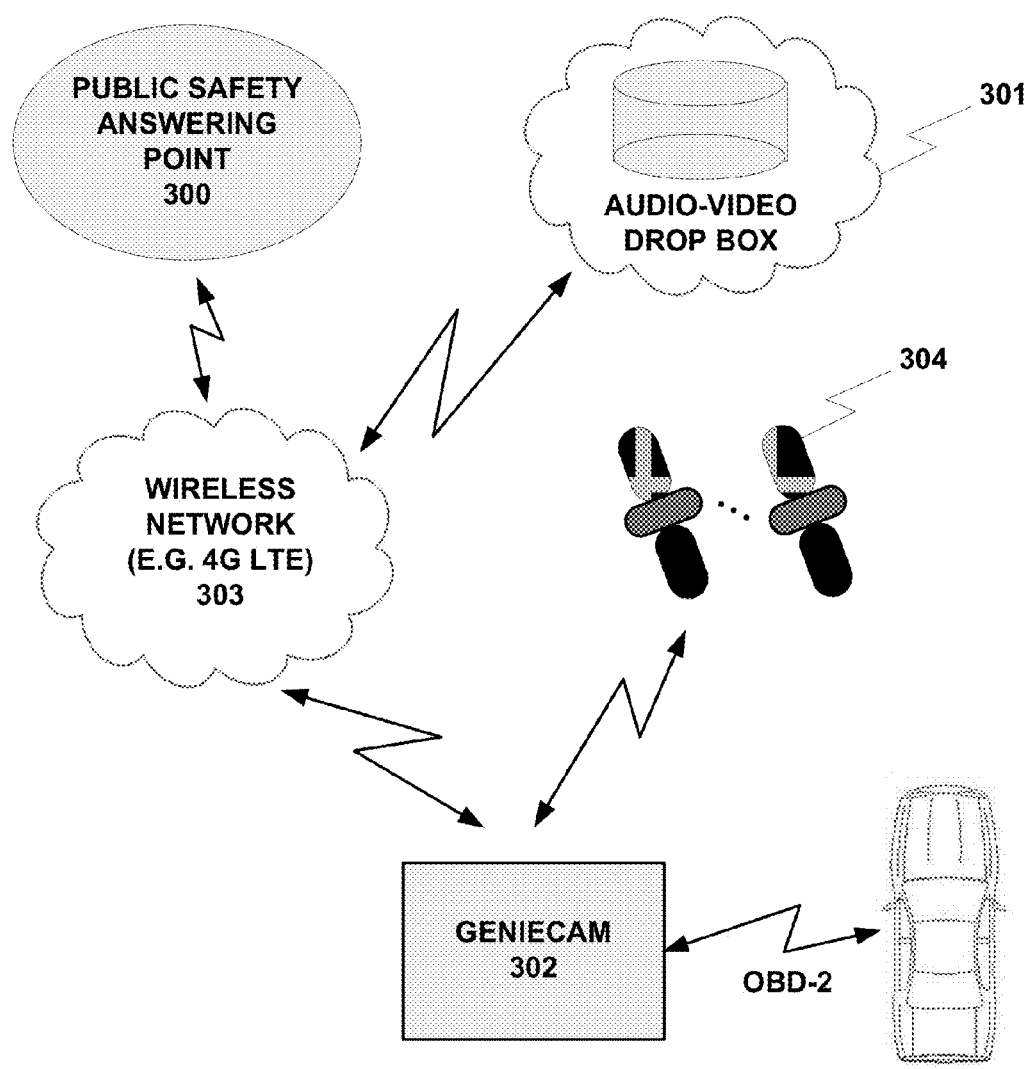
FIG. 39 shows communication between the present system (GenieCam) and OBD-2, wireless broadband network to an audio-video drop box in the cloud and Public Safety Answering Point.

FIG. 39 shows the connections of present system, referred to as GenieCam 302, which connects to OBD-2 using Bluetooth interface, connects to broadband wireless using 4G LTE or 5G mobile interface, and connects to Public Safety Answering Point (PSAP) 300 as emergency services via internet and also audio-video drop box 301 in the cloud for uploading and storing accident audio-video data. Also, GPS 304 is used to determine latitude and longitude of present location and speed.

Since most of the time 4G/5G connectivity is not used, because multi-channel DVR uses embedded micro SD card, high-bandwidth connectivity is available to passengers as a mobile hot spot for streaming audio, video, internet surfing, and video games by multiple passengers. The mobile hot spot uses 802.11 Wi-Fi that is also embedded in the present system, and supports 802.11n and the new 802.11 ac standard. IEEE 802.11ac is a wireless computer networking standard in the 802.11 family (which is marketed under the brand name Wi-Fi), developed in the IEEE Standards Association process, providing high-throughput wireless local area networks (WLANs) on the 5 GHz band. The present system's mobile hot spot can also be used for internet connectivity on a bus with many passengers.

The recorded video will optionally display G forces, peak and current, current speed and quarter mile acceleration time as an optional overlay on one of the recorded video channels. This information is useful for sports driving.

Adaptive Constant Bit Rate (ACBR)

In video coding, a group of pictures, or GOP structure, specifies the order in which intra- and inter-frames are arranged. The GOP is a group of successive pictures within a coded video stream. Each coded video stream consists of successive GOPs. From the pictures contained in it, the visible frames are generated. A GOP is typically 3-8 seconds long. Transmit channel characteristics could vary quite a bit, and there are several adaptive streaming methods, some based on a thin client. However, in this case, we assume the client software (destination of video is sent) is unchanged. The present method looks at the transmit buffer fullness for each GOP, and if the buffer fullness is going up then quantization is increased for the next GOP whereby lower bit rate is required. We can have 10 different levels of quantization, and as the transmit buffer fullness increases the quantization is increased by a notch to the next level, or vice versa if transmit buffer fullness is going down, and then quantization level is decreased by a notch to the next level. This way each GOP has a constant bit and bit rates are adjusted between each GOP for the next GOP, hence the term of Adaptive Constant Bit Rate (ACBR) we used herein.

Motion Adaptive Spatial Filter (MASF)

Motion Adaptive Spatial Filter (MASF), as defined here, is used to pre-process the video before other pre-processing and video compression. MASF functional block diagram is shown in FIG. 15. The pre-calculated and stored Look-Up Table (LUT) contains a pair of values for each input value, designated as A and (1-A). MASF applies a low-pass two-dimensional filter when there is a lot of motion in the video. This provides smoother video and improved compression ratios for the video compression. First, the amount of motion is measured by subtracting the pixel value from the current pixel value, where both pixels are from the same pixel position in consecutive video frames. We assume the video is not interlaced here, as CMOS camera module provides progressive video. The difference between the two pixels provides an indication of amount of motion. If there is no motion, then A=0, which mean the output $y_n$ equals input $x_n$ as unchanged. If, on the other hand the difference delta is very large, than A equals to $A_{max}$, which means $y_n$ is the low-pass filtered pixel value. For anything in between, the LUT provides a smooth transition from no filtering to full filtering based on its contents. The low pass filter is a two dimensional FIR (Finite Impulse Response) filter, with a kernel size of 3×3 or 5×5. The same MASF operation is applied to all color components of luma and chroma separately, as described above.

Hence, the equations for MASF are defined as follows for each color space component:

Step 1: Delta=$x_n-x_{n(t-1)}$

Step 2: Lookup value pair: {1-A,A}=LUT(Delta)

Step 3: $Y_n=(1-A)*x_n+A*Low-Pass-Filter(X_n)*A$ $x_{n(t-1)}$ represents the pixel value corresponding to the same pixel location X-Y in the video frame for the t-1, i.e., previous video frame. Low-Pass-Filter is a 3×3 or 5×5 two dimensional FIR filter. All kernel values can be the same for a simple moving average filter where each kernel value is ⅑ or ¹⁄₂₅ for 3×3 and 5×5 filter kernels, respectively.

Motion Adaptive Temporal Filter (MATF)

The following temporal filter is coupled to the output of MASF filter and functions to reduce the noise content of the input images and to smooth out moving parts of the images. This will remove majority of the temporal noise without having to use motion search at a fractional of processing power. This MATF filter will remove most of the visible temporal noise artifacts and at the same time provide better compression or better video quality at the same bit rate. It is essentially a non-linear, recursive filtering process which works very well that is modified to work in conjunction with a LUT adaptively, as shown in FIG. 15.

The pixels in the input frame and the previous delayed frame are weighted by A and (1-A), respectively, and combined to pixels in the output frame. The weighing parameter, A, can vary from 0 to 1 and is determined as function of frame-to-frame differenced. The weighting parameters are pre-stored in a Look-Up-Table (LUT) for both A and (1-A) as a function of delta, which represents the difference on a pixel-by-pixel basis. As a typical weighing function we could use the function plot shown in FIG. 15 showing the contents of LUT. Notice that there are threshold values, T and -T, for frame-to-frame differences, beyond which the mixing parameter A is constant.

The "notch" between -T and T represents the digital noise reduction part of the process in which the value A is reduced, i.e., the contribution of the input frame is reduced relative to the delayed frame. As a typical value for T, 16 could be used. As a typical value ranges for $A_{max}$, we could use {0.8, 0.9, and 1.0}.

The above represents:

$Yn=LUT(Delta)*Xn+(1-LUT(Delta))*Yn-1$

This requires:

One-LUT operation (basically one indexed memory access);

Three subtraction/add operations (one for Delta);

Two-Multiply operations.

This could be further reduced by rewriting the above equation as:

$Yn=LUT(Delta)*(Xn-Yn-1)+Yn-1$

This reduces the required operations to:

One-LUT operation (basically one indexed memory access);

Three subtraction/addition operations (one for Delta); and

One-multiply operation.

Figure 17:
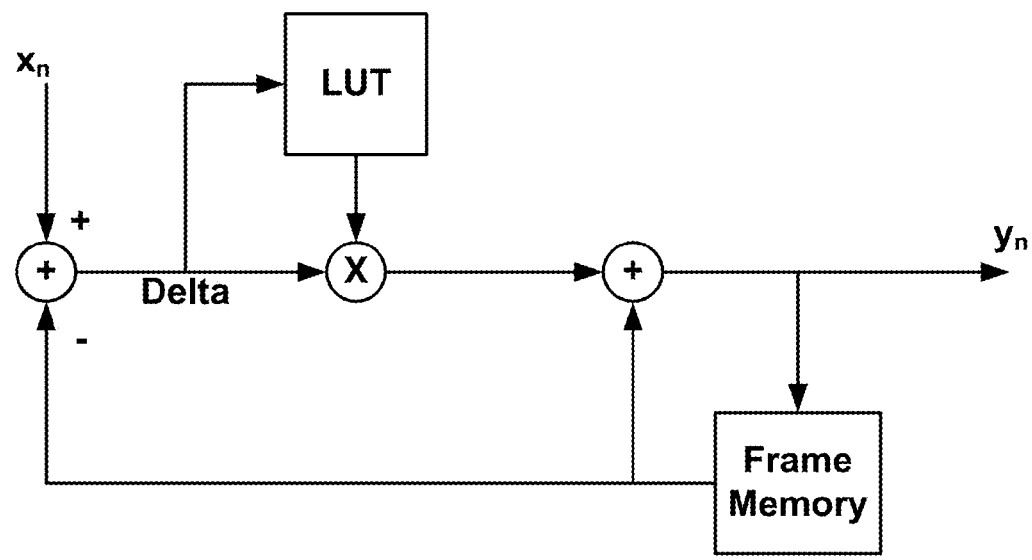
FIG. 17 shows a second embodiment of present invention using a reduced Motion Adaptive Temporal Filter defined here.

The flow diagram of this is shown in FIG. 17. For a 1920×1080P video at 30 fps, this translates to 2M*30*5 Operations, or 300 Million Operations (MOPS), a small percentage well within the operation capacity of most DSPs on a SoC today. As such it has significantly less complexity and MOPS requirement, but at a great video quality benefit.

Driver Analytics

Vehicle, driver and environment are perceived as the three main components of the system. There is a wide range of systems developed to increase safety of vehicles themselves by making them more stable and reliable. However, a large portion of uncertainty exists in any driving scenario because of the long term as well as instantaneous ability of the driver, changing environment and their interaction. Therefore, the complete solution for reduction of road accidents is only possible by making the vehicles 'aware' of the driving context (environment, route and maneuver type) and the driver status (distracted, neutral, aggressive, drowsy etc.). This can be achieved by analyzing driver behavior signals including driver inputs (e.g., hard cornering, tailgating), vehicle responses to driver inputs (i.e., vehicle speed, acceleration and position), and driver biometric signals (i.e., face gaze direction, level of eyes closed, etc.). Other factors that affect the risk a driver may pose to others include number of miles travelled, driving time of the day, and number of miles driven without taking a break.

Driver and passenger safety has emerged as one of the leading concerns for the automotive industry and its consumers. Traffic crashes are the ninth leading cause of global disease and injury, while over 40,000 Americans are killed in traffic crashes every year (NHTSA, 2005). Government mandated safety standards, including vehicle crashworthiness and passive/active safety features, must be fully addressed by automotive designers. Similarly, roadway design and general features receive significant focus from the civil engineering and human factors communities (Dewar, 2007). However, minimal focus has been given to the human variable in automotive safety within the USA (Williams and Hanworth, 2007) while still underrepresented throughout the world. The question exists as to what signifies a "good" or "bad" driver, and what quantifies the risk a driver may pose to others during their daily driving.

Six different driver classifications were instituted ranging from timid to aggressive as shown in FIG. 43. Previous research has proposed definitions of aggressive driving and attempted to differentiate timid or cautious drivers from aggressive drivers (Miles and Johnson, 2003; Knapper and Cropley, 2008). The targeted area for a driver lies in the conservative and neutral zones. Both extreme classifications, timid and aggressive, may constitute dangerous behavior. Furthermore, unsafe driving may also occur in the cautious and assertive classifications. For example, assertive driving may be classified as unsafe owing to behaviors such as tailgating, speeding above the traffic flow and rapidly changing lanes. Similarly, cautious driving may be classified as unsafe owing to such characteristics as travelling below the speed of traffic to maintain the minimum posted speed limit, over-scanning before making turns or lane changes and not anticipating traffic patterns while maintaining vehicle speed. A normal distribution has been assumed for general driver behavior with, the percentages based on the number of standard deviations about the mean.

The present method and system does not merely depend on data thresholds for the vehicle speed, miles driven, time of day, and acceleration/braking as measures of driver performance and behavior. FIG. 41 shows the parameters that are measured and maintained by the present method and system, which supports multiple different profiles of driver analytics. For example, an insurance company may require a subset of these parameters, whereas a profile for parental monitoring will require a different set of parameters selected and reported. Similarly, fleet management, police and taxis may each have different profiles that select different sub-sets of parameters that are reported. Police profile may also include gun shot and explosion detection.

The average speed of a vehicle usually does not contain meaningful information as it is an aggregate of both city and highway driving. The average highway speed, if it can be measured, contains helpful driver analytics information. The present method measures highway speed only when vehicle speed is higher than 55 mph and after T time maintaining 55 mph or higher speed. These two conditions effectively eliminate any city driving speed data to be included, as it is not possible to maintain 55+ mph in city driving for a period of time, such as T=5 minutes. The present method also includes a hysteresis of couple of miles per hour, below which average measurement is paused, for example, below 52 mph. We can also put a time limit for such hysteresis for example 2 minutes, in case the highway traffic slows down momentarily.

The high-beam misuse determines high beams are on at night time driving, when the present system detects a vehicle travelling the same direction ahead or a vehicle coming from the opposite direction. OBD-2 connection and front camera processing is used to determine the occurrence of high-beam use when there is vehicle in front or coming from the opposite direction. The number of occurrences for a selected time period is reported.

The slope of acceleration would simply be the change in acceleration. Physically, this quantity is known as the "jerk" because changes in acceleration are generally forceful and sudden, the impact of which feels like a sudden jerking movement to an individual riding in a car that undergoes a sudden change in acceleration.

Jerk describes vehicle acceleration or deceleration changing rate in m/s3. Vehicle jerk is highly related with driving comfort. The value of Jerk parameter is defined by the differential equation with respect to time:

$J=dA/dt$

Where:
A vehicle acceleration in m/s2,
J vehicle jerk in m/s$^3$ or G/s.

The magnitude of jerk is highly related with driving comfort and safety. An acceptable jerk is ±2 m/s$^3$ and a comfortable jerk is ±1 m/s$^3$. Jerk in emergency cases can be as high as ±10 m/s$^3$. The longitudinal acceleration and jerk were derived from the vehicle speed through numerical differentiation. Similarly, the lateral jerk was derived discretely from the lateral acceleration. The acceleration and deceleration limits, 4.46 m/s$^2$ and 9.22 m/s$^2$, correspond to a typical passenger vehicle. The first-level limits were set at 20% (15%) full acceleration (deceleration). The second level was equal to a 15% (10%) increase for acceleration (deceleration). The third level featured the same increases above the second level. The present method and system records instances when the absolute value of J is higher than a pre-set threshold value.

The cornering forces are measured by the gyro vector G:

$Gyro\_Vector=sqrt(W_{G\_LPF}^2+W_{G\_LPF}^2+W_{G\_LPF}^2)$

Where "sqrt" is square root function. If gyro vector is greater than a predetermined threshold value, then it is recorded as part of metadata along with audio and video of multiple cameras, along with speed and other information, as an instance of hard cornering occurrence data as part of the driver analytics.

The frequency of reporting driver analytics is selectable as including, but not limited to one of the following: Upon occurrence, once per days, once per week. Also, the present method and system supports one or more destinations to be entered for such reporting to be sent to. These predefined IP destinations can be one or more email addresses, one or more SMS addresses, cloud storage drop boxes, and one or more FTP (File Transfer Protocol) sites.

Insurance companies will use a selected profile of driver analytics for reduction of insurance premiums up 35-50 percent of their best rates for customers who have the present system in their vehicle, which can also be used pay-as-you-go type new insurance policies with modified cost in accordance with a analytics data for a given driver, such as when you rent a vehicle. The daily driver analytics report will determine the insurance cost and will significantly reduce accident and other liability cost to the car rental companies.

Tamper Proof

Figure 18:
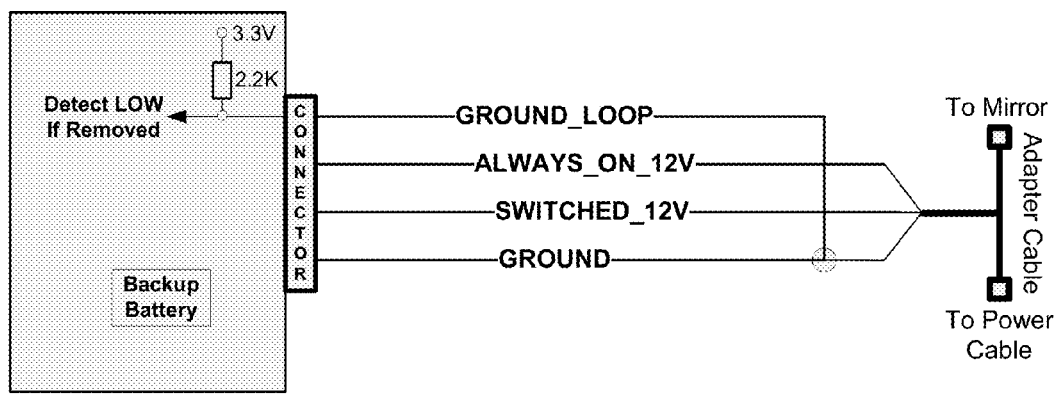
FIG. 18 shows the operation and connection of tamper proof connection to a vehicle.

It is important the device handling the driver distraction monitoring be tamper proof so that it cannot be simply turned off or its operation disabled. The first requirement is that there is no on/off button for the driver distraction detection, or even in general for the device outlined herein. It is also required that the used cannot simply disconnect the power the device to disable its operation. The present invention has several tamper-proof features. There is a loop and detection of connected to the vehicle, as shown in FIG. 18, wherein if the connection to the device is monitored, and if disconnected, the present invention uses the built-in battery and transmits information to a pre-defined destination, fleet management center, parents, taxi management center, etc., using an email to inform it is disconnected. The disconnection is detected when the ground loop connection is lost by either removing the power connection by disconnecting the cable or device, or breaking the power connection by force, when the respective general-purpose IO input of System-on-a Chip will go to logic high state, and this will cause an interrupt condition alerting the respective processor to take action for the tamper-detection. Furthermore, the device will upload video to the cloud showing t−5 seconds to t+2 seconds, where "t" is the time when it was disconnected. This will also clearly show who disconnected the device. The device also contains a free-fall detector, and when detected, it will send an email showing time of fall, GPS location of fall, and the associated video. The video will include three clips, one for each camera.

The circuit of FIG. 18 also provides information with regard to engine is running or not using the switched 12V input, which is only on when the engine is running. This information is important for various reasons in absence of OBD-2 connection to determine the engine status.

Figure 38:
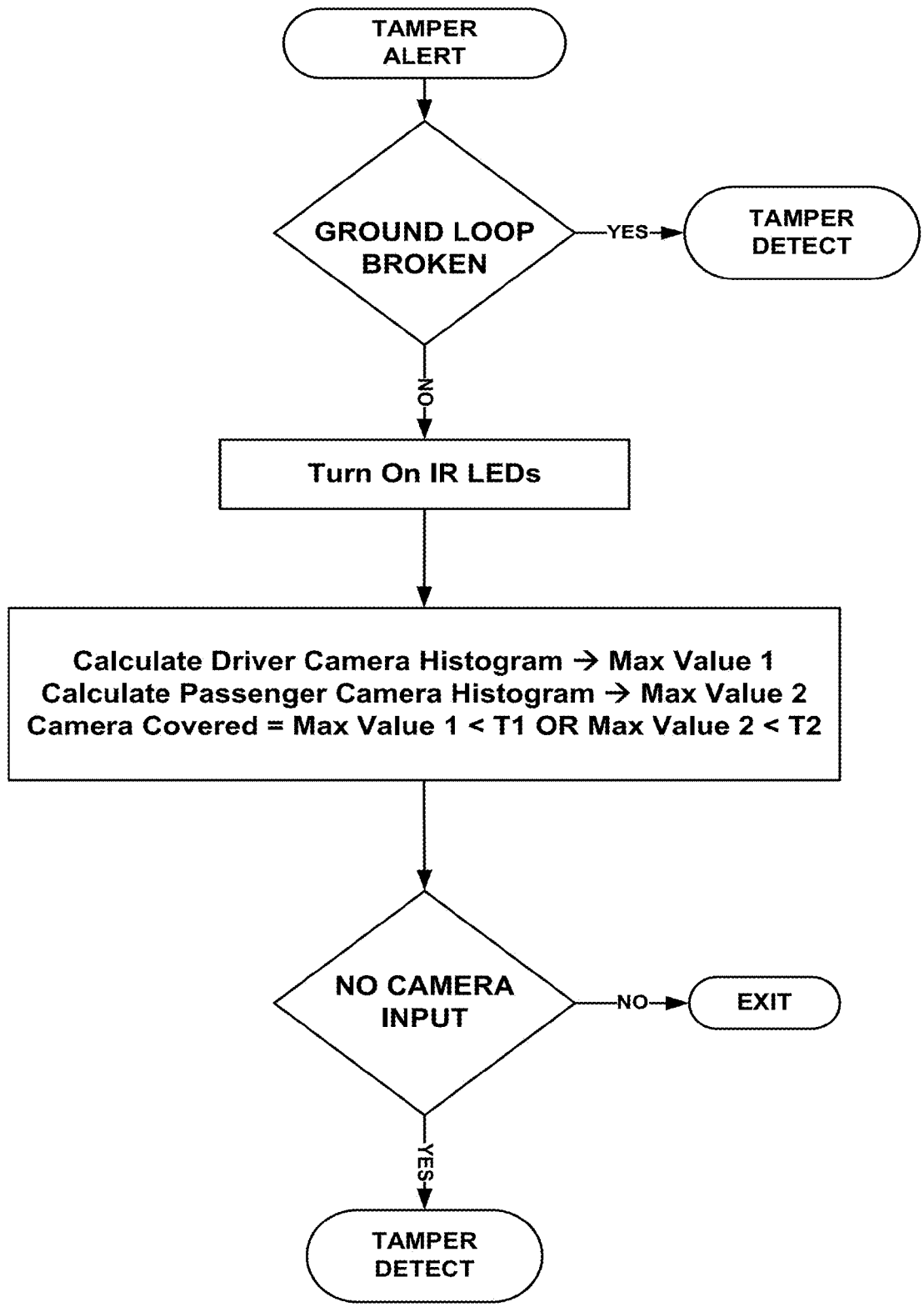
FIG. 38 shows tamper alert detection.

The present system will also detect covered cameras by analyzing the histogram of video captured from multiple cameras in accordance with time of day, and will turn on the IR LEDs and if the histogram still indicates an mostly underexposed video from one or more camera, as shown in FIG. 38, it will trigger a trigger a tamper alarm which also causes a video to be uploaded indicating the person causing tempering due to DVR features and continuous recording enabling going to t−5, i.e., 5 seconds before a trigger event for example. The tampering data will be sent via IP with a link to related video data from multiple cameras.

Automatic Severe Accident Detection and Reporting

The present method and system uses a combination of sensors, x-y-z accelerometer, x-y-z gyroscope (gyro in short herein), eCompass (magnetometer) for direction of travel, GPS for speed and location, engine-on sensor, OBD-II connection to vehicle's Engine Control Unit (ECU) in conjunction with video cameras and occupant sensors.

Acceleration is defined as the rate of change in velocity of a mass and is frequently stated in units of feet per second per second or feet/second$^2$ (meters/second$^2$. It is related to force by the familiar equation, F=M/A, where F=force, M=mass, and A=acceleration. Acceleration may be described in units of G which is the ratio of a particular acceleration (a) to the acceleration of gravity at sea level (g=32.2 ft/sec$^2$ or 9.8 m/sec$^2$) or G=a/g. As a result, crash forces can be thought of in terms of multiples of the weight of the objects being accelerated. An accident can be a frontal impact, rear-end collision, or a collision from the side such as when a vehicle runs a red light.

Figure 23:
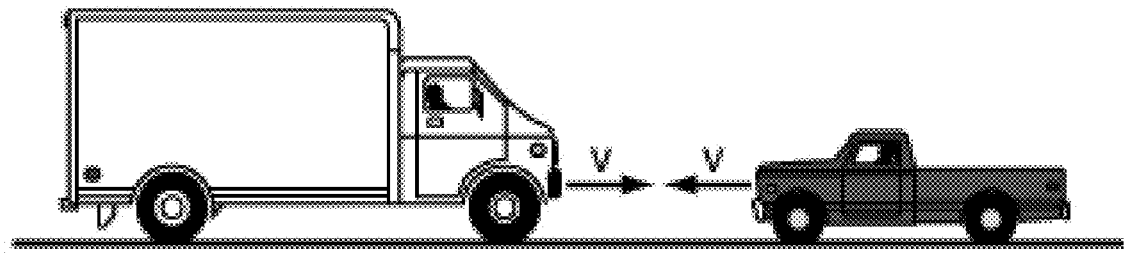
FIG. 23 shows the different speed changes and accelerations experienced when a large vehicle collides with a small vehicle.

The acceleration values depend on the weight of the vehicle, as shown in FIG. 23. A large Sports Utility Vehicle (SUV) or a truck will experience a much smaller acceleration than an average size car in an accident. Therefore, the present method and system uses the make and model of a vehicle to determine its weights which is then used to determine a set of threshold values of parameters for accident detection as the acceleration values experienced is dependent on the size and mass of a vehicle. In a different embodiment, the weight of a vehicle is not used, as it is more important what the acceleration values are experienced by occupants in a vehicle. A larger vehicle will have better injury criteria, because it will decelerate in a longer period of time and the acceleration peak values are smaller.

Acceleration values given in various reports generally refer to the acceleration of the vehicle near its center of mass, unless otherwise specified. A deceleration is simply a negative acceleration. In general, human tolerance to acceleration is a function of five extrinsic factors (5). These factors are related to characteristics of the crash pulse and to the design of the seating and restraint systems:

Magnitude of the acceleration: Clearly, the higher the acceleration, the more likely it is to cause injury.

Direction of the acceleration: The human is better able to withstand accelerations applied along certain axes of the body. The direction that is most tolerable is the +Gx or acceleration in the forward direction (eyeballs in). The least tolerable direction is apparently the Gz or vertical axis (eyeballs up or down). The lateral axis (Gy) used to be considered the least tolerable, but recent data derived from crashes of Indianapolis Race Cars indicates that this is probably not the case.

Duration of the acceleration: How long one is subjected to an acceleration is one of the determinants of human tolerance. In general, the shorter the pulse for the same magnitude of acceleration, the more tolerable. Acceleration tolerance is usually considered to comprise two distinct realms—abrupt acceleration and sustained acceleration—because of distinctly different human response patterns to abrupt and sustained accelerations. Most crash impacts have a duration of less than 250 milliseconds or one-quarter of a second, which is considered to be in the realm of abrupt acceleration. Human tissues and the vascular system respond considerably differently to these very short duration pulses than they do the more sustained pulses experienced by fighter pilots and astronauts. Consequently, a 10 G turn or "pull-up" may cause unconsciousness in a pilot and result in a crash, but a 10 G crash impact may have little effect on the occupant of a vehicle.

d. Rate of onset: Rate of onset of acceleration refers to how rapidly the acceleration is applied. It is reflected in the slope of the curve depicted in FIG. 26. For a given magnitude and duration of acceleration, the greater the rate of onset, the less tolerable the acceleration is.

e. Position/Restraint/Support: This is one of the most critical factors determining human tolerance to a crash pulse. It refers to how well the occupant is restrained and supported by his seat and restraint system and the degree to which the loads experienced in the crash are distributed over his body surface.

Acceleration is related to injury. This is why the most common sensor in a crash test dummy is the accelerometer. Extreme acceleration can lead to death. The acceleration during the crash that killed Diana, Princess of Wales, in 1997 was estimated to have been on the order of 70 to 100 g, which was intense enough to tear the pulmonary artery from her heart—an injury that is nearly impossible to survive. Had she been wearing a seat belt, the acceleration would have been something more like 30 or 35 g—enough to break a rib or two, but not nearly enough to kill most people.

Automobile designers accomplish this by providing "crush zones" in the front and rear of automobiles wherein crushing of the vehicle structure absorbs a portion of the energy of the crash, thus reducing the forces experienced by the occupants. These systems accomplish this reduction in force by increasing the time over which the change in velocity occurs while the front-end of the vehicle is crumpled and absorbs energy of the vehicle, which is equal to ($\frac{1}{2}$)$\times$M$\times$V$^2$. The net change in speed is the same, but the acceleration is less because it occurs over a longer period of time. Therefore in order to detect car accidents, the detection threshold must be significantly lower than that required to deploy the airbag.

Another consideration in the case of after-market unit mounted on windshield is if we get false positive accident detection if the device falls from the windshield. Using 9.8 m/s$^2$ as an approximate value for Earth's gravity, the device experienced approximately 2G's in each direction with nearly 3G's on the x-axis before coming to rest. The required acceleration to trigger airbag deployment is 60G's. In addition to being 30 times smaller than required to deploy an airbag, this value is well below the 4G's used as a filter. It is therefore unlikely an after-market unit could be dropped in a manner that would exceed 4G's.

Figure 25:
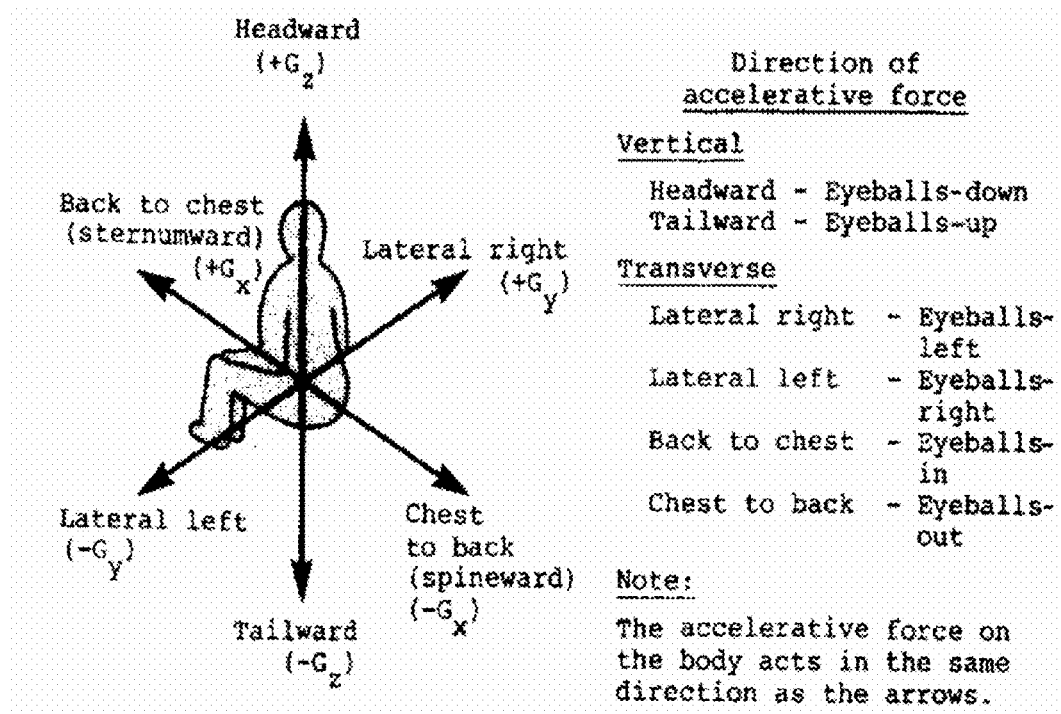
FIG. 25 shows different G forces experienced in different directions and the tolerance level for each direction for a typical 0.1 second accident with full restraint.

With normal braking modern cars reach deceleration values from 8 m/s$^2$ to 11 m/s$^2$, which is about the terrestrial acceleration due to gravity, G. A potential scenario that could potentially generate a false positive is a sudden stop. This test was performed in a vehicle by reaching a speed of approximately 25 mph and engaging in a sudden stop. The test results are approximate as the exact speed was unknown and braking pressure was not exact. FIG. 25 shows the acceleration experienced on each axis during the stop. Because the unit remained stationary relative to the vehicle, it experienced the same forces as the vehicle. In this instance, the acceleration experienced by the smartphone was actually less than that experienced during the fall. This result is attributed to the fact that although the stop was sudden and forceful, the car (and consequently the subject unit of present system) came to a rest over a period of time that was longer than during the drop test. In other words, the change in velocity was greater but the actual acceleration was less because the change occurred over a longer period of time. Based on this data, it is unlikely for the unit to experience 4G's of acceleration simply due to a sudden stop.

Figure 28A:
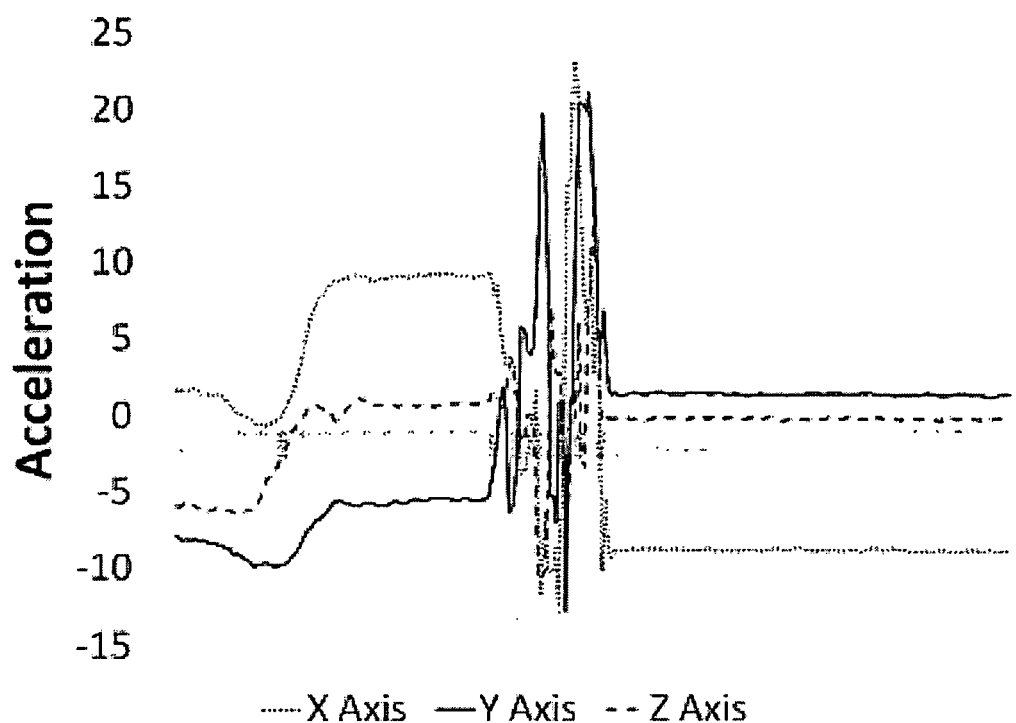
FIG. 28(A) shows acceleration values during a fall.
Figure 28B:
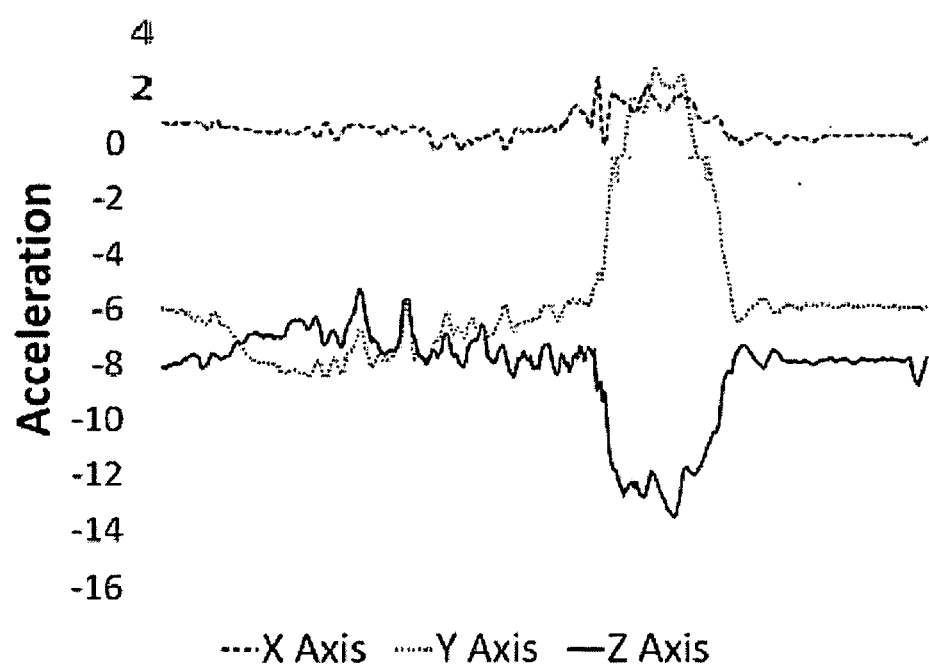
FIG. 28(B) shows acceleration values during a sudden stop.

For severe accident detection, it is also important that there is no false positive detection of a severe accident by error, when an aftermarket version mounted on front windshield falls off or is triggered by an emergency stop without an accident. FIG. 28 shows the acceleration curves that are experienced by these conditions. The method of different embodiments overcomes such false detection conditions.

Whether a vehicle can stop in time is an important criterion for safety. Stopping distance is composed of two parts, reaction distance and braking distance. The reaction distance is the vehicle displacement between the time a driver sees a danger and the driver hits the brake pedal. It depends on the driver reaction time and the vehicle speed. The braking distance, on the other hand, represents the distance traveled after the driver hits the brakes until the vehicle comes to a full stop. It is highly related with the conditions of the brakes, the tires, the weather and the road. The reaction distance (the linear term) and the braking distance (the quadratic term) with full braking on dry, level asphalt and an average perception-reaction time of 1.5 second. The structure of this equation is based on empirical data.

$$D = \text{Stopping Distance} = 2.2 \times V + 0.048 \times V^2$$

Where:
Stopping Distance is stopping distance in feet; and
V vehicle velocity is in mph.

A crash pulse is a description of the accelerations occurring in the crash over time, or the acceleration-time history of the crash. Although the shape of a crash pulse can be highly complex and variable from crash to crash, for practical purposes, most vehicle crash pulses may be considered to be generally triangular or Haversine in shape. This assumption vastly simplifies calculations related to the crash and provides reasonable estimates of acceleration exposure for driver and passengers. Note that in a triangular pulse, the average acceleration of a pulse is one-half of the peak acceleration.

The parameters of a generalized model of a severe vehicle accident are:
A=Acceleration (Deceleration);
$A_{Average}$=Average Acceleration (Deceleration)
T=Duration of Impact
$t_1$=Beginning of collision
$t_2$=End of collision
$\text{Peak}_{Width} = t_2 - t_1$
P=Peak acceleration
$T_P$=Width of peak of acceleration curve
$V_{o1}$=Initial velocity of vehicle 1
$V_{o2}$=Initial velocity of vehicle 2
$\Delta V1$=Velocity change of vehicle 1
$\Delta V2$=Change in velocity of vehicle 2
Mutual Crush=Total crush of two vehicles The magnitude of acceleration of is represented by equation as function of time t:

$$A(t) = P \ast \sin^2(\pi \ast t/T)$$

This equation represents a full frontal impact for a mid-size four door sedan. The offset front end impact may have triangle fit, but this is not much different for the purposes of accident detection and the severity level determination.

Figure 26:
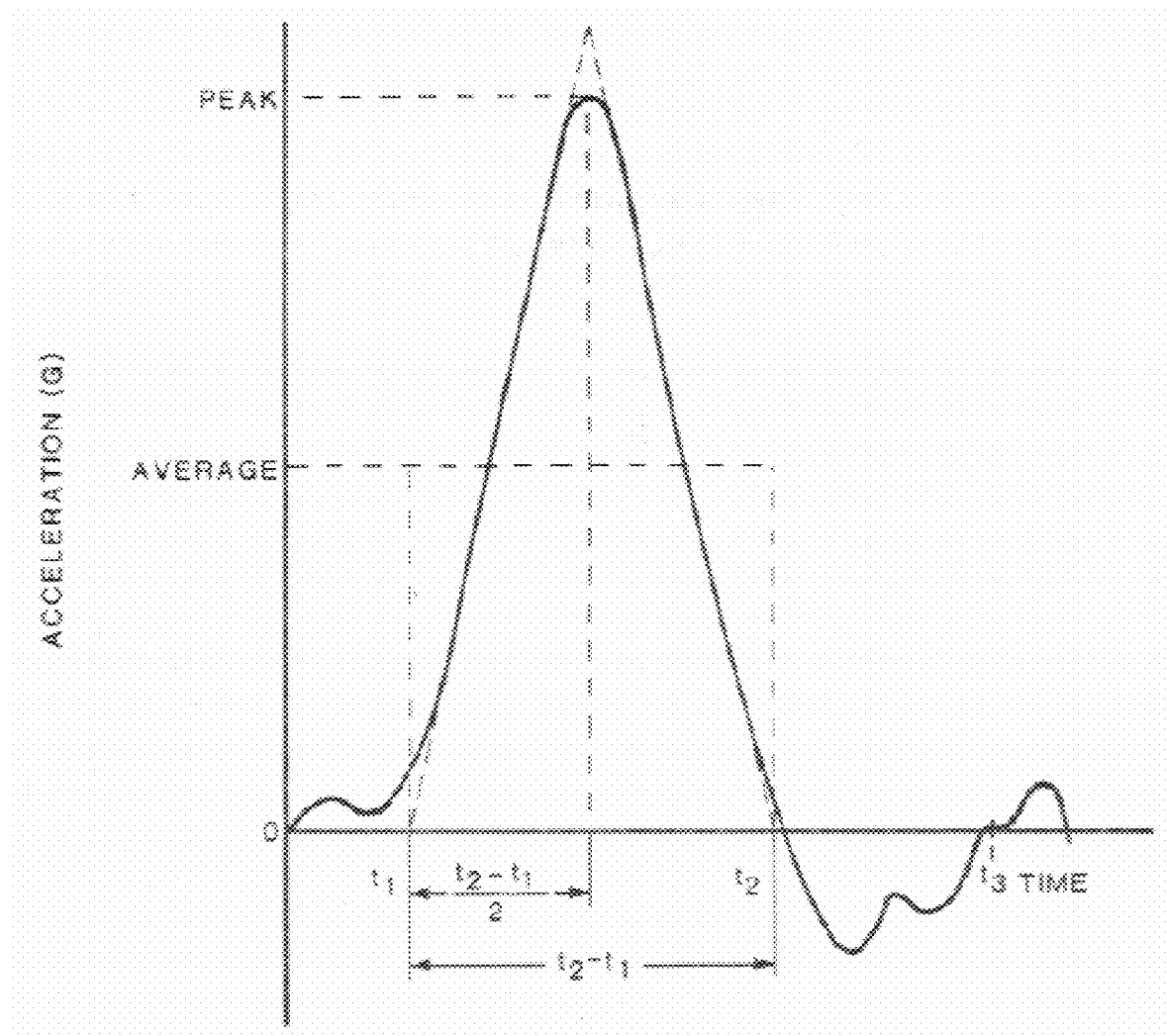
FIG. 26 shows the typical acceleration curve as a function of time in severe accident.

The above equation may not seem intuitive as we have negative acceleration and decrease of speed during a collision. However, two factors has to be considered. First, the positive acceleration vector is pointing toward the back of the vehicle. Also, this is the magnitude of the acceleration where the actual acceleration is negative for the general case if the positive acceleration vector were pointing forward, as shown in FIG. 26 for small four door sedan crushing in hard barrier at 30 mph. Integrating acceleration with respect to time yields velocity by the initial conditions of t=0 and V=V0:

$$V = V_0 + P \ast (2 \ast \pi \ast t - T \ast \sin(2 \ast \pi \ast t/T))/4 \ast \pi$$

At t=T and V=V0+ΔV, and therefore the peak acceleration is given by $$P = (2 \ast \Delta V)/T$$

The displacement as a function of time is given by:

$$D = (T^2 \ast P/8 \ast \pi^2) \ast (\cos(2 \ast \pi \ast t/T) - 1) + t \ast (P \ast t + 4 \ast V_0)/4$$

And solving this equation for $t_1 = t_2 = T$ and mutual crush we have:

$$T = \text{abs}(D1 - D2)/\text{abs}(\Delta V_1 - \Delta V_2)/2 + (V_{o1} - V_{o2})$$

The present method and system samples the values of accelerometer and embedded 3-axis gyroscope sensor at 1 millisecond increments, because during a crash the deceleration process lasts about 100-200 ms, but the life-threatening deceleration peaks have a duration of about 10 millisecond. Hence, it is essential to sample at 1 milliseconds rate for accurate detection of a severe accident. Once an acceleration peak is detected, accelerometer values for each 1 millisecond sampling are saved from t1 to t2 as a sequence of accelerometer values for analysis to determine if a serious accident has occurred. For minor accidents, the driver can press an emergency help request button to seek police or medical help.

Figure 27:
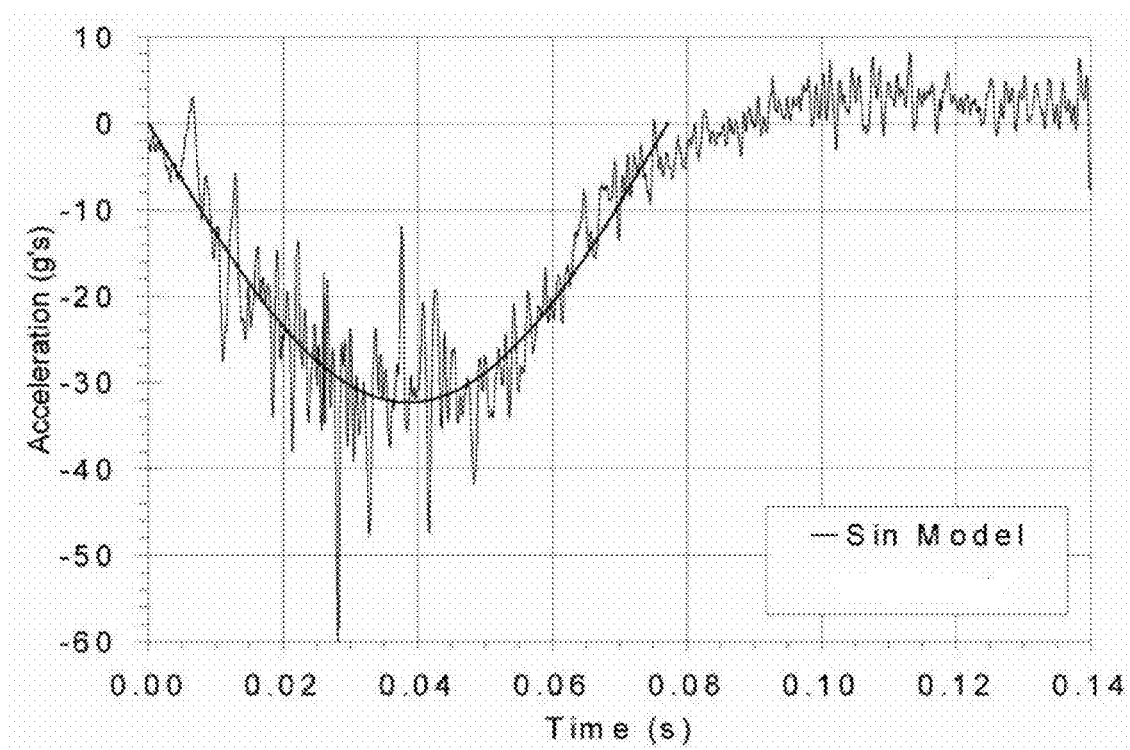
FIG. 27 shows an example of deceleration values captured by an accelerometer.

The Z-axis is toward the back of the car, so acceleration in the forward direction results in negative values for the Z component of acceleration, and in positive values for deceleration. The X-Y-Z accelerometer sensor output has oscillatory behavior sometimes during an accident, as shown in FIG. 27. These accelerometer vector values are filtered, for example, by a 5-tap Finite Impulse Response (FIR) filter with kernel values of $\{\frac{1}{5}, \frac{1}{5}, \frac{1}{5}, \frac{1}{5}, \frac{1}{5}\}$.

The accident is detected as follows (See FIG. 29). First, the acceleration vector magnitude is calculated as the following, which is also defined as the acceleration vector:

$$A = \text{sqrt}(A_x^2 + A_y^2 + A_z^2)$$

Where Ax, Ay, and Az are the three acceleration values provided by X-Y-Z accelerometer for X, Y and Z axis.

Similarly, we calculate the rotational motion by calculating the rotational vector as (see FIG. 7), which is also referred to as the gyro motion vector or gyro vector herein:

$$W = \text{sqrt}(W_x^2 + W_y^2 + Z_z^2)$$

The rotational motion vector is useful to detect an accident when a vehicle is hit from the front or back side, which effectively "spins" the vehicle being hit. If A or W is greater than a respective threshold value that is determined by the selection of subject vehicle, the sampled A and W values from $t_1$, the beginning of the crash pulse, to $t_2$, the end of the crash pulse (See FIG. 26) are saved into a buffer, which then contains 1 ms sampled A and W values for the crash pulse.

Next, the time duration of accident $T_D = t_2 - t_1$ is checked to be less than threshold value as a function of speed at the onset of accident, e.g., 200 milliseconds for 60 mph. Longer deceleration times do not increase the injury risk, according to experience. The area under the acceleration curve does not necessarily represent a serious accident, unless the acceleration has a proper duration and a weighted value under the acceleration curve. The peak acceleration values are checked to last at least a minimum threshold value, e.g., 3 msec. This requirement has reasons of measurement technique and is supported by the assumption that decelerations of shorter duration do not have any effect on the human body.

The speed of vehicle $V_{o1}$ at the beginning of accident is measured using one or more methods: The speed is measured by GPS unit as the average speed just before the accident. The speed is also read from the ECU using the OBD-II interface, when connected. Two factors of importance are mean acceleration and speed change ΔV during an accident.

ΔV=$V_{01}$ since the speed is zero after a severe accident. The mean acceleration is $A_{AVG}$=ΔV/$T_D$ A severe accident is detected by the formula for Severity Index (SI):

$$SI = \Sigma_{k=t1}^{t2} A(k)^n$$

This equation takes into account both duration and weighted value of deceleration for the duration of the accident. The acceleration value A is summed for t=$t_1$ to $t_2$, where n=2.5 is used in one embodiment. The SI measures the area under the acceleration crash curve using weighted by a power value of n. This takes into account both duration and weighted value of deceleration for the T time period. When SI≥$P_{1Accident}$ accident is detected, where $P_{1Accident}$ is a threshold parameter. Accident is also detected when airbag deployment is detected by the OBD-II interface. Other conditions for accident detection are W≥$P_{2Accident}$, vehicle free fall condition detected, and vehicle roll-over detected.

The SI equation above provides a very accurate estimation of accident detection and also determines the severity level of a given accident. It is important to note that detection threshold values and also the severity index level are both determined as a function of weight of a vehicle, as being a bus versus a four door sedan significantly affects the level of acceleration values experienced (see FIG. 23).

The severity index level SI is scaled to 0 to 10 as a measurement of severity level of an accident, where level 10 corresponds to peak acceleration value of about 50Gs and the width T of about 100 milliseconds. The scaled SI index is then calculated by:

$$\text{Scaled SI Index} = \min(10, (SI/SI_{MAX}))$$

Where $SI_{MAX} = \Sigma(50 * \sin^2(\pi*k/0.1))^n$ for k=1 to 100 in increments of one, and weighting value of about n=2.5 is exemplified, but other weighting values greater than two can also be used. The "min" is the minimum math function which selects the smaller value of two values.

The above scaled index calculation clamps the maximum value to 10, in case the actual values are worse than the assumed average maximum values for G and duration by the use of minimum function, which selects the minimum value of two numbers.

The calculated severity level is modified upward in one embodiment to be 10 when a free fall over a certain distance such as 3 feet and/or roll-over condition is detected.

Figure 29:
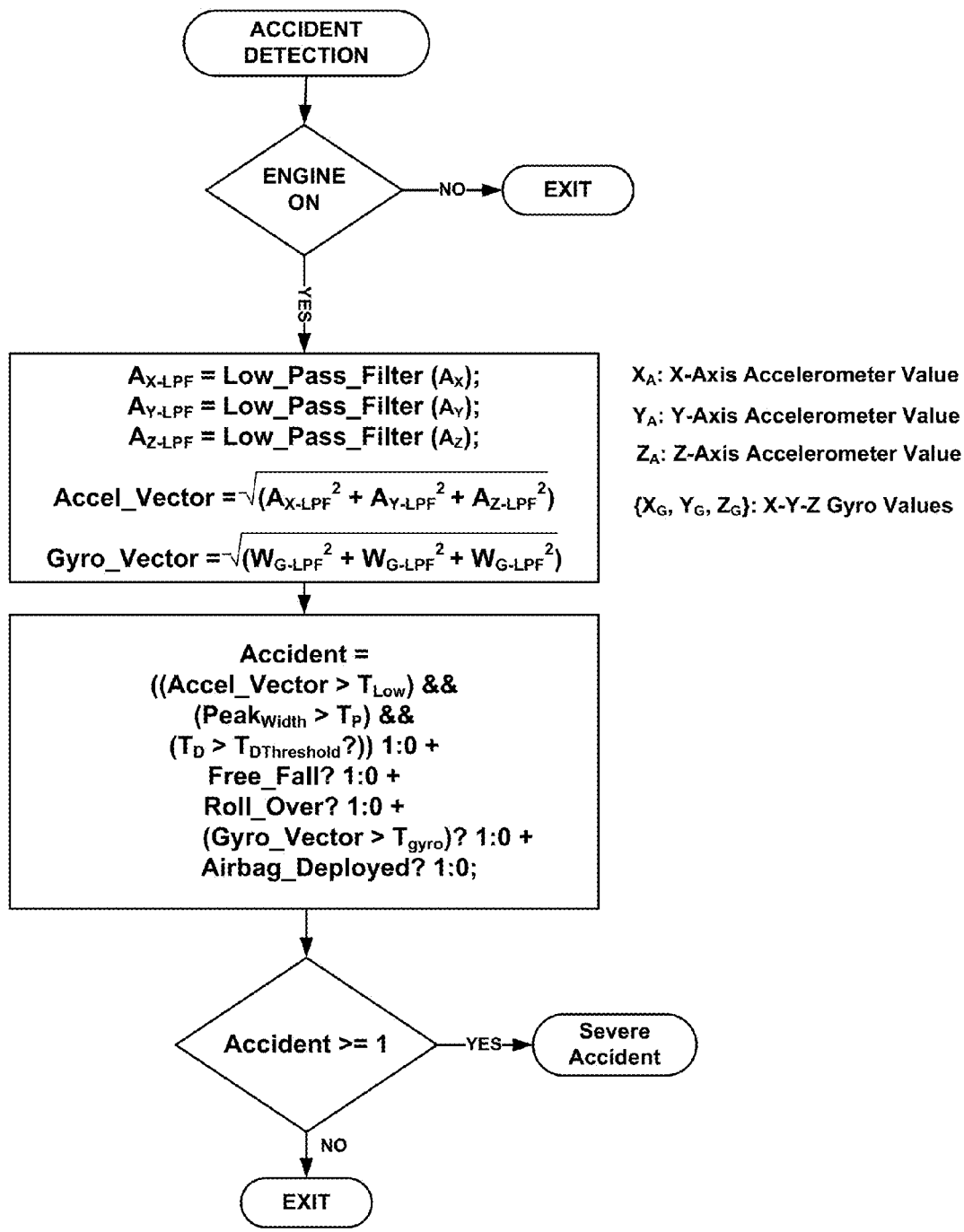
FIG. 29 shows an embodiment of accident detection.

The first embodiment of present method, shown in FIG. 29, first checks if vehicle's engine is on. Engine on condition is checked using the switched power signal line and/or OMB-2 connection. If engine is on, then accelerator x, y and z components are filtered using a low-pass filter such as with a 5 tap FIR filter. The filtered accelerometer values are combined to calculate the acceleration vector (Accel_Vector). Similarly, gyro vector (Gyro_Vector) is calculated, but without any FIR filtering. An accident condition is determined if any of the following conditions is true:

A. Accelerometer vector is greater than a threshold value $T_{LOW}$ and width of peak accelerometer values is more than $T_P$, and duration of accelerometer curve is more than a threshold value $T_{DThreshold}$; or B. A free fall condition is detected which means $A_{X-LPF}$, $A_{Y-LPF}$ and $A_{Z-LPF}$ all are approximately zero; or C. A roll over condition is detected; or D. Gyro vector value is more than a threshold value of $T_{gyro}$; or E. Airbag is deployed. This is detected by OBD-2 connection.

The "&&" means a logical AND operation as used by a C program, and similarly "condition? X:Y" mean value of X if said condition is true, and value of Y otherwise.

Figure 30:
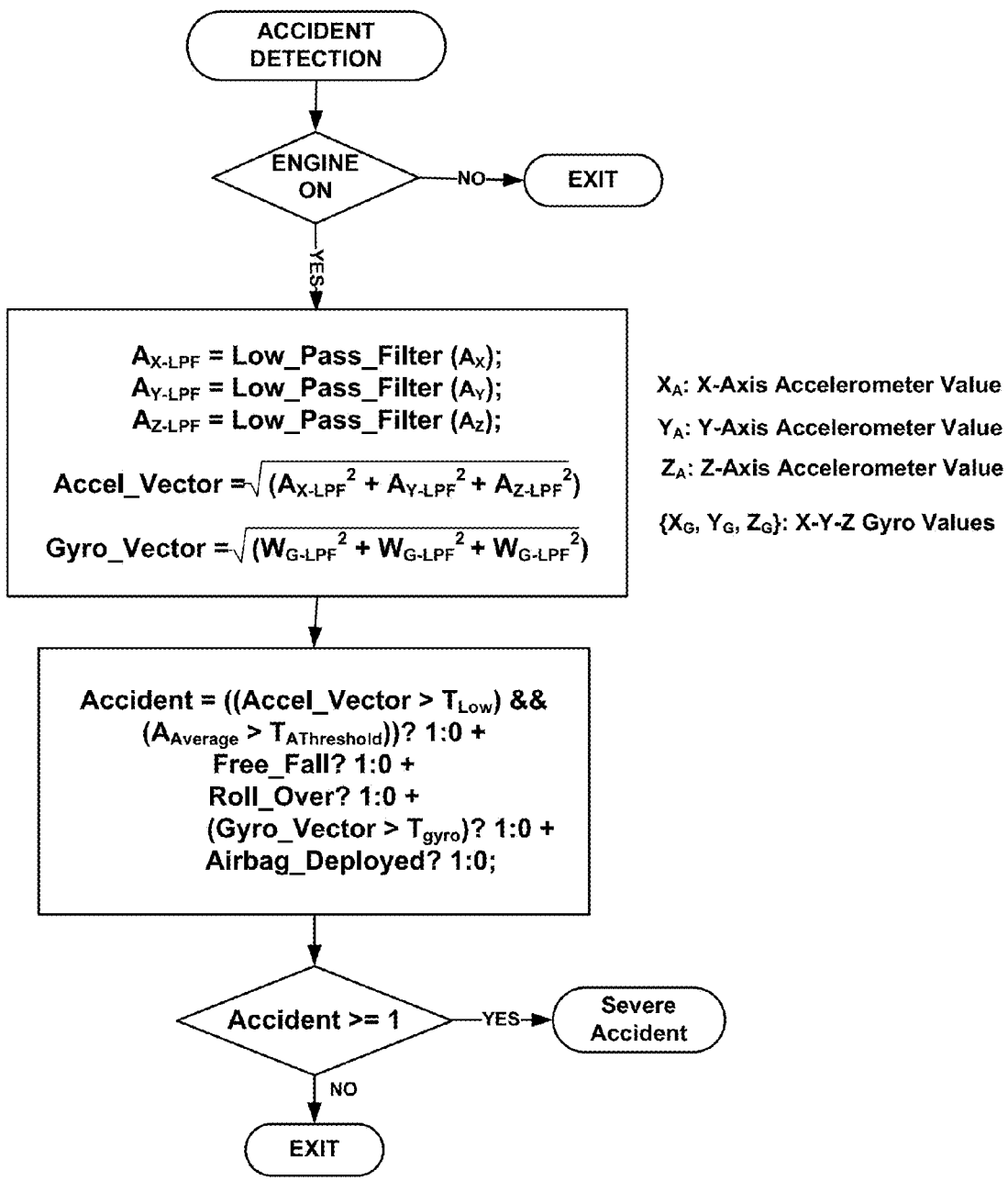
FIG. 30 shows another embodiment of accident detection.

A second embodiment of accident detection is given in FIG. 30, where average acceleration value larger than a threshold is used as part of the equation instead of peak and width of acceleration curve. The acceleration curve is captured when a peak a detected and this sequence of acceleration values are then analyzed for various parameters such as width of peak, average value, the duration from t1 to t2, etc.

Figure 31:
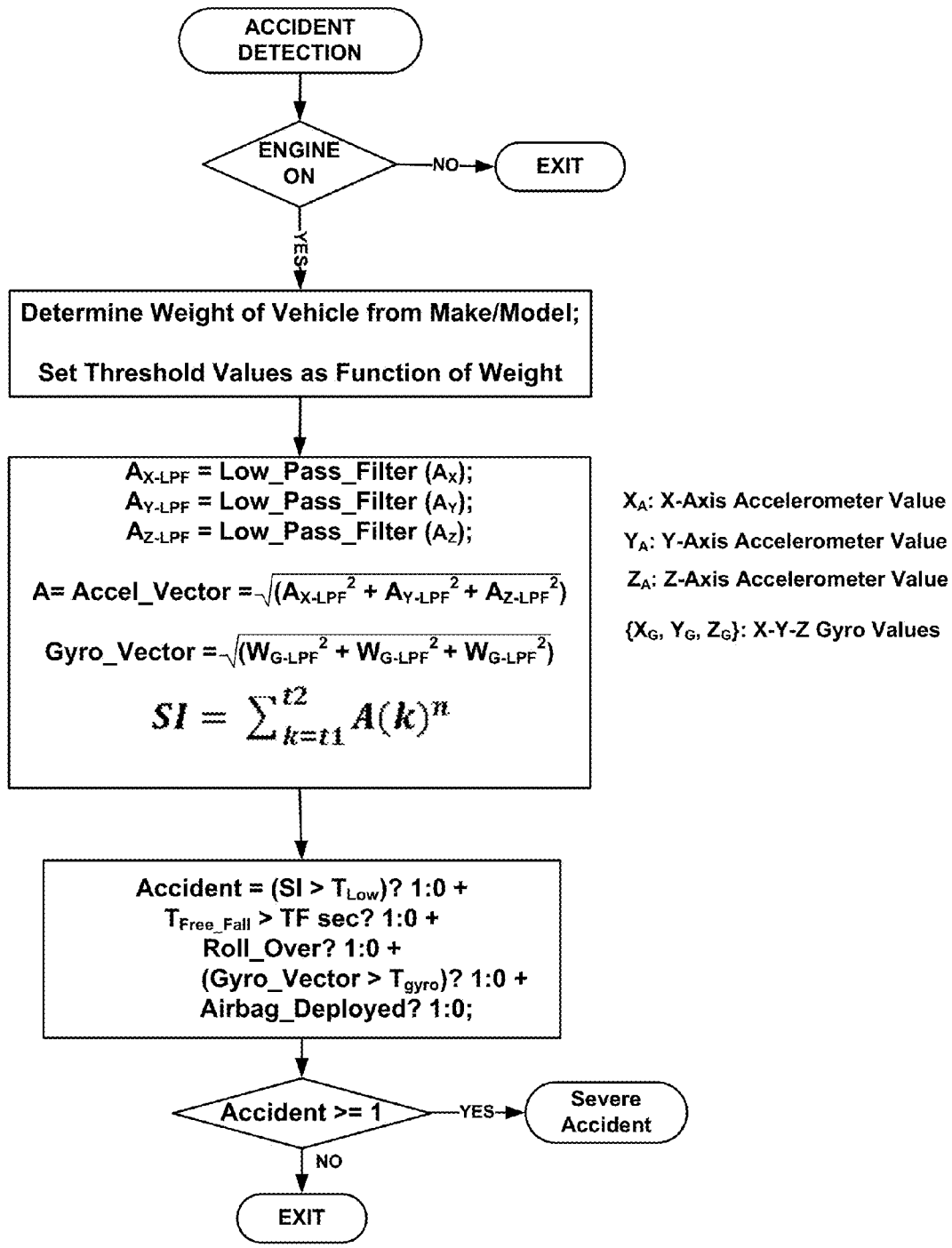
FIG. 31 shows another embodiment of accident detection.

The third embodiment of accident detection, shown in FIG. 31, first uses the vehicle make and model that is entered as part of set up of the present system during installation to determine the vehicle's unloaded weight. This weight value is then used to adjust various threshold values in the rest of the algorithm, because acceleration curves will be dependent on the vehicle weight. This embodiment also uses the Severity Index (SI) for accident detection. Also, free fall over a certain distance is used to filter out the present unit falling from windshield, because the distance will not be 3+ feet for example in that car for a passenger vehicle.

Figure 32:
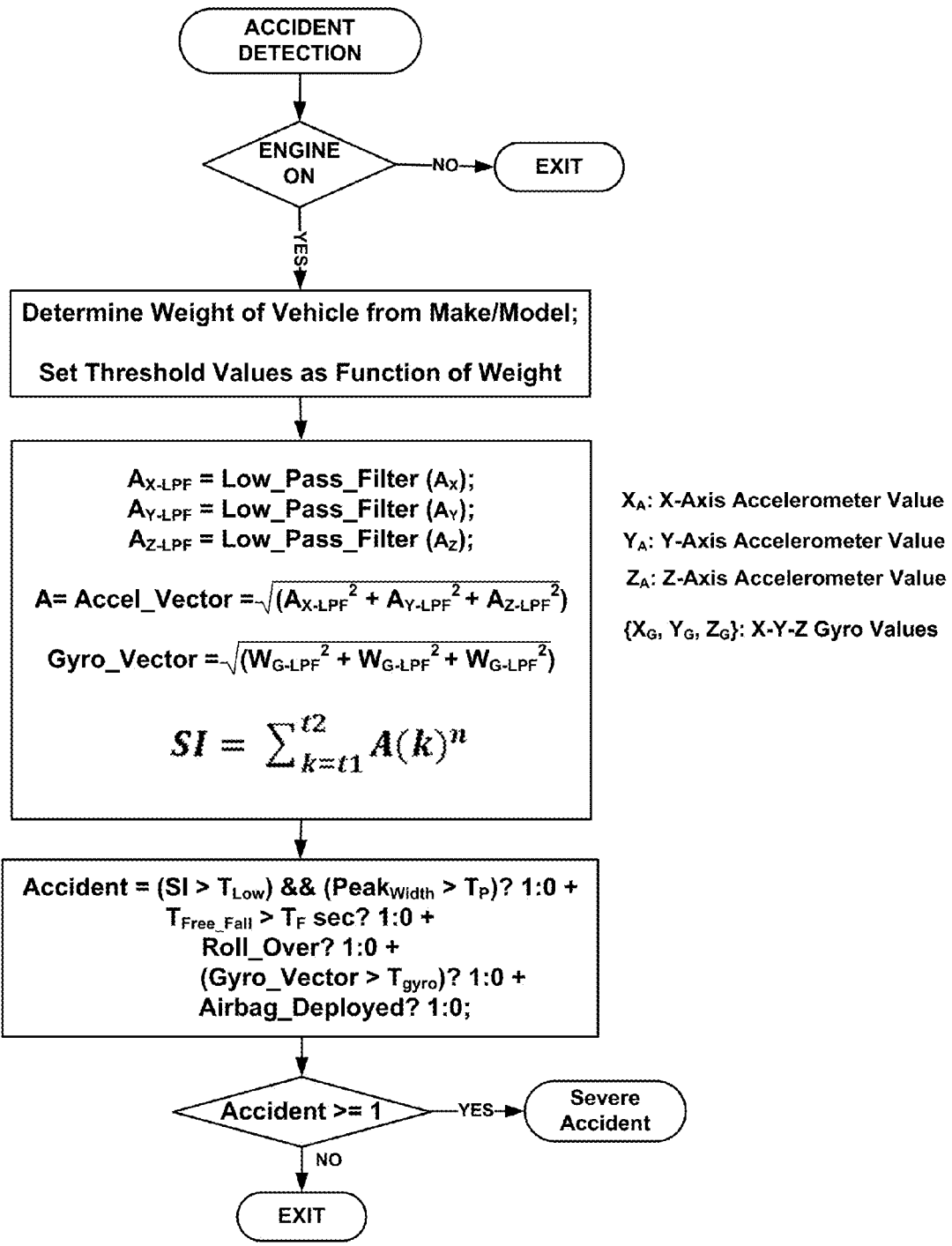
FIG. 32 shows another embodiment of accident detection.
Figure 33:
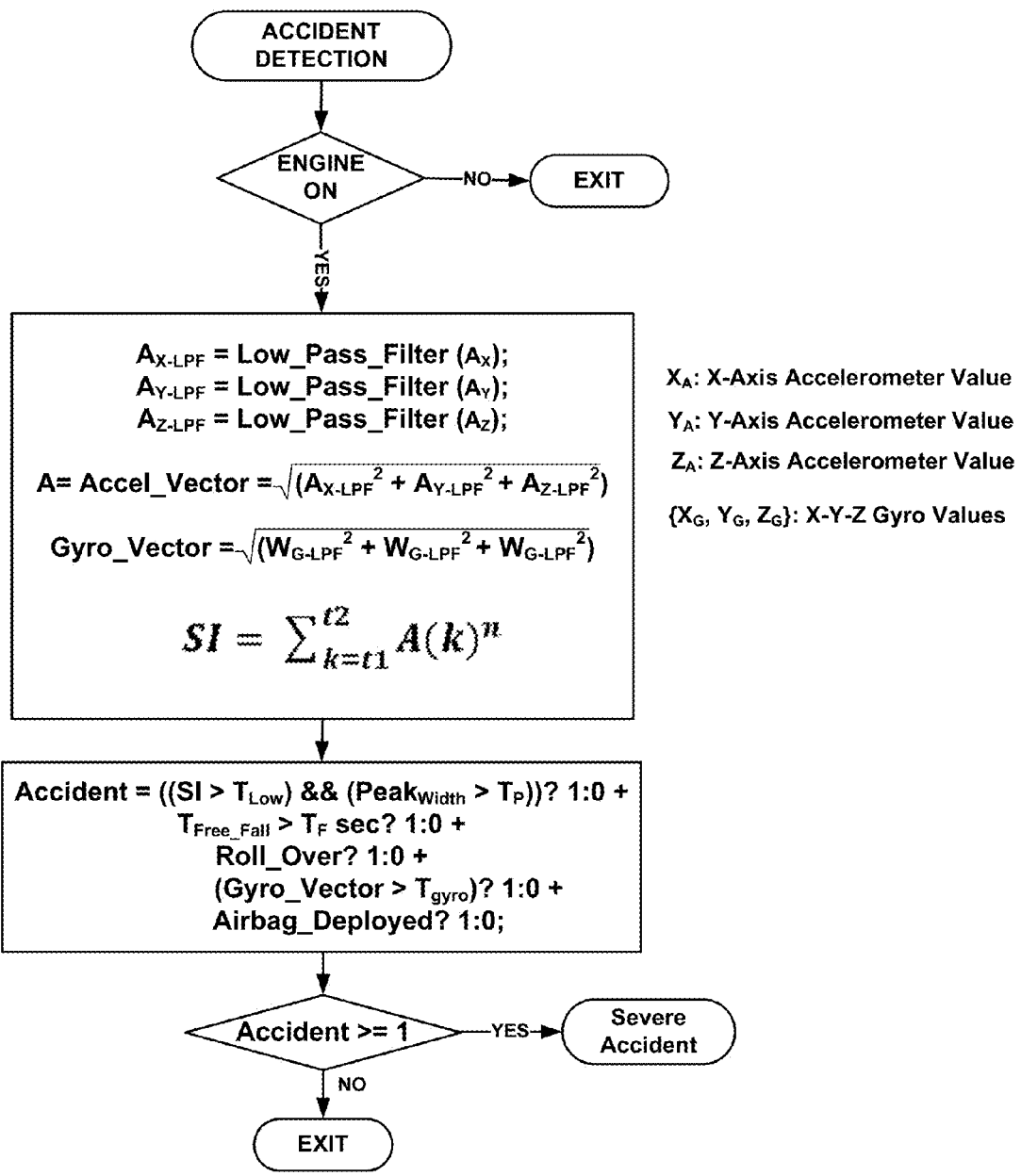
FIG. 33 shows another embodiment of accident detection.

The fourth embodiment, shown in FIG. 32, uses both SI value more than a threshold value as well as width of peak of accelerometer curve larger than a threshold value. This embodiment also uses weight of vehicle to determine several threshold values. The fifth embodiment, shown in FIG. 33, is the same except vehicle weight is not used to determine threshold parameter values.

Figure 34:
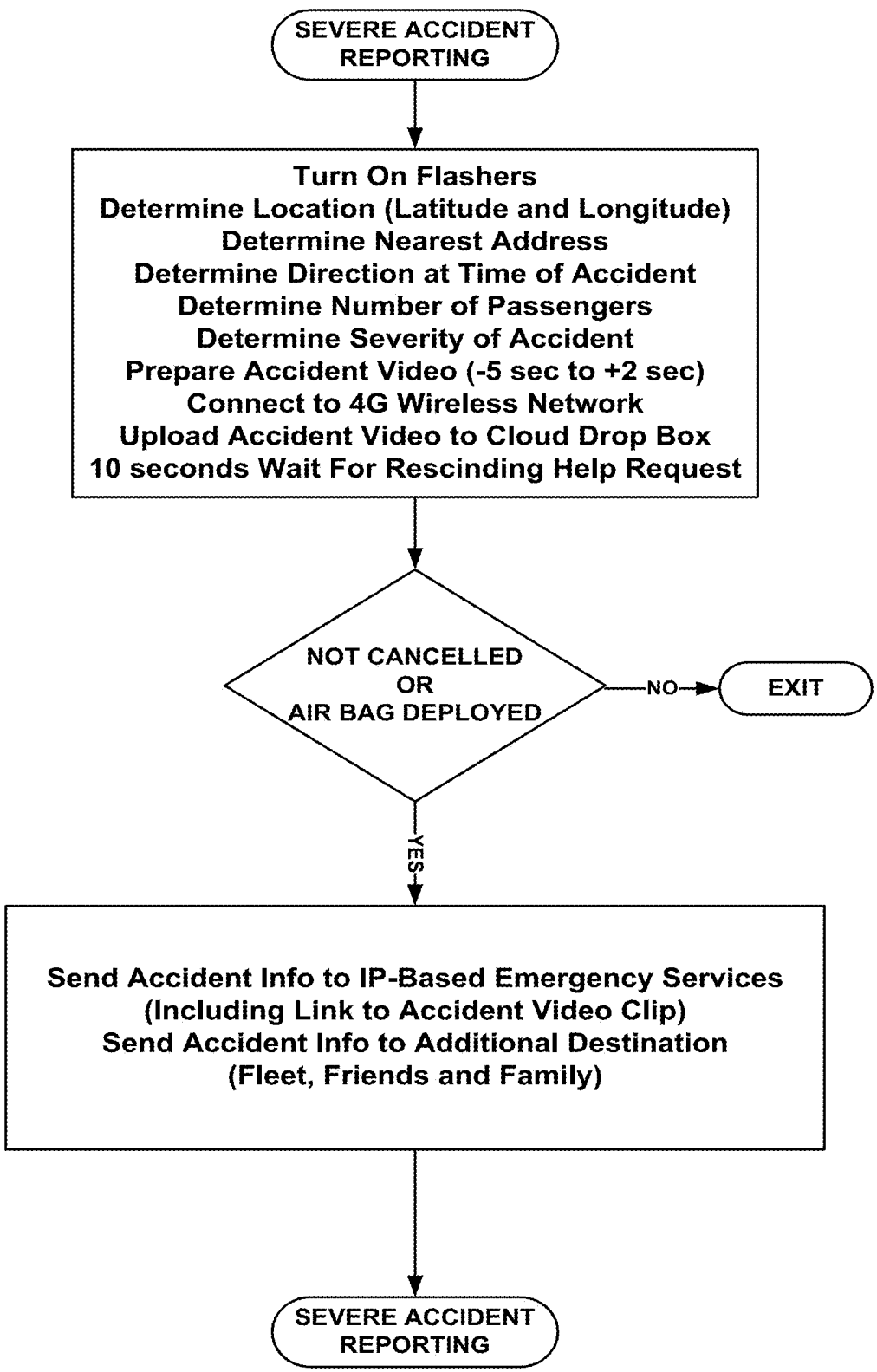
FIG. 34 shows severe accident reporting.
Figure 35:
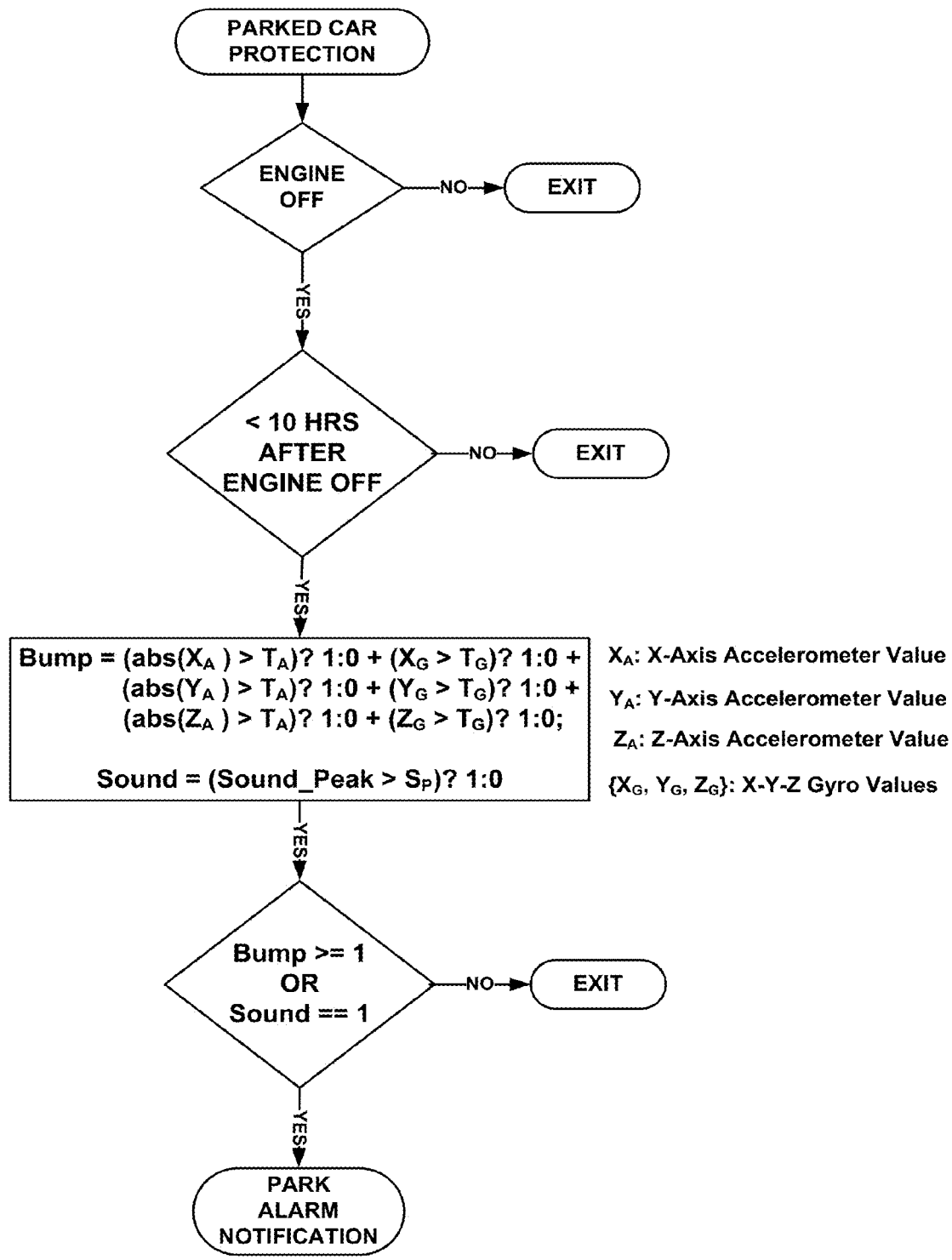
FIG. 35 shows parked car protection.

Reporting a detected accident is shown in FIG. 34. Vehicle flashers are turned when possible via the OBD-2 interface, so that there are no other further accidents by other vehicle as secondary accidents. The vehicle location is determined by GPS, and nearest address is determined using Google maps functionality. Also, number of passengers is detected using face detection using both rear view cameras. The severity of accident is calculated using a scaled severity index so that worst-case accident is 10 out of 10. Connection to 4G is established as soon as an accident, which may take several seconds. User can also request police or medical help by pressing a button, which is defined as a level one severity out of ten. An accident video from multiple cameras is prepared and uploaded to a cloud server drop box. The URL of uploaded video is embedded in the accident notification SMS, email or other IP communication of accident notification. A delay of 10 seconds is provided to rescind the emergency help request, while connection, compilation of video is being prepared.

Roll Over and Free Fall Detection

If roll over or free fall condition is detected, then the severity level of an accident is set to 10 out of maximum scale of 10, otherwise, the severity level is calculated by the function of severity index SI above.

Normally, Y axis=1, and Z indicates vehicle acceleration/deceleration, and X axis is zero. If X axis is >T or Y axis <T, then roll over is indicated.

Time for Free Fall >T for free fall: Determine duration of free fall in milliseconds. Derive distance from this duration data:

$$D_F = (\tfrac{1}{2}) A * T^2$$

$T_{FREE\_FALL}$=sqrt (A/(2×D))=sqrt (9.8 m/sec$^2$/2×3 m)=1.27 seconds

IP Based Emergency Services

The current automatic accident notification systems send information to a call center, and after voice communication with driver, the call center relays information to emergency call center via voice communication. All this voice communication and re-relaying of information by the call center wastes precious response time. Each minute that an injured crash victim does not receive emergency medical care can make a large difference in their survival rate, e.g., analysis shows that reducing accident response time by one minute correlates to a six percent difference in the number of lives saved. An effective approach for reducing traffic fatalities, therefore, is to reduce the time between when an accident occurs and when first responders, such as medical personnel, are dispatched to the scene of the accident. The method of present system and method is to immediately contact Public Service Answering Point (PSAP) via both data and voice channels. Also, accident of the video is uploaded to a drop box in the cloud and the URL link (Uniform Resource Locator: a protocol for specifying addresses on the Internet) to audio-video accident data is sent with the emergency help request data. Because the present method and system uses three or four HDR cameras continuously recording the surrounding and inside to an embedded SD Card non-volatile storage, the present system contains a three or four channel HD Digital Video Recorder (DVR), it sends H.264 or H.265 compressed audio-video information from seconds before the accident to seconds after the accident occurrence. For example, it sends video data from three cameras (audio is optional) from 5 seconds before the accident to 2 seconds after the accident, i.e., a seven second duration of video is uploaded to a cloud drop box for three channels, and the link to this video (or three links to three separate audio-video files are sent with the accident data message (see FIG. 40(A) and FIG. 40(B)). Hence, it is important to communicate the conditions and data of an accident clearly and concisely to emergency services of PSAP.

The video from multiple channels can either be recorded as separate Audio-Video compressed media files, or can be merged into a 360 degree panoramic video using a Quick-Time Video Recorder (QVTR) or similar format that supports 3-dimensional videos. QTVR movies display three-dimensional places (panoramas) and objects with which the user can interact. With a QTVR panorama, it's as if you're standing in the scene and you can look around you up to 360 degrees in any direction. In a QTVR movie of an object, you can rotate the object in any direction. To pan through a QTVR movie, drag the cursor through the scene.

The present invention uses IP based emergency services to connect and communicate concise accident information, and does not require call-center with associate delays in response and annual $200 fees. The accident video enveloping the accident from multiple embedded cameras with above-mentioned video processing is sent as a URL link as part of the message detailing location of the accident, number of occupants, severity level, time stamp of the accident, conscience state of driver and passenger after the accident by performing facial processing of two rear-view cameras, and direction of travel when accident occurred. Such video information can thus be viewed not only by the emergency services center, but also by police and emergency responders from any web-enabled device. The video is captured by a high-definition (HD) and High-Dynamic-Range (HDR) camera modules and processed by adaptive pre-processing as described herein and compressed using H.264 or H.265 standards for video quality. The front-view camera is accurate to view the License Plate Number Recognition (LPNR) of the vehicle ahead of the trigger event.

The IP based emergency services are contacted via SMS 911 or NG-9-1-1 in the USA, and eCall in Europe. The SMS 911 Text messaging is one of consumers' preferred means of communication and increasingly used to access life-saving emergency services using Short Message Service (SMS). J-STD-110 makes a new generation of emergency communications capabilities possible. It allows text to 911 to be broadly implemented across the United States to get emergency messages to public safety answering points at times when help is needed most." SMS 911 does not support video payload but the present system and method embeds one or more URL links to a. SMS message after uploading the audio-video information to the cloud storage.

SMS is extremely reliable, so much so that an SMS system will attempt to deliver a message for days after it is sent. Text-based messaging is so reliable that future national alert system, CMAS, is based on it. Likewise, the claim that SMS cannot provide the sender's location for 911 call routing is also false. The record is clear that location information adequate for call routing is available today, and that precise location can be provided without network upgrades."

In Europe eCall will be used for communication to emergency services. In the near future, a car will have an electronic safety system automatically calling emergency services in case of a serious accident. Even if you are unconscious, the system will inform rescue workers of the crash site's exact whereabouts, and the rescues will be on its way within minutes. The system, which has been referred to as "eCall", is going to work all over the European Union. It will soon be rolled out across the EU plus Iceland, Norway and Switzerland.

As soon as the eCall device in a car senses a severe impact in an accident, it automatically initiates a 112 emergency call to the nearest emergency center and transmits it the exact geographic location of the accident scene and other data. With the same effect, eCalls can also be made manually, at the push of a button. This is convenient if, for instance, you become witness of an accident. Whether the call is made manually or automatically, there will always be a voice connection between the vehicle and the emergency call center in addition to the automatic data link. This way, any car occupant capable of answering questions can provide the call center with additional details of the accident.

Action to reduce death figures and injuries on Europe's roads is urgently needed. In 2009, about 35,000 people were killed and 1.5 million injured in about 1.15 million traffic accidents on the EU's road network alone. Getting an immediate alert in the event of an accident and knowing the exact location of the crash site cuts emergency services' response time by 50% in rural and 40% in urban areas. Thanks to this gain in time, eCall is expected to save several hundred lives in the European Union each year, and to mitigate the severity of tens of thousands of injuries. eCall will also result in faster treatment of injured people, thereby giving accident victims better recovery prospects. Arriving at the accident scene sooner will also allow faster clearance of crash sites, thus reducing the risk of secondary accidents, decreasing congestion times, cutting fuel waste and lowering $CO2$ emissions.

In hard financial terms, the EU's economic loss caused by road accidents amounts to more than € 160 billion per year. If all cars were equipped with the eCall system, up to € 20 billion could be saved annually.

The next generation IP Emergency system in USA is NG-9-1-1: A system comprised of Emergency Services IP networks (ESInets), IP-based Software Services and Applications, Databases and Data Management processes that are interconnected to Public Safety Answering Point premise equipment. The system provides location-based routing to the appropriate emergency entity. The system uses additionally available data elements and business policies to augment PSAP routing. The system delivers geodetic and/or civic location information and the call back number. NG-9-1-1 also supports embedded audio-video files for communicating accident audio-video information directly.

Contacting PSAP by the use of SMS 911, eCall, NG-9-1-1 or other similar system using the internet protocols (IP) is referred to as IP-Based Emergency services herein.

The various information that are compiled and/or gathered for reporting as shown in FIG. 40(A) and FIG. 40(B). Such information includes make and model of vehicle, color of vehicle, license plate number, and driver name. Also, location information in terms of latitude and longitude is included and time of accident is included along with severity index value. The severity index value provides an objective assessment of the level of emergency. Also, nearest address information is determined by accessing Google maps by the present method and system. Another useful information is number of passengers in addition to the driver in the vehicle, when possible. The present system counts the number of faces in the vehicle for reporting. The direction of travel at the time of accident is also included, which is important for quick approach by emergency responder vehicles when there is a center divider barrier on the highway. The present system uses the DVR features to determine the direction just prior to the occurrence of the accident, as direction of vehicle after the accident is likely to be not accurate. The present system also provides phone number of the system for any callback from the emergency services, which will be automatically answered by the system and communication between the driver/passengers and emergency services can use speakerphone capability of the present system.

Parked Car Protection

Figure 36:
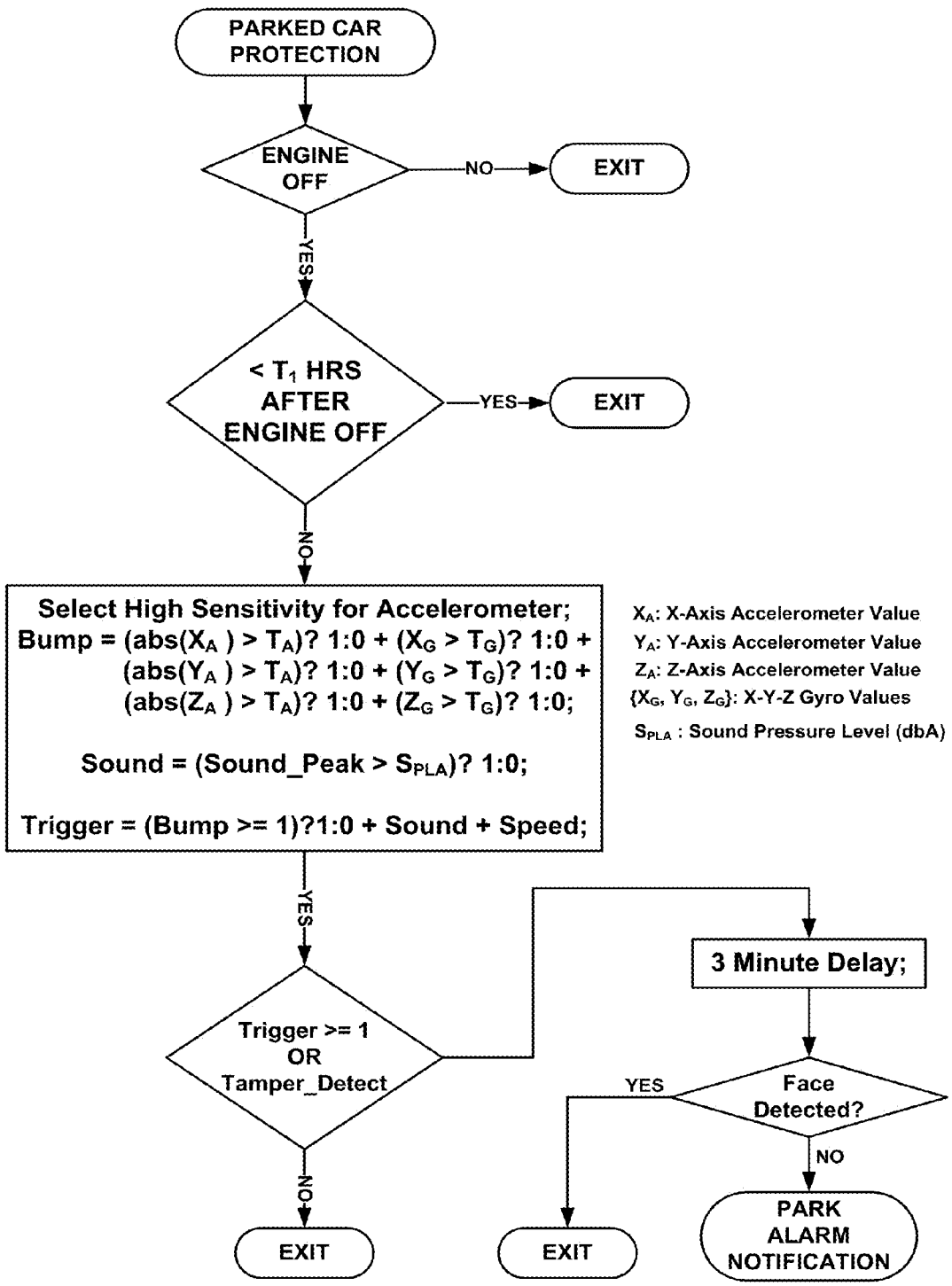
FIG. 36 shows another embodiment of parked car protection.
Figure 37:
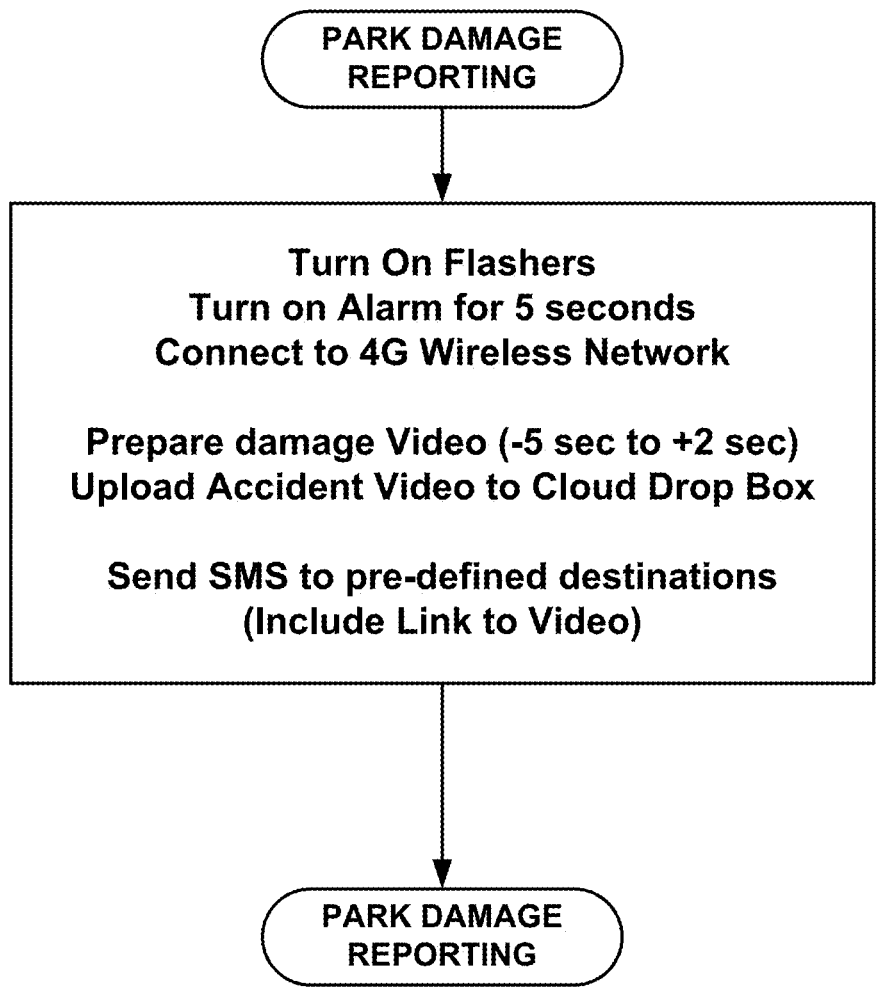
FIG. 37 shows park damage reporting.

The present method also provides parked car protection, and notification of parked vehicle damage. This is enabled when engine is off and for a time period such as 10 hours during which the vehicle is likely to return to its home base so that there is no long term drain on the vehicle battery. A bump is detected when any component of accelerometer or gyro value change is detected. The accelerometer and gyro has several scales of different sensitivity. For accident, the high value scale is used, and for parked vehicle the most sensitive scale is selected. If there is a bump or a sound level higher than a threshold is detected, then park alarm notification is issued via email or SMS, and video of the event from t−5 seconds to +3 seconds is also uploaded to the cloud and sent as a URL link to the owner or vehicle operator, where "t" is the time of bump. The parked damage reporting is shown in FIG. 37. The ability of capturing before the event is possible because all cameras are continuously recording and such trigger events access the multi-channel digital video recorder that is embedded in the present system. The video will clearly show the vehicle or person(s) hitting the vehicle. The second embodiment, shown in FIG. 36, provides a delayed exit or entry to the vehicle, as otherwise exiting or entering the vehicle will also cause trigger event due to closure of door or trunk. The "abs" refers to absolute value math function.

I claim:

1. A method for detecting a vehicle accident and notifying emergency services in case an accident is detected, said method comprising:

determining unloaded weight of a vehicle in accordance with make and model of vehicle selected;

selecting threshold values of accident detection parameters in accordance with the determined unloaded weight of the vehicle;

calculating a series of acceleration vector values in accordance with inputs from an X-Y-Z accelerometer;

filtering said acceleration vector values;

calculating a severity index (SI) value, width of peak of said acceleration vector, and an average acceleration value and duration of time around a peak acceleration event;

determining occurrence of a severe accident;

connecting to wireless broadband network when the accident is detected;

determining a location information in terms of latitude and longitude based on GPS inputs;

determining a nearest address based on said location information;

calculating a scaled severity index (SI) of accident;

capturing an accident video using multiple cameras from several seconds before the accident to some seconds after the accident in a standard compressed video file format;

uploading said captured accident video to a drop box in a cloud storage, and providing a URL link to access it in an emergency help request message;

composing an emergency help request message which includes accident information including said scaled severity index value, location and time of accident, vehicle information, said nearest address, and link to accident video; and sending said emergency help request message to IP based emergency services of Public Safety Answering (PSAP) that has jurisdiction over a caller's location, using a messaging system that includes but not limited to one of SMS 911, NG-9-1-1, and eCall.

2. The method of claim 1, further comprising:

determining rotational gyro vector in accordance with inputs from a X-Y-Z gyro sensor, wherein said rotational gyro vector exceeds a threshold value $T_{Gyro}$;

detecting a free fall more than certain distance $D_F$;

detecting a roll-over condition;

detecting an airbag has deployment; and wherein an accident event is further triggered when any of the above steps is detected.

3. The method of claim 1, further comprising:

determining a direction of travel at the time of the accident in accordance with direction of vehicle just before the accident; and reporting said direction of travel as part of emergency help request for a quicker response from emergency services.

4. A method for automatically detecting vehicular accidents and providing accident notification, the method comprising:

calculating an acceleration vector value;

detecting a trigger event when said acceleration vector value exceeds a threshold value;

capturing a sequence of accelerator vector values around said trigger event as a function of time;

capturing video of accident from multiple cameras;

determining if a severe accident has occurred in accordance with said sequence of accelerator vector values around said trigger event, and upon detection of said severe accident, the method further comprising the steps of:

determining latitude, longitude and nearest address upon detection of said severe accident;

calculating scaled severity index (SI) of accident;

connecting to internet via wireless broadband modem that includes but not limited to 3G, 4G LTE and 5G wireless broadband modem standards;

uploading said captured video of accident to a cloud drop box;

composing a message that includes but not limited to severity level of accident, the latitude, longitude and nearest address of said accident, vehicle make, model and license plate, link to uploaded said captured video of accident, and time of accident; and sending said message to IP based emergency services.

5. The method of claim 4, wherein accident is also detected when one of following conditions occur: gyro vector exceeds a certain threshold value, free fall over certain distance is detected, vehicle roll-over condition is detected, or airbag deployment is detected.

6. The method of claim 4, wherein an accident is detected when severity index value is larger than a threshold value and width of peak of acceleration is larger than a threshold peak-width value.

7. The method of claim 4, wherein accelerator vector values are filtered by an FIR filter before use for detection of accident.

8. The method of claim 4, wherein threshold values for various parameters is determined as a function of vehicle make and model, further comprising the step of determining vehicle weight.

9. The method of claim 4, wherein an accident is detected when average acceleration value exceeds a certain threshold and filtered accelerator peak exceeds said certain threshold value.

10. The method of claim 4, wherein an accident is detected when severity index (SI) exceeds $T_L$, width of peak acceleration value exceeds $T_P$, and duration of accident exceeds $T_{DWidth}$ threshold value.

* * * * *